US012621041B2

(12) United States Patent
Oh et al.

(10) Patent No.: US 12,621,041 B2
(45) Date of Patent: May 5, 2026

(54) ELECTRONIC DEVICE PERFORMING OPERATION CORRESPONDING TO OVER-TEMPERATURE STATE AND METHOD FOR OPERATING THEREOF

(71) Applicant: SAMSUNG ELECTRONICS CO., LTD., Suwon-si (KR)

(72) Inventors: Sangun Oh, Suwon-si (KR); Inhye Yeom, Suwon-si (KR); Naram Yoon, Suwon-si (KR); Sanghyun Lee, Suwon-si (KR); Seongwon Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 437 days.

(21) Appl. No.: 17/654,671

(22) Filed: Mar. 14, 2022

(65) Prior Publication Data

US 2022/0360315 A1 Nov. 10, 2022

Related U.S. Application Data

(63) Continuation of application No. PCT/KR2022/002449, filed on Feb. 18, 2022.

(30) Foreign Application Priority Data

Apr. 30, 2021 (KR) ........................ 10-2021-0056914

(51) Int. Cl.
*H04B 7/08* (2006.01)
*H04L 5/00* (2006.01)
(Continued)

(52) U.S. Cl.
CPC ......... *H04B 7/0802* (2013.01); *H04L 5/0048* (2013.01); *H04W 8/24* (2013.01); *H04W 24/10* (2013.01)

(58) Field of Classification Search
None
See application file for complete search history.

(56) References Cited

U.S. PATENT DOCUMENTS

2012/0051249 A1* 3/2012 Nakamura .......... H04L 43/0888
370/252
2013/0091348 A1 4/2013 Kwon et al.
(Continued)

FOREIGN PATENT DOCUMENTS

KR 10-2013-0038440 4/2013
KR 10-1925720 12/2018
(Continued)

OTHER PUBLICATIONS

Search Report and Written Opinion issued May 24, 2022 in counterpart International Patent Application No. PCT/KR2022/002449.
(Continued)

*Primary Examiner* — The Hy Nguyen
(74) *Attorney, Agent, or Firm* — Nixon & Vanderhye, P.C.

(57) ABSTRACT

An electronic device includes: a plurality of antennas, and at least one processor, wherein the at least one processor is configured to: identify an over-temperature state of the electronic device, identify a current state of the electronic device for at least one parameter of a user equipment (UE) capability of the electronic device based on identification of the over-temperature state, perform a first operation of reducing a number of antennas for reception among the plurality of antennas based on satisfying a specific condition by the current state of the electronic device for the at least one parameter, and perform the first operation and a second operation of changing at least some of the UE capability of
(Continued)

the electronic device based on not satisfying the specific condition by the current state of the electronic device for the at least one parameter.

19 Claims, 34 Drawing Sheets

(51) Int. Cl.
  *H04W 8/24*        (2009.01)
  *H04W 24/10*       (2009.01)

(56)          References Cited

U.S. PATENT DOCUMENTS

| | | | |
|---|---|---|---|
| 2014/0274011 A1* | 9/2014 | Jain | H04W 8/22 |
| | | | 455/418 |
| 2018/0199185 A1* | 7/2018 | Tenny | H04W 8/22 |
| 2019/0069304 A1 | 2/2019 | Chang et al. | |
| 2019/0363768 A1 | 11/2019 | Wang et al. | |
| 2020/0100099 A1 | 3/2020 | Tenny et al. | |
| 2020/0145927 A1 | 5/2020 | Sun et al. | |
| 2020/0162891 A1* | 5/2020 | Hong | H04W 4/20 |
| 2020/0174543 A1 | 6/2020 | Hong | |
| 2020/0204323 A1* | 6/2020 | Kim | H04L 5/0048 |
| 2020/0221289 A1 | 7/2020 | Lee et al. | |
| 2020/0260376 A1 | 8/2020 | Islam et al. | |
| 2020/0275526 A1 | 8/2020 | Sharma et al. | |
| 2021/0013960 A1 | 1/2021 | Raghavan et al. | |
| 2021/0014794 A1* | 1/2021 | Jiang | H04W 80/02 |
| 2021/0051592 A1* | 2/2021 | Wang | H04W 76/15 |
| 2021/0105596 A1 | 4/2021 | Prabhakar et al. | |
| 2021/0105694 A1 | 4/2021 | Jia | |
| 2021/0135963 A1* | 5/2021 | Yang | H04W 72/21 |
| 2021/0250070 A1* | 8/2021 | Pyen | H04B 7/0817 |
| 2022/0167453 A1* | 5/2022 | Liu | H04W 76/15 |
| 2022/0295316 A1* | 9/2022 | Vos | H04W 72/23 |
| 2023/0180238 A1* | 6/2023 | Wang | H04W 72/20 |
| | | | 370/329 |

FOREIGN PATENT DOCUMENTS

| | | |
|---|---|---|
| KR | 10-2020-0062219 | 6/2020 |
| KR | 10-2020-0131892 | 11/2020 |
| WO | 2020/187192 | 9/2020 |

OTHER PUBLICATIONS

3GPP TS 38.331, Radio Resource Control (RRC) protocol specification, Jun. 2021, 959 pages.
3GPP TS 38.101-1, User Equipment (UE) radio transmission and reception, Jun. 2021, 536 pages.
3GPP TS 38.101-2, User Equipment (UE) radio transmission and reception, Jun. 2021, 187 pages.
3GPP TS 38.306 User Equipment (UE) radio access capabilities, Jun. 2021, 153 pages.
Extended Search Report dated Sep. 13, 2024 in European Patent Application No. 22795935.0.
Ericsson, "Remaining issues for UE overheating", 3GPP TSG-RAN WG2 #99bis, R2-1711537, Oct. 8, 2017, 3 pages.
Office Action dated 2025-12-18 in Korean Patent Application No. 10-2021-0056914 and English-language translation.

* cited by examiner

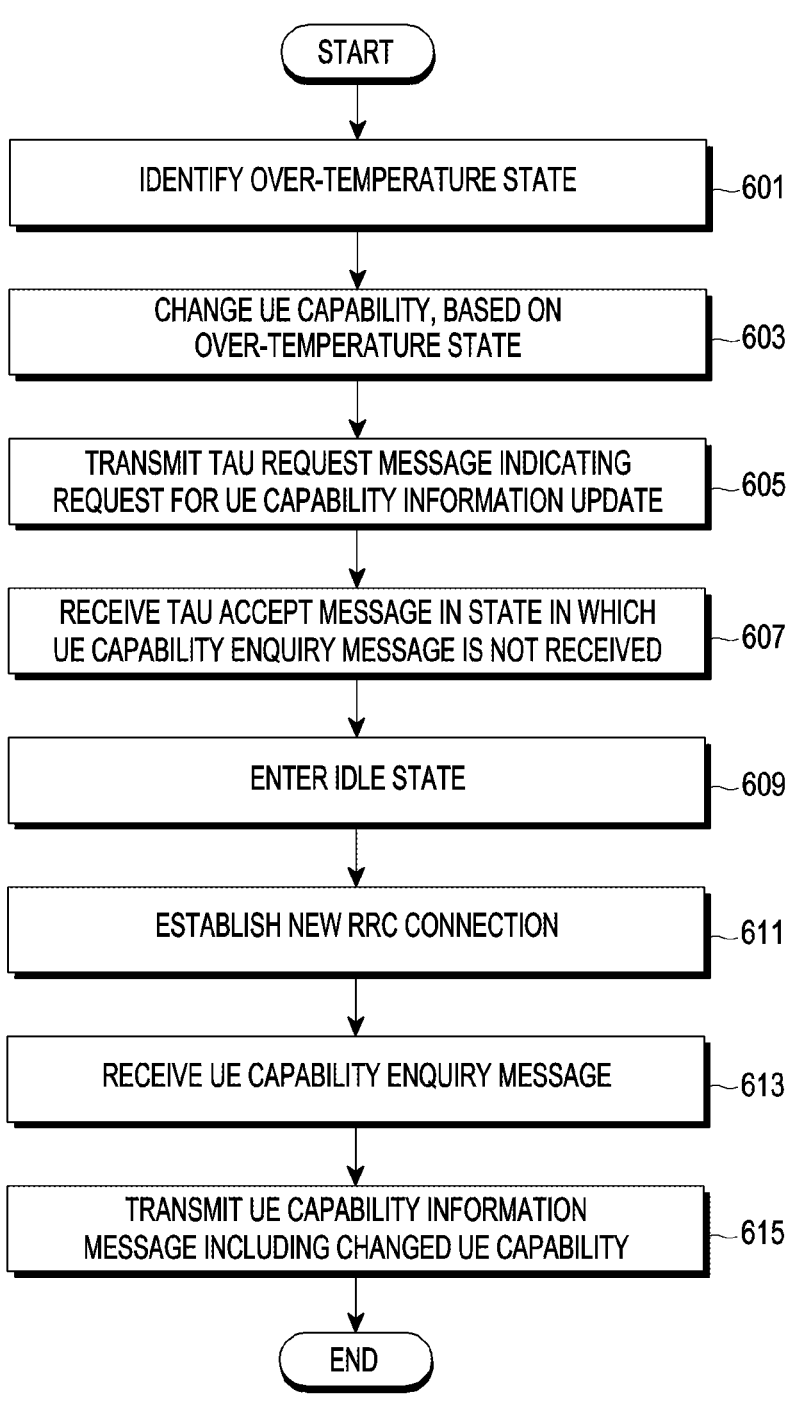

START

IDENTIFY OVER-TEMPERATURE STATE — 601

CHANGE UE CAPABILITY, BASED ON OVER-TEMPERATURE STATE — 603

TRANSMIT TAU REQUEST MESSAGE INDICATING REQUEST FOR UE CAPABILITY INFORMATION UPDATE — 605

RECEIVE TAU ACCEPT MESSAGE IN STATE IN WHICH UE CAPABILITY ENQUIRY MESSAGE IS NOT RECEIVED — 607

ENTER IDLE STATE — 609

ESTABLISH NEW RRC CONNECTION — 611

RECEIVE UE CAPABILITY ENQUIRY MESSAGE — 613

TRANSMIT UE CAPABILITY INFORMATION MESSAGE INCLUDING CHANGED UE CAPABILITY — 615

END

FIG.6

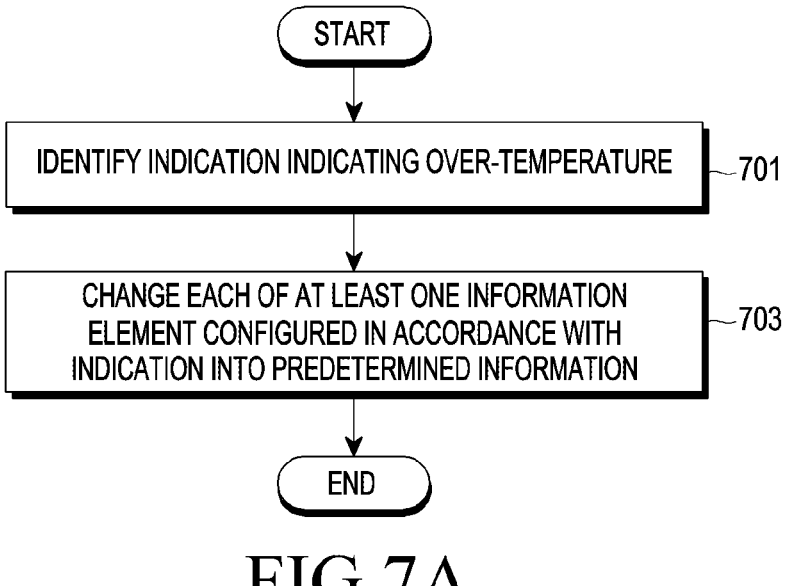

START

IDENTIFY INDICATION INDICATING OVER-TEMPERATURE  ~701

CHANGE EACH OF AT LEAST ONE INFORMATION
ELEMENT CONFIGURED IN ACCORDANCE WITH
INDICATION INTO PREDETERMINED INFORMATION  ~703

END

FIG.7A

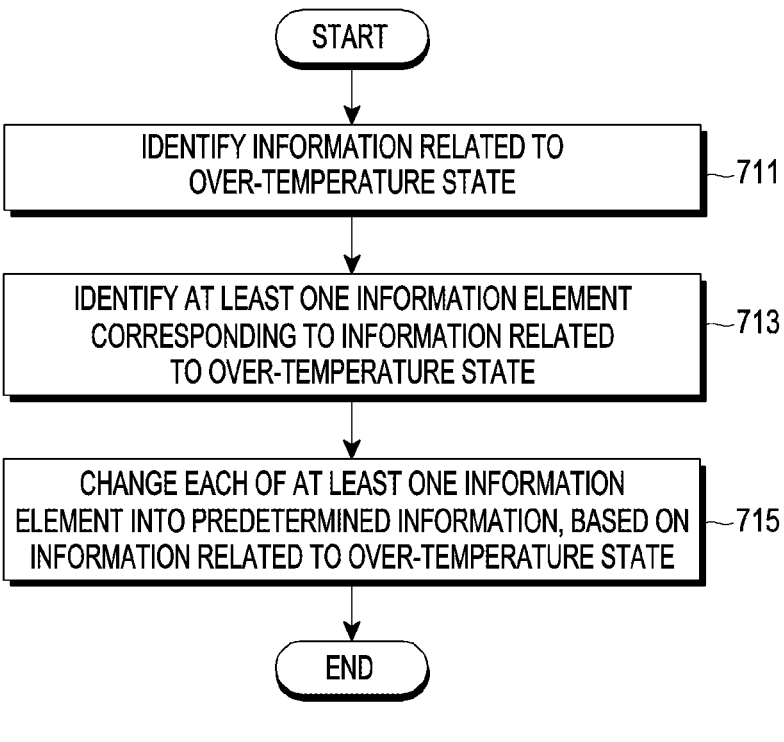

START

IDENTIFY INFORMATION RELATED TO
OVER-TEMPERATURE STATE  ~711

IDENTIFY AT LEAST ONE INFORMATION ELEMENT
CORRESPONDING TO INFORMATION RELATED
TO OVER-TEMPERATURE STATE  ~713

CHANGE EACH OF AT LEAST ONE INFORMATION
ELEMENT INTO PREDETERMINED INFORMATION, BASED ON
INFORMATION RELATED TO OVER-TEMPERATURE STATE  ~715

END

FIG.7B

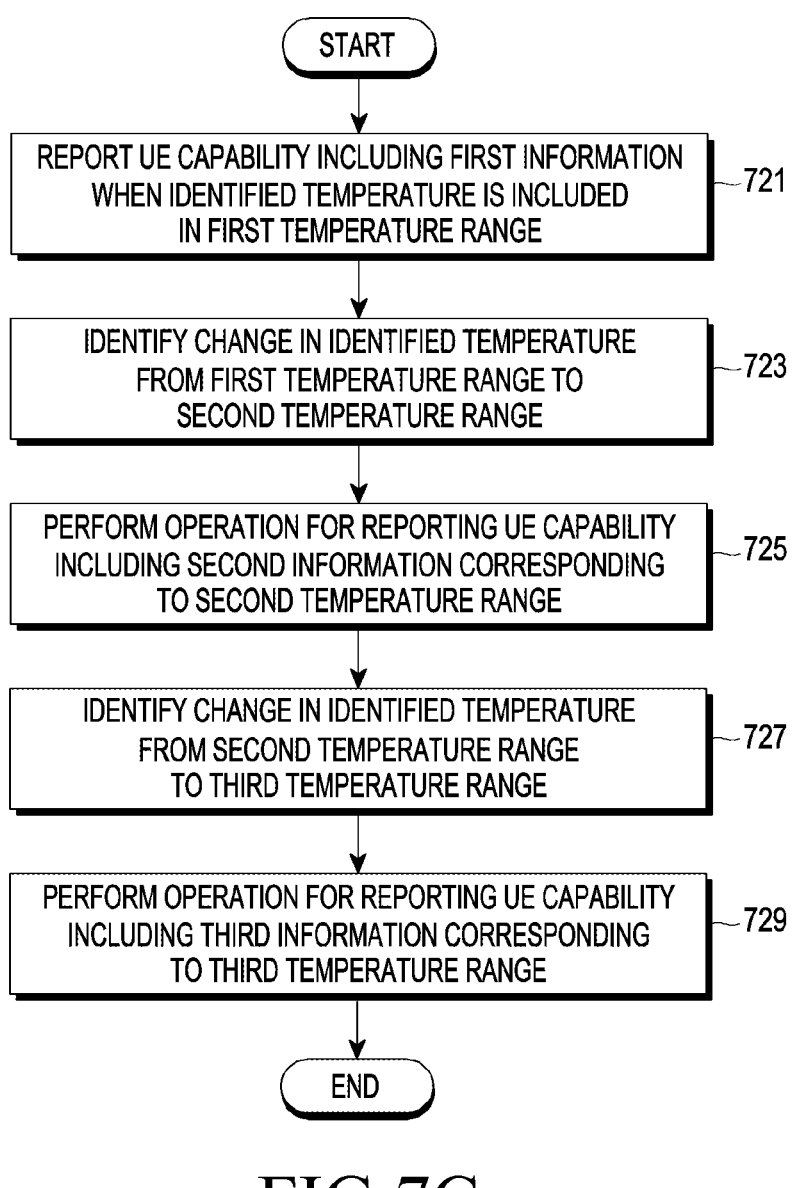

START

REPORT UE CAPABILITY INCLUDING FIRST INFORMATION
WHEN IDENTIFIED TEMPERATURE IS INCLUDED
IN FIRST TEMPERATURE RANGE — 721

IDENTIFY CHANGE IN IDENTIFIED TEMPERATURE
FROM FIRST TEMPERATURE RANGE TO
SECOND TEMPERATURE RANGE — 723

PERFORM OPERATION FOR REPORTING UE CAPABILITY
INCLUDING SECOND INFORMATION CORRESPONDING
TO SECOND TEMPERATURE RANGE — 725

IDENTIFY CHANGE IN IDENTIFIED TEMPERATURE
FROM SECOND TEMPERATURE RANGE
TO THIRD TEMPERATURE RANGE — 727

PERFORM OPERATION FOR REPORTING UE CAPABILITY
INCLUDING THIRD INFORMATION CORRESPONDING
TO THIRD TEMPERATURE RANGE — 729

END

FIG.7C

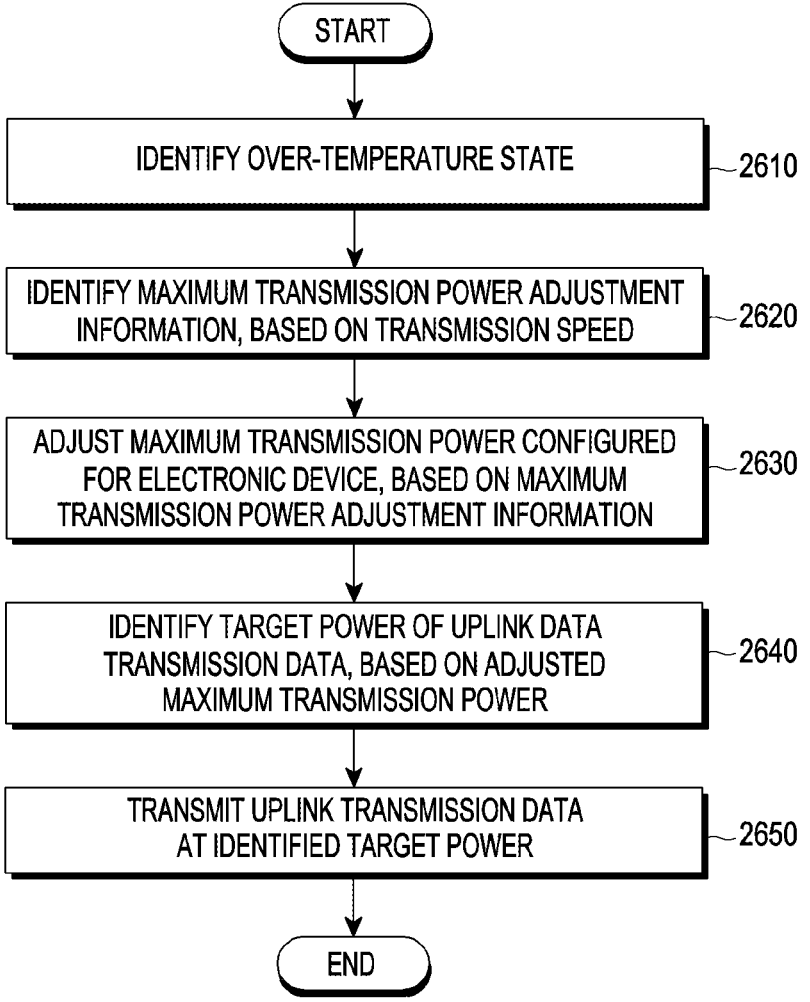

START

IDENTIFY OVER-TEMPERATURE STATE ~2610

IDENTIFY MAXIMUM TRANSMISSION POWER ADJUSTMENT INFORMATION, BASED ON TRANSMISSION SPEED ~2620

ADJUST MAXIMUM TRANSMISSION POWER CONFIGURED FOR ELECTRONIC DEVICE, BASED ON MAXIMUM TRANSMISSION POWER ADJUSTMENT INFORMATION ~2630

IDENTIFY TARGET POWER OF UPLINK DATA TRANSMISSION DATA, BASED ON ADJUSTED MAXIMUM TRANSMISSION POWER ~2640

TRANSMIT UPLINK TRANSMISSION DATA AT IDENTIFIED TARGET POWER ~2650

END

FIG.26

ELECTRONIC DEVICE PERFORMING OPERATION CORRESPONDING TO OVER-TEMPERATURE STATE AND METHOD FOR OPERATING THEREOF

CROSS-REFERENCE TO RELATED APPLICATIONS

This application is a continuation of International Application No. PCT/KR2022/002449 designating the United States, filed on Feb. 18, 2022, in the Korean Intellectual Property Receiving Office and claiming priority to Korean Patent Application No. 10-2021-0056914, filed on Apr. 30, 2021, in the Korean Intellectual Property Office, the disclosures of which are incorporated by reference herein in their entireties.

FIELD

The disclosure relates to an electronic device for performing an operation corresponding to an over-temperature state and a method of operating the same.

DESCRIPTION OF RELATED ART

In order to satisfy the increasing demand of radio data traffic after commercialization of a 4G communication system, a 5G communication system is being developed. The 5G communication system is being considered for implementation to use not only the conventionally used communication bands like those used by 3G and LTE but also a new band, for example, an ultra-high frequency band (for example, FR2 band) to achieve a high data rate. A plurality of antenna modules may be packaged into an electronic device supporting mmWave that is the ultra-high frequency band. A radio channel in mmWave has high straightness and large path loss due to a high frequency characteristic, and a highly directional beamforming technology is necessary to compensate therefor and a plurality of antenna modules are needed for the highly directional beamforming. For example, the electronic device may mount a plurality of antenna modules radiating signals in different directions.

A 5G communication technology may transmit a relatively large amount of data and consume higher power, and thus may potentially increase the temperature of an electronic device. For example, the electronic device cannot avoid consuming more current due to an increase in the use of a high frequency band and data throughput, and an antenna module being used or a peripheral area thereof may be over-heated according to an increase in heating. When a specific antenna module or a peripheral area thereof is over-heated, a user using the electronic device may be unpleasant and may suffer from a low-temperature burn. Components (for example, a battery) disposed close to the over-heated antenna module may have additional damage and also the overall performance of the electronic device may deteriorate. Further, the electronic device may be used after installation of various applications including a data transmission/reception function through 5G communication. When an application having an excessive amount of data transmission/reception through 5G communication is executed, the electronic device may further increase the heating due to an increase of the use of a high frequency band and data throughput.

SUMMARY

Embodiments of the disclosure provide an electronic device and a method of operating the which may perform only an operation which does not require a link with a network or change a UE capability along with the operation which does not require the link with the network based on the current state of at least one parameter of the UE capability in the over-temperature state.

According to various example embodiments, an electronic device includes: a plurality of antennas, and at least one processor, wherein the at least one processor is configured to: identify an over-temperature state of the electronic device, identify a current state of the electronic device for at least one parameter of a user equipment (UE) capability of the electronic device, based on identification of the over-temperature state, perform a first operation of reducing a number of antennas for reception among the plurality of antennas based on satisfying a specific condition by the current state of the electronic device for the at least one parameter, and perform the first operation and a second operation of changing at least some of the UE capability of the electronic device based on not satisfying the specific condition by the current state of the electronic device for the at least one parameter.

According to various example embodiments, a method of operating an electronic device including a plurality of antennas includes: identifying an over-temperature state of the electronic device; identifying a current state of the electronic device for at least one parameter of a user equipment (UE) capability of the electronic device based on identification of the over-temperature state; performing a first operation of reducing the number of antennas for reception among the plurality of antennas, based on satisfying a specific condition by the current state of the electronic device for the at least one parameter; and performing the first operation and a second operation of changing at least some of the UE capability of the electronic device based on not satisfying the specific condition by the current state of the electronic device for the at least one parameter.

According to various example embodiments, an electronic device includes: a plurality of antennas and at least one processor, wherein the at least one processor is configured to: identify an over-temperature state of the electronic device and perform a first operation of reducing the number of antennas for reception among the plurality of antennas and a second operation of changing at least some of a user equipment (UE) capability of the electronic device based on identification of the over-temperature state.

According to various example embodiments, an electronic device includes: a plurality of antennas and at least one processor, wherein the at least one processor is configured to: identify a current temperature of the electronic device, perform a first operation of reducing the number of antennas for reception among the plurality of antennas based on the current temperature of the electronic device included in a first temperature range, and perform a second operation of changing at least some of the a user equipment (UE) capability of the electronic device based on the current temperature of the electronic device included in a second temperature range different from the first temperature range.

According to various example embodiments, an electronic device capable of performing only an operation which does not require a link with a network or changing a UE capability along with the operation which does not require the link with the network based on the current state of at least one parameter of the UE capability in an over-temperature state, and a method of operating thereof can be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 6 is a flowchart illustrating an example method of operating an electronic device according to various embodiments;

FIG. 7A is a flowchart illustrating an example method of operating an electronic device according to various embodiments;

FIG. 7B is a flowchart illustrating an example method of operating the electronic device according to various embodiments;

FIG. 7C is a flowchart illustrating an example method of operating an electronic device according to various embodiments;

FIG. 26 is a flowchart illustrating an example method of operating an electronic device according to various embodiments.

DETAILED DESCRIPTION

Figure 1:
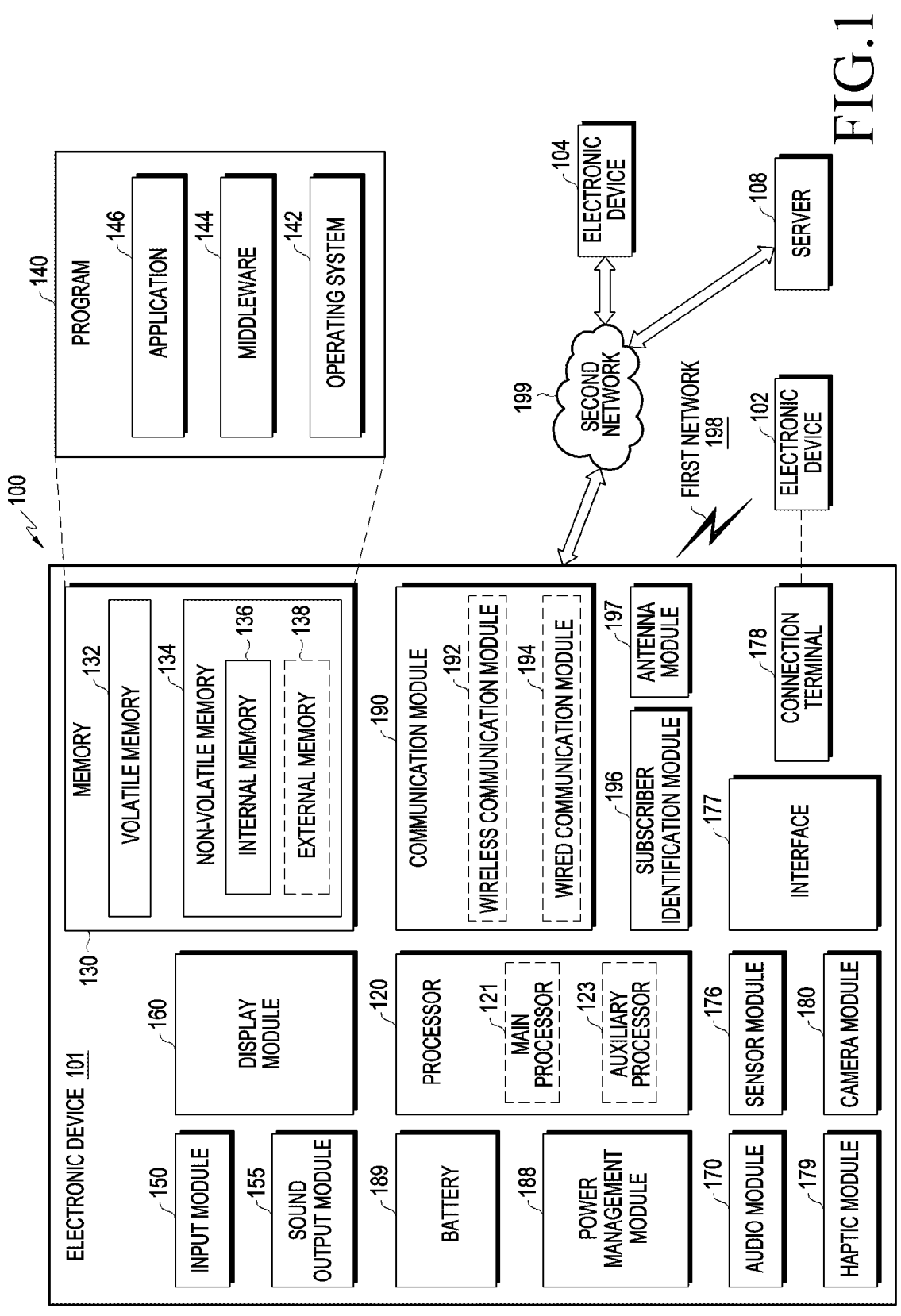
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specific function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
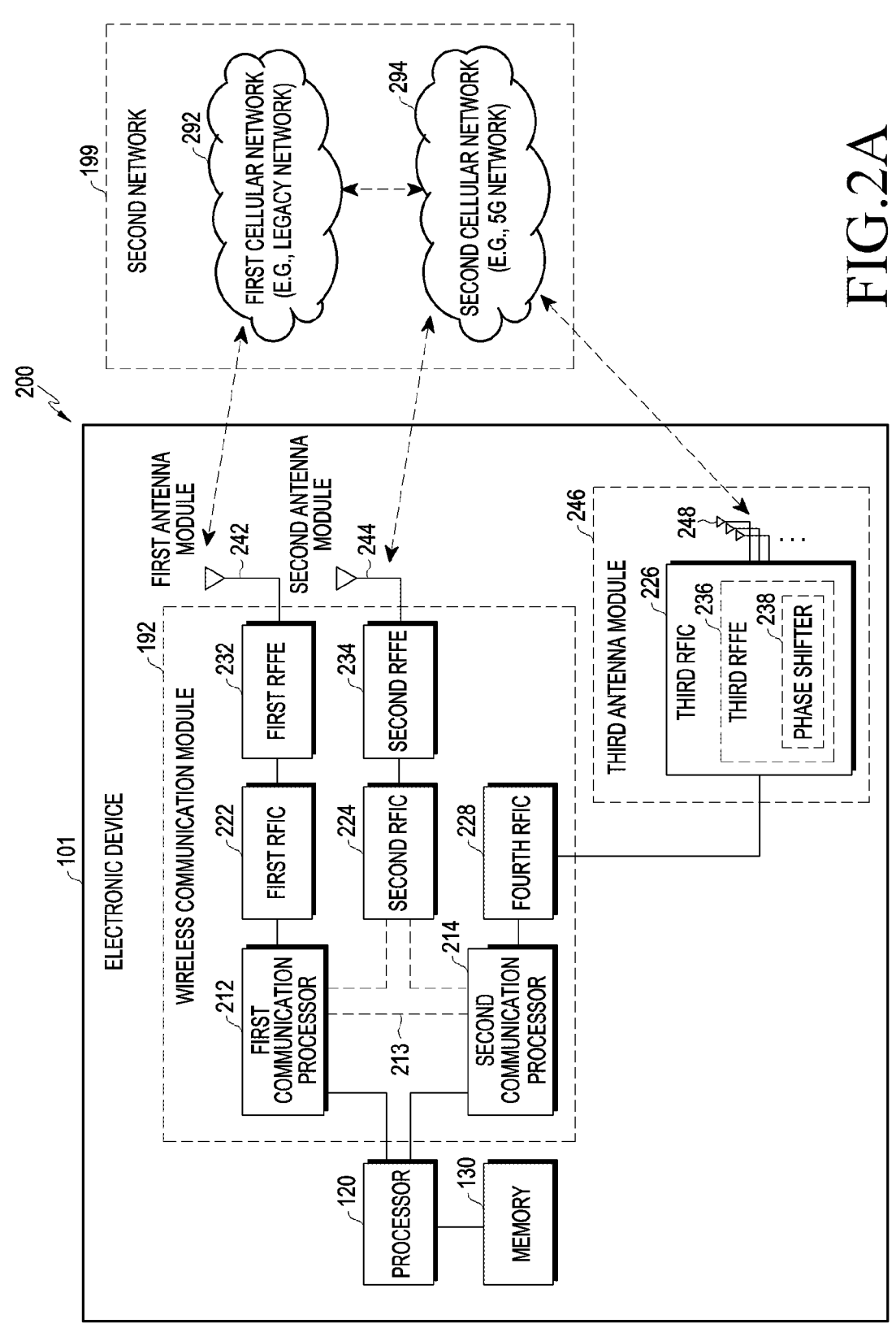
FIG. 2A is a block diagram illustrating an example configuration of an electronic device for supporting legacy network communication and 5G network communication according to various embodiments.

FIG. 2A is a block diagram 200 illustrating an example configuration of the electronic device 101 for supporting legacy network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include the processor 120 and the memory 130. The second network 199 may include a first cellular network 292 and a second cellular network 294. According to an embodiment, the electronic device 101 may further include at least one element among the elements illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may configure at least a portion of the wireless communication module 192. According to an embodiment, the fourth RFIC 228 may be omitted or may be included as a portion of the third RFIC 226.

The first communication processor 212 may include various processing circuitry and establish a communication channel in a band to be used for wireless communication with the first cellular network 292 and support legacy network communication through the established communication channel According to various embodiments, the first cellular network may be a legacy network including a second generation (2G), 3G, 4G, or long term evolution (LTE) network. The second communication processor 214 may include various processing circuitry and support establishment of a communication channel corresponding to a predetermined band (for example, about 6 GHz to about 60 GHz) among bands to be used for wireless communication with the second network 294 and 5G network communication through the established communication channel According to various embodiments, the second cellular network 294 may be a 5G network defined by the 3GPP. In addition, according to an embodiment, the first communication processor 212 or the second communication processor 214 may establish a communication channel corresponding to another predetermined band (for example, equal to or lower than about 6 GHz) among bands to be used for wireless communication with the second network 294 and support 5G network communication through the established communication channel.

The first communication processor 212 may transmit and receive data to and from the second communication processor 214. For example, data classified to be transmitted through the second cellular network 294 may be changed to be transmitted through the first cellular network 292. In this case, the first communication processor 212 may receive transmission data from the second communication processor 214. For example, the first communication processor 212 may transmit and receive data to and from the second communication processor 214 through an inter-processor interface 213. The inter-processor interface 213 may be implemented as, for example, a universal asynchronous receiver/transmitter (UART) (for example, a high speed-UART (HS-UART) or a peripheral component interconnect bus express (PCIe) interface), but there is no limitation thereto. Alternatively, the first communication processor 212 and the second communication processor 214 may exchange control information and packet data information through, for example, a shared memory. The first communication processor 212 may transmit and receive various pieces of information such as sensing information, information on an output intensity, and resource block (RB) allocation information to and from the second communication processor 214.

According to implementation, the first communication processor 212 may not be directly connected to the second communication processor 214. In this case, the first communication processor 212 may transmit and receive data to and from the second communication processor 214 through the processor 120 (for example, an application processor). For example, the first communication processor 212 and the second communication processor 214 may transmit and receive data to and from the processor 120 (for example, an application processor) through an HS-UART interface or a PCIe interface, but there is no limitation on the type thereof. Alternatively, the first communication processor 212 and the second communication processor 214 may exchange control information and packet data information with the processor 120 (for example, an application processor) through a shared memory.

Figure 2B:
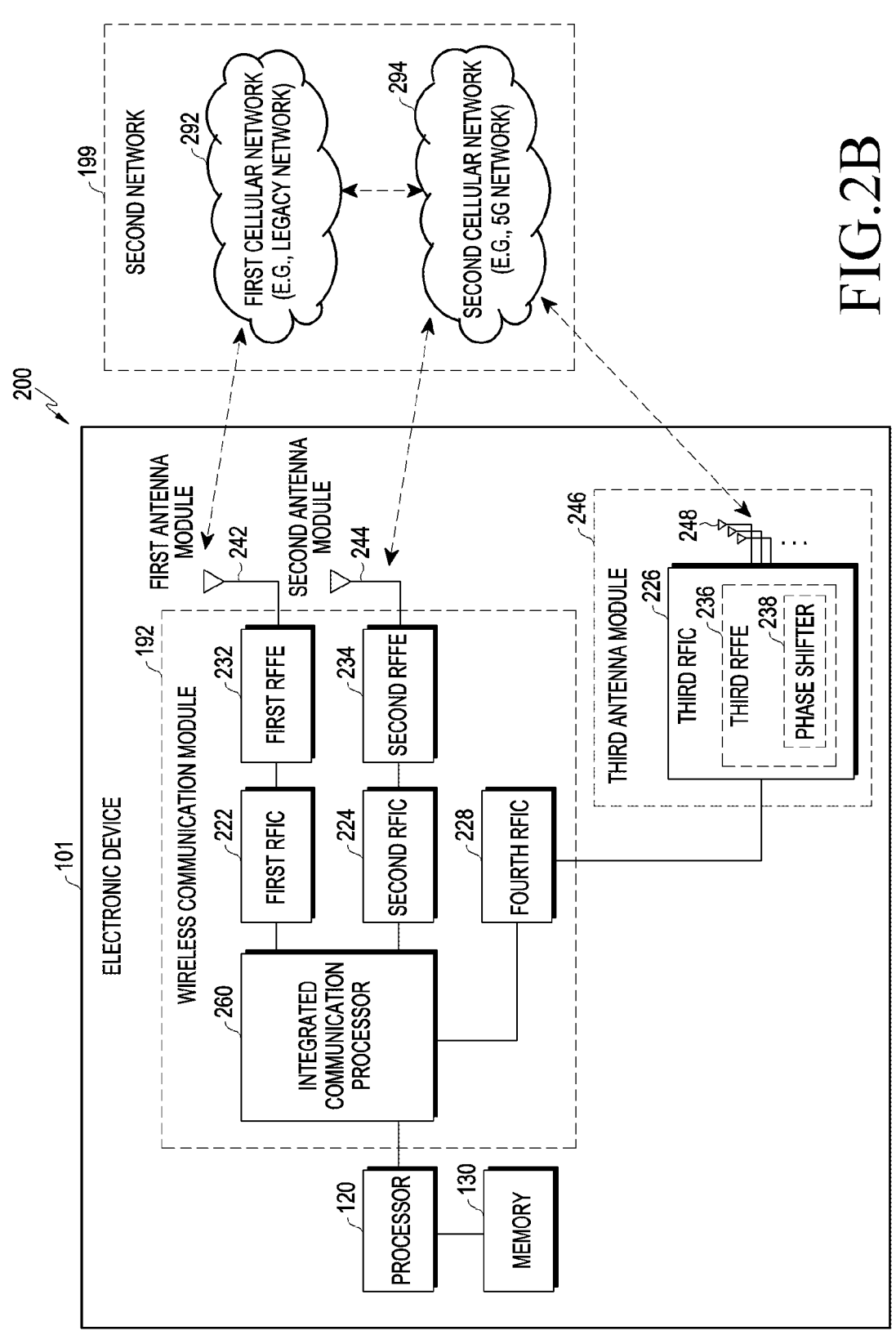
FIG. 2B is a block diagram illustrating an example configuration of an electronic device for supporting legacy network communication and 5G network communication according to various embodiments.

According to an embodiment, the first communication processor 212 and the second communication processor 214 may be implemented within a single chip or a single package. According to various embodiments, the first communication processor 212 or the second communication processor 214 may be configured with the processor 120, the auxiliary processor 123, or the communication module 190 within a single chip or a single package. For example, as illustrated in FIG. 2B, the communication processor 260 may include various processing circuitry and support all of the functions for communication with the first cellular network 292 and the second cellular network 294.

In transmission, the first RFIC 222 may convert a baseband signal generated by the first communication processor 212 into a radio frequency (RF) signal of about 700 MHz to about 3 GHz used for the first network 292 (for example, legacy network). In reception, the RF signal may be acquired from the first network 292 (for example, legacy network) through an antenna (for example, the first antenna module 242) and may be preprocessed through the RFFE (for example, first RFFE 232). The first RFIC 222 may convert the preprocessed RF signal into a baseband signal which can be processed by the first communication processor 212.

In transmission, the second RFIC 224 may convert a baseband signal generated by the first communication processor 212 or the second communication processor 214 into an RF signal (hereinafter, referred to as a 5G Sub6 RF signal) in a Sub6 band (for example, equal to or lower than about 6 GHz) used in the second network 294 (for example, 5G network). In reception, a 5G Sub6 RF signal may be acquired from the second cellular network 294 (for example, 5G network) through an antenna (for example, the second antenna module 244) and may be preprocessed through the RFFE (for example, second RFFE 234). The second RFIC 224 may convert the preprocessed 5G Sub6 RF signal into a baseband signal which can be processed by the corresponding communication processor among the first communication processor 212 or the second communication processor 214.

The third RFIC 226 may convert a baseband signal generated by the second communication processor 214 into an RF signal (hereinafter, referred to as a 5G Above6 RF signal) in a 5G Above6 band (for example, from about 6 GHz to about 60 GHz) used by the second cellular network 294 (for example, 5G network). In reception, a 5G Above6 RF signal may be acquired from the second cellular network 294 (for example, 5G network) through an antenna (for example, the antenna 248) and may be preprocessed through the third RFFE 236. The third RFIC 226 may convert the preprocessed 5G Above6 RF signal into a baseband signal which can be processed by the second communication processor 214. According to an embodiment, the third RFFE 236 may be configured as a portion of the third RFIC 226.

The electronic device 101 may include the fourth RFIC 228 separately from the third RFIC 226 or as at least a portion thereof. In this case, after converting a baseband signal generated by the second communication processor 214 into an RF signal (hereinafter, referred to as an IF signal) in an intermediate frequency band (for example, about 9 GHz to about 11 GHz), the fourth RFIC 228 may transmit the IF signal to the third RFIC 226. The third RFIC 226 may convert the IF signal into a 5G Above6 RF signal. In reception, a 5G Above6 RF signal may be received from the second network 294 (for example, 5G network) through an antenna (for example, antenna 248) and converted into an IF signal by the third RFIC 226. The fourth RFIC 228 may convert the IF signal into a baseband signal which can be processed by the second communication processor 214.

According to an embodiment, the first RFIC 222 and the second RFIC 224 may be implemented as at least a portion of a single chip or a single package. According to various embodiments, when the first RFIC 222 and the second RFIC 224 are implemented as a single chip or a single package in FIG. 2A or FIG. 2B, they may be implemented as an integrated RFIC. In this case, the integrated RFIC may be connected to the first RFFE 232 and the second RFFE 234 and convert the baseband signal into a signal in the band supported by the first RFFE 232 and/or the second RFFE 234, and transmit the converted signal to one of the first RFFE 232 and the second RFFE 234. According to an embodiment, the first RFFE 232 and the second RFFE 234 may be implemented as at least a portion of a single chip or a single package. According to an embodiment, at least one of the first antenna module 242 or the second antenna module 244 may be omitted or may be combined with the other antenna module to process RF signals in a plurality of corresponding bands.

According to an embodiment, the third RFIC 226 and the antennas 248 may be arranged on the same substrate to configure the third antenna module 246. For example, the wireless communication module 192 or the processor 120 may be disposed on a first substrate (for example, main PCB). In this case, the third RFIC 226 may be disposed in a partial area (for example, bottom side) of a second substrate (for example, sub PCB) separated from the first substrate and the antennas 248 may be disposed in another partial area (for example, top side) to configure the third antenna module 246. By placing the third RFIC 226 and the antennas 248 on the same substrate, it is possible to reduce a length of a transmission line therebetween. This is to reduce loss (for example, attenuation) of the signal in a high frequency band (for example, about 6 GHz to about 60 GHz) used for, for example, 5G network communication due to the transmission line. Accordingly, the electronic device 101 may increase a quality or a speed of communication with the second network 294 (for example, 5G network).

According to an embodiment, the antenna 248 may be configured as an antenna array including a plurality of antenna elements which can be used for beamforming. In this case, the third RFIC 226 may include, for example, a plurality of phase shifters 238 corresponding to the plurality of antenna elements as a portion of the third RFFE 236. In transmission, each of the plurality of phase shifters 238 may convert a phase of a 5G Above6 RF signal to be transmitted to the outside of the electronic device 101 (for example, a base station of the 5G network) through a corresponding antenna element. In reception, each of the plurality of phase shifters 238 may convert the phase of the 5G Above6 RF signal received from the outside through the corresponding antenna element into the same phase or substantially the same phase. This enables transmission or reception through beamforming between the electronic device 101 and the outside.

The second cellular network 294 (for example, 5G network) may operate independently from the first cellular network 292 (for example, legacy network) (for example, stand-alone (SA)) or operate through a connection to thereto (for example, non-stand alone (NSA)). For example, in the 5G network, only an access network (for example, a 5G radio access network (RAN) or a next generation RAN (NG RAN)) may exist without a core network (for example, a next generation core (NGC)). In this case, the electronic device 101 may access the access network of the 5G network and then access an external network (for example, Internet) under the control of the core network (for example, evolved packed core (EPC) of the legacy network. Protocol information (for example, LTE protocol information) for communication with the legacy network or protocol information (for example, new radio (NR) protocol information) for communication with the 5G network may be stored in the memory 230 and may be accessed by another element (for example, the processor 120, the first communication processor 212, or the second communication processor 214).

Figure 3:
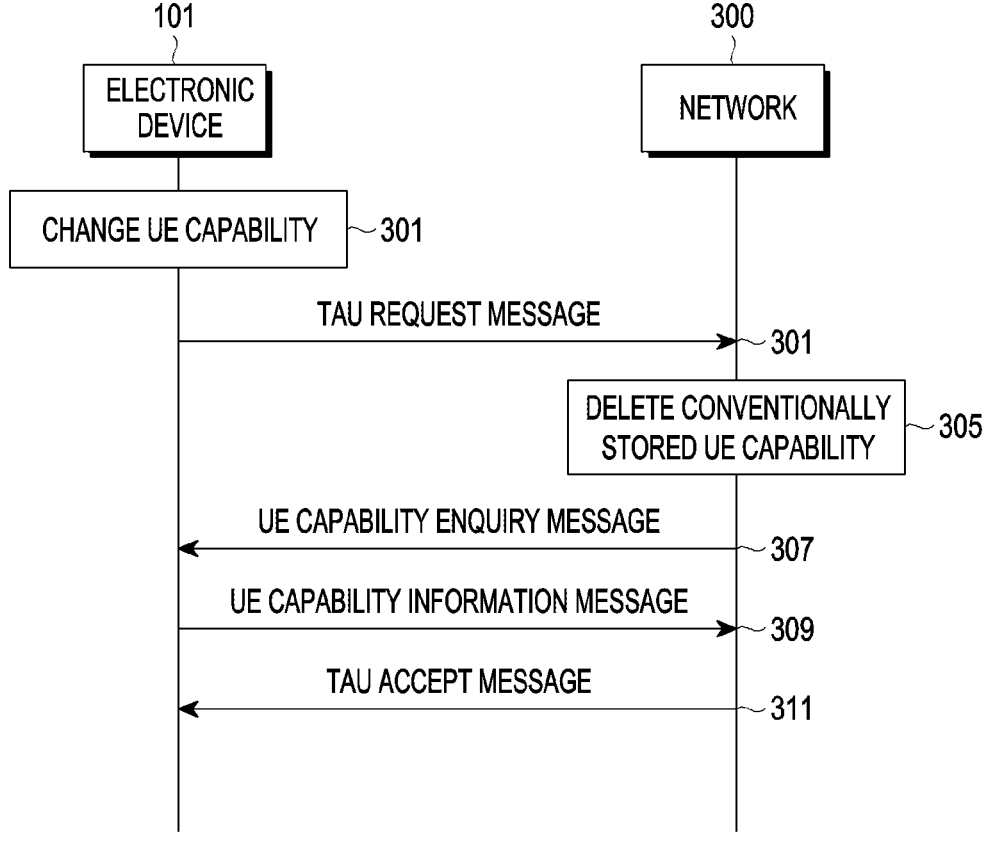
FIG. 3 is a signal flow diagram illustrating an example method of operating an electronic device and a network according to various embodiments.

FIG. 3 is a signal flow diagram illustrating an example method of operating an electronic device and a network according to various embodiments.

According to various embodiments, the electronic device 101 (for example, at least one of the processor 120, the first communication processor 212, the second communication processor 214, or the integrated communication processor 260) may change a UE capability in operation 301. For example, the UE capability may be files and/or data (or data tables) which can be stored in a memory (for example, the memory 130 or at least one communication processor of FIG. 1 and/or a referenced memory) of the electronic device 101. The UE capability may include an information element for generating a UE capability information message. A change in the UE capability may be a change in at least some of a plurality of information elements included in the UE capability. The electronic device 101 may change the UE capability based on detection of an event requiring the change in the UE capability, and the event according to various embodiments are described below.

According to various embodiments, the electronic device 101 may transmit a TAU (Tracking Area Update) request message to the network 300 in operation 303. For example, the electronic device 101 may transmit a TAU request message including an information element of "UE radio capability information update needed" to the network 300. The purpose of the information element of "UE radio capability information update needed" is to indicate whether the network deletes the stored UE capability information. The information element of "UE radio capability information update needed" may include, for example, a field of "URC upd" of octet 1, which may be expressed in the form of a flag. For example, "1" of the "URC upd" field may indicate that a request for updating the UE capability is made, and "0" of the URC upd" field may indicate that a request for updating the UE capability is not made. For example, the electronic device 101 may transmit the TAU request message including the information element of "UE radio capability information update needed" having the "URC upd" field of "1" to the network 300. The network 300 may delete the pre-stored UE capability based on reception of the TAU request message in operation 305. For example, the UE capability stored in the network 300 may be information (for example, files and/or data (or data tables) based on at least one information element included in the UE capability information message received from a specific UE (for example, the electronic device 101).

According to various embodiments, the network 300 may transmit a UE capability enquiry message to the electronic device 101 in operation 307. For example, the network 300 may transmit the UE capability inquiry message when (additional) UE capability information is required in an RRC-connected state. For example, the network 300 may make the UE capability enquiry after AS security activation. The electronic device 101 may transmit a UE capability information message to the network 300 based on reception of the UE capability enquiry message in operation 309. For example, the electronic device 101 may generate the UE capability information message based on at least a portion of the UE capability stored in the electronic device 101. For example, the UE capability information message may include information elements of the changed UE capability. A process of transmitting and receiving the UE capability enquiry message and the UE capability information message may be named a UE capability transfer process. After the UE capability transfer process, the network 300 may transmit a TAU accept message in operation 311. According to the above description, the network 300 may identify the UE capability changed by the electronic device 101, so that UE capabilities of the electronic device 101 and the network 300 may match each other.

Figure 4:
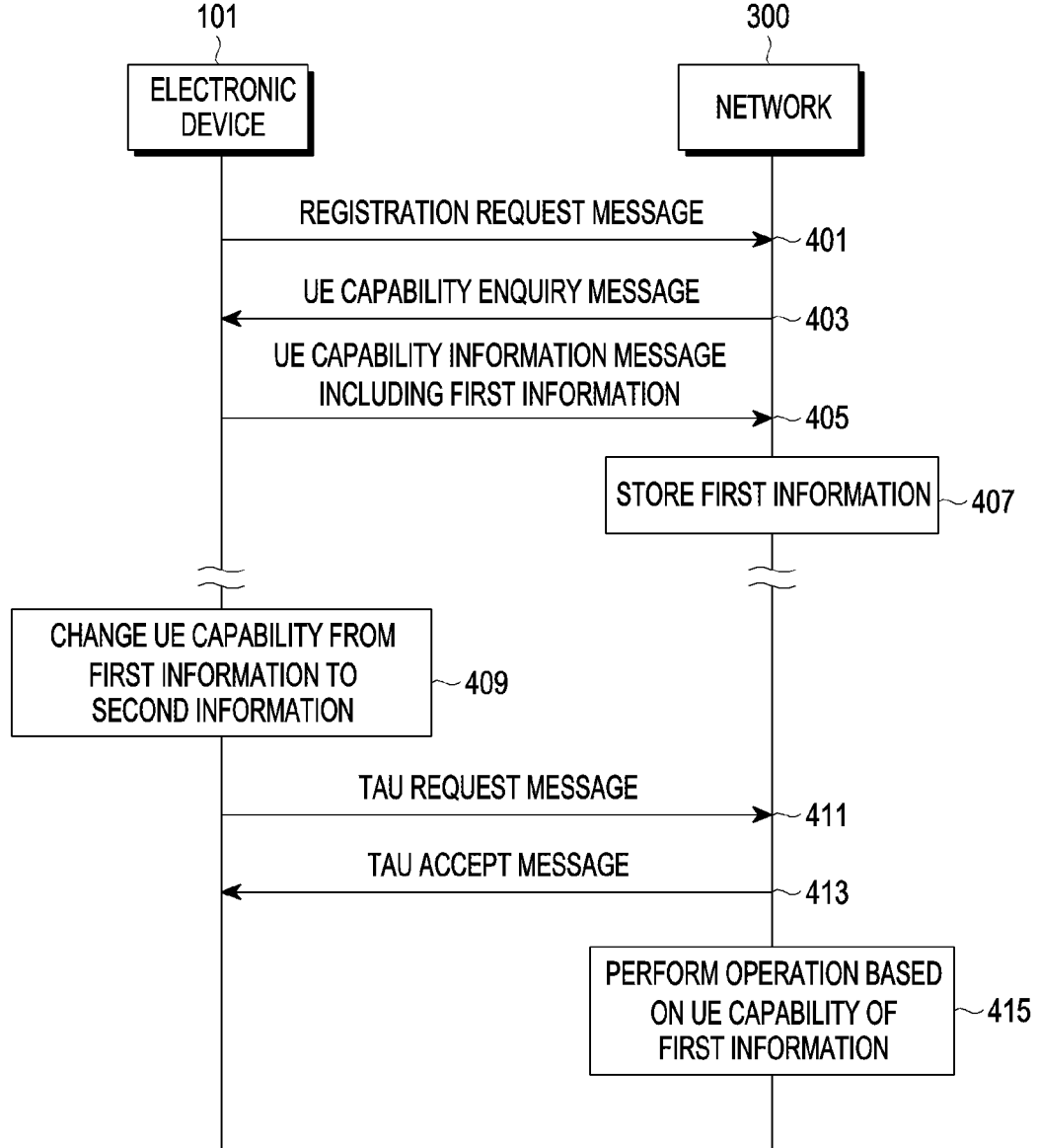
FIG. 4 is a signal flow diagram illustrating an example method of operating an electronic device and a network according to a comparative example with various embodiments.

FIG. 4 is a signal flow diagram illustrating an example method of operating an electronic device and a network according to a comparative example with various embodiments. At least some of the operations of the electronic device 101 according to the comparative example may also be performed by the electronic device 101 according to various embodiments.

According to the comparative example, the electronic device 101 (for example, at least one of the processor 120, the first communication processor 212, the second communication processor 214, or the integrated communication processor 260) may transmit a registration request message to the network 300 in operation 401. For example, the electronic device 101 may transmit an attach request message when registration in an evolved packet core (EPC) is required or transmit a registration request message when registration in a 5th generation core (5GC) is required, but there is no limitation. The network 300 may transmit a UE capability enquiry message to the electronic device 101 in operation 403. The electronic device 101 may transmit a UE capability information message including first information to the network 300 in operation 405. The first information may be, for example, at least one information element. In operation 407, the network 300 may store the first information included in the UE capability information message as a UE capability for the electronic device 101. Accordingly, after registering the electronic device 101 in the core network, the network 300 may store and/or manage the UE capability of the electronic device 101. The network 300 may allocate resources to the electronic device 101 and/or control the electronic device 101 based on the UE capability.

According to the comparative example, the electronic device 101 may change the UE capability from the first information to second information in operation 409. For example, the electronic device 101 may change the UE capability when an over-temperature state is detected, but there is no limitation in an event configured to the change, which will be described in greater detail below. The electronic device 101 may transmit a TAU request message including an information element of "UE radio capability information update needed" having a "URC upd" field of "1" to the network 300 in operation 411. The network 300 may transmit a TAU accept message corresponding to the TAU request message to the electronic device 101 in operation 413. The network 300 may transmit the TAU accept message to the electronic device 101 without performing the UE capability transfer process. For example, in connection with the UE capability transfer process, when the UE make a request for changing the UE capability, the UE may make a request for required NAS procedures to higher layers in the 3GPP, which enables an update of the UE capability through a new RRC connection. However, in the 3GPP, the UE capability transfer process is not forcibly performed immediately in response to reception of the TAU accept message by the network 300, and accordingly, the UE capability transfer process may not be immediately performed according to implementation of the network 300. For example, when the electronic device 101 is transmitting and receiving data in the RRC-connected state, the network 300 may suspend the UE capability transfer process, and the UE capabilities of the electronic device 101 and the network 300 may not match each other during the suspension period. For the suspension period, the network 300 may not transmit an RRC release message.

In this case, the network 300 may identify the change of the UE capability of the electronic device 101 from the first information to the second information. Accordingly, the network 300 may continuously identify that the UE capability of the electronic device 101 is the stored first information. The network 300 may perform an operation based on the UE capability of the first information in operation 415. Due to mismatching between the second information of the UE capability managed by the electronic device 101 and the first information of the UE capability of the electronic device 101 managed by the network 300, the operation of the network 300 may cause problems. For example, when the electronic device 101 changes the UE capability from the first information to the second information in order to suppress heating in the over-temperature state, it is highly likely not to resolve the over-temperature state of the electronic device 101 if the network 300 operates based on the first information. For example, the network 300 may maintain the existing bandwidth, instruct transmission of an SRS or instruct CA or DC, which intensifies the over-temperate state. Alternatively, the network 300 may perform an operation (for example, handover command, CA command, or SCG addition command) for a band which the electronic device 101 does not support any more based on the first information before the change, in which case the electronic device 101 may not conduct the corresponding command. As described above, the problem due to mismatching of the UE capability may occur, and thus rapid synchronization of the UE capabilities of the electronic device 101 and the network 300 may be needed.

Figure 5A:
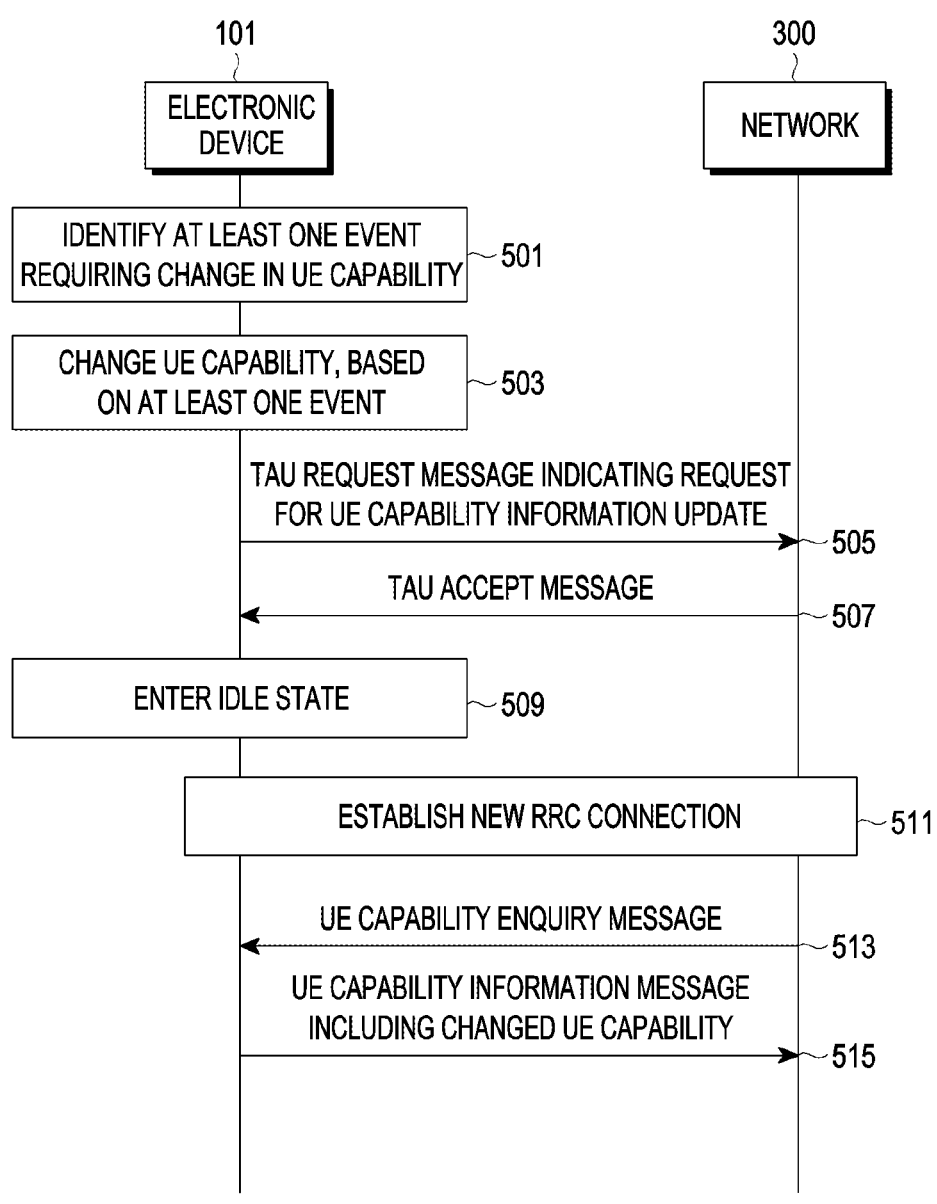
FIG. 5A is a signal flow diagram illustrating an example method of operating an electronic device and a network according to various embodiments.

FIG. 5A is a signal flow diagram illustrating an example method of operating an electronic device and a network according to various embodiments.

According to various embodiments, the electronic device 101 (for example, at least one of the processor 120, the first communication processor 212, the second communication processor 214, or the integrated communication processor 260) may identify at least event requiring a change in the UE capability in operation 501. In one example, the electronic device 101 may identify acquisition of information related to the over-temperature state as the event requiring the change in the UE capability. In one example, the electronic device 101 may identify acquisition of information related to lack of battery capacity as the event requiring the change in the UE capability. The lack of the battery capacity may be identified when, for example, the battery capacity is lower than or equal to a predetermined (e.g., specified) threshold capacity (for example, 15%), but there is no limitation. In one example, the electronic device 1001 may identify acquisition of a deactivation command for a specific RAT (or specific communication) according to a user control as the event requiring the change in the UE capability. In one example, the electronic device 101 may identify satisfaction of a condition requiring deactivation of a specific RAT (or specific communication) as the event requiring the change in the UE capability. The condition requiring deactivation of a specific RAT (or specific communication) may include at least one operation related to, for example, the generation of cell reselection in a boundary area of a serving cell, RACH failure for a specific cell, or a Wi-Fi call, which will be described below.

According to various embodiments, the electronic device 101 may change the UE capability based on at least one event in operation 503. In one example, when the generation of at least one event is identified, the electronic device 101 may change an information element configured by default regardless of the type of at least one event. In this case, a setting value of the information element may be configured as a fixed value. There is no limitation in the type and/or a change value of the information element to be changed. In another example, when the generation of at least one event is identified, the electronic device 101 may change the information element configured by default regardless of the type of at least one event, but may determine a setting value of the information element (or a change degree) based on information on at least one event. In another example, when the generation of at least one event is identified, the electronic device 101 may select an information element to be changed based on the type of at least one event. In this case, the setting value of the information element may be configured as a fixed value. In another example, when the generation of at least one event is identified, the electronic device 101 may select an information element to be changed based on the type of at least one event and determine a setting value (or change degree) of the information element based on information on at least one event. Meanwhile, the operation of changing the UE capability of the electronic device 101 (for example, operation 503) is performed after the event identification information (for example, operation 501) before other operations are performed, but it is only on example, and there is no limitation in a time point at which the operation of changing the UE capability is performed.

According to various embodiments, the electronic device 101 may transmit a TAU request message indicating that an update of the UE capability information is requested to the network 300 in operation 505. For example, the electronic device 101 may transmit a TAU request message including an information element of "UE radio capability information update needed" having a "URC upd" field of "1" to the network 300. The network 300 may transmit a TAU accept message corresponding to the TAU request message to the electronic device 101 in operation 507. The network 300 may transmit the TAU accept message to the electronic device 101 without performing the UE capability transfer process.

According to various embodiments, the electronic device 101 may enter an idle state based on reception of the TAU accept message in the state in which the UE capability enquiry message is not received in operation 509. Reception of the TAU accept message in the state in which the UC capability enquiry message is not received may refer, for example, to the network 300 suspending the UE capability transfer procedure, and the electronic device 101 may enter the idle state in order to rapidly perform the UE capability transfer procedure. Meanwhile, in an embodiment, the electronic device 101 may enter the idle state based on non-reception of the UE capability enquiry message until a predetermined threshold time passes after the TAU request message is transmitted, and a condition for entering the idle state has no limitation if the UE capability enquiry message is not received and thus a UE capability information message is not transmitted. Entry of the electronic device 101 into the idle state may be expressed as, for example, performance of local release of the RRC connection or declaration of radio link failure (RLF), but there is no limitation. The electronic device 101 may establish a new RRC connection with the network 300 in the idle state in operation 511. For example, the electronic device 101 may perform at least one operation for establishing the new RRC connection without performing RRC re-establishment based on local release of the RRC connection or declaration of RLF. For example, the electronic device 101 may transmit an RRC connection request message (for example, RRC Connection Request message of E-UTRA or RRC Setup Request message of NR) to the network 300 based on reception of the TAU accept message in the state in which the UE capability enquiry message is not received. The electronic device 101 may receive an RRC connection setup message (for example, RRC Connection Setup message of E-UTRA or RRC Setup message of NR) corresponding to the RRC connection request message from the network 300. The electronic device 101 may transmit an RRC connection setup completion message (for example, RRC Connection Setup Complete message of E-UTRA or RRC Setup Complete message of NR) corresponding to the RRC connection setup message. According to the above-described procedure, the new RRC connection may be established between the electronic device 101 and the network 300 without re-establishment of the existing RRC connection.

According to various embodiments, the electronic device 101 may receive a UE capability enquiry message from the network 300 in operation 513. Since the new RRC connection is established, the network 300 may transmit the UE capability enquiry message. The electronic device 101 may transmit a UE capability information message including the changed UE capability to the network 300 based on reception of the UE capability enquiry message in operation 515. The network 300 may store and/or manage the changed UE capability. According to the above description, transmission of the UE capability may be substantially immediately performed without any suspension, and thus a possibility of the occurrence of the problem due to mismatching between UE capabilities of the electronic device 101 and the network 300 may be reduced. Further, a time spend for establishing the new RRC connection may be relatively shorter. Accordingly, a data packet generated for a connection establishment time can be processed only through a retransmission operation of a higher layer, so a possibility of influence on a service may be low.

Figure 5B:
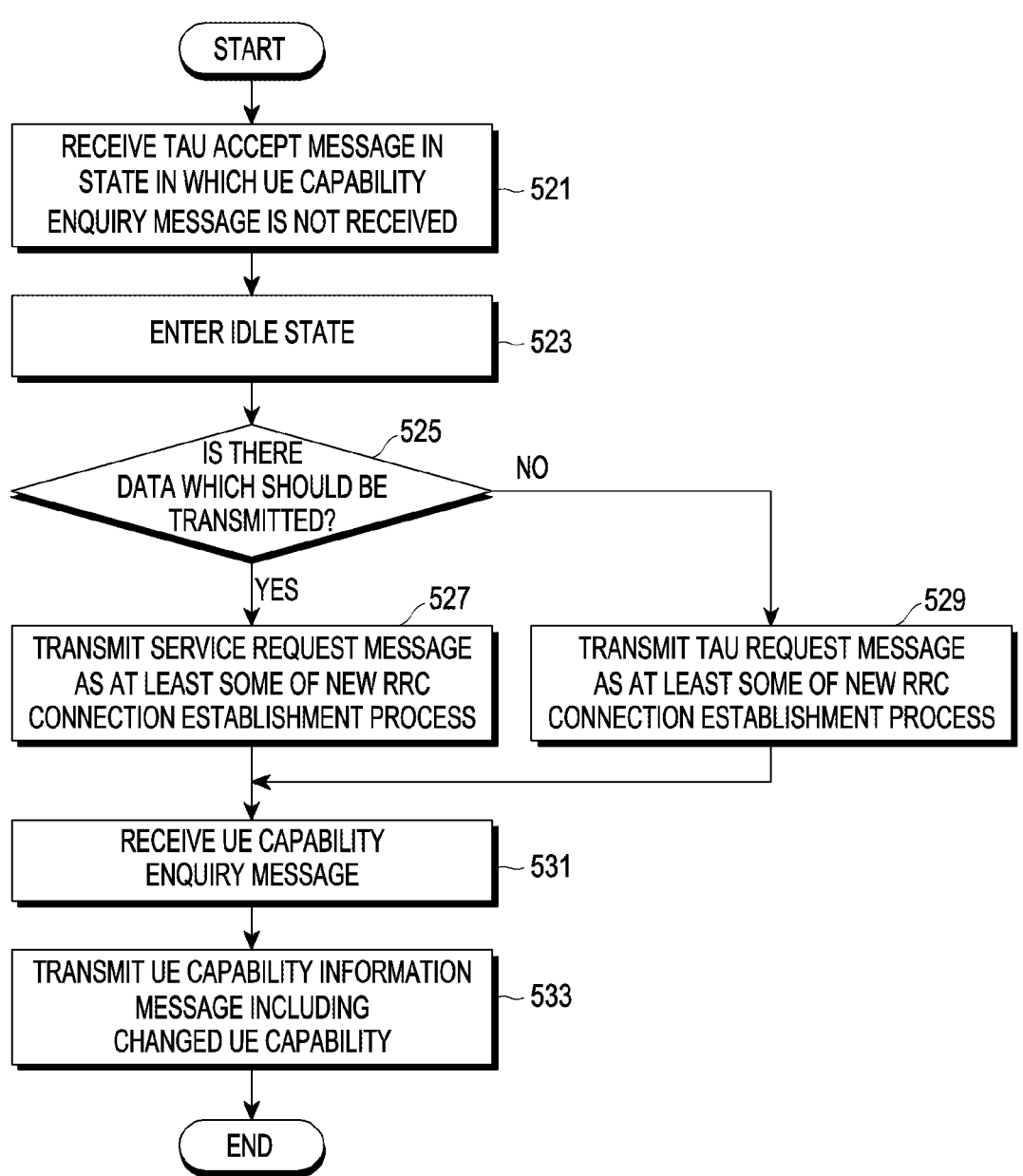
FIG. 5B is a flowchart illustrating an example method of operating the electronic device according to various embodiments.

FIG. 5B is a flowchart illustrating an example method of operating an electronic device according to various embodiments.

According to various embodiments, the electronic device 101 (for example, at least one of the processor 120, the first communication processor 212, the second communication processor 214, or the integrated communication processor 260) may receive a TAU accept message in that state in which a UE capability enquiry message is not received in operation 521. For example, as illustrated in FIG. 5A, the electronic device 101 may change the UE capability and transmit the TAU request message indicating that an update of UE capability information is requested. The electronic device 101 may receive the TAU accept message in the state in which reception of the UE capability enquiry message has failed in operation 521 after TAU transmission. As illustrated in FIG. 5A, the electronic device 101 may enter an idle state based on reception of the TAU accept message in the state in which the UE capability enquiry message is not received in operation 523. Meanwhile, as described above, in this embodiment and various embodiments, it may be understood by those skilled in the art that a triggering for entry into the idle state may be replaced with satisfaction of another condition (For example, failure in reception of the UE capability enquiry message within a preset period).

According to various embodiments, the electronic device 101 may determine whether there is data which should be transmitted to the network 300 in operation 525. When there is data which should be transmitted (Yes of operation 525), the electronic device 101 may transmit a service request message to the network 300 through at least a portion of the process of establishing a new RRC connection in operation 527. For example, the electronic device 101 may transmit an RRC connection request message to the network 300 and receive an RRC connection setup message from the network 300. The electronic device 101 may transmit an RRC connection setup completion message including the service request message to the network 300. The network 300 may allocate radio resources and/or network resources to the electronic device 101 based on the service request message and transmit and receive data (or traffic) thereafter. According to transmission of the RRC connection setup completion message including the service request message, data transmission may be performed.

According to various embodiments, when there is no data which should be transmitted (No of operation 525), the electronic device 101 may transmit a TAU request message to the network 300 through at least a portion of the process of establishing a new RRC connection in operation 529. For example, the electronic device 101 may transmit an RRC connection request message to the network 300 and receive an RRC connection setup message from the network 300. The electronic device 101 may transmit an RRC connection setup completion message including the TAU request message to the network 300. The electronic device 101 may receive a UE capability enquiry message from the network 300 in operation 531. The electronic device 101 may transmit a UE capability information message including the changed UE capability to the network 300 in operation 533. Accordingly, the changed UE capability may be shared with the network 300.

Figure 5C:
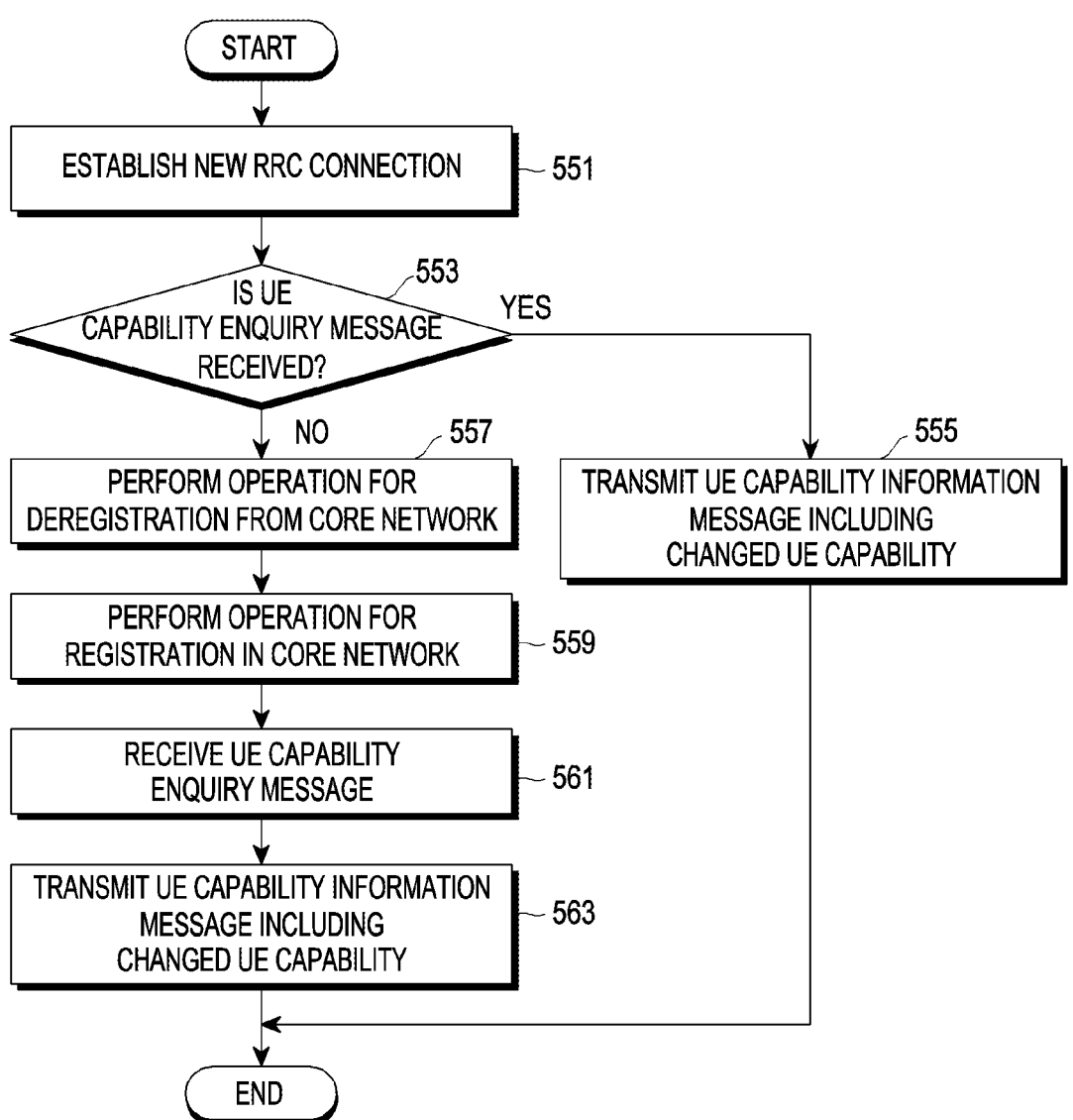
FIG. 5C is a flowchart illustrating an example method of operating the electronic device according to various embodiments.

FIG. 5C is a flowchart illustrating an example method of operating an electronic device according to various embodiments.

According to various embodiments, the electronic device 101 (for example, at least one of the processor 120, the first communication processor 212, the second communication processor 214, or the integrated communication processor 260) may establish a new RRC connection in operation 551. As illustrated in FIG. 5A, the electronic device 101 may enter an idle state based on reception of the TAU accept message in the state in which the UE capability enquiry message is not received. The electronic device 101 may perform at least one operation for establishing the new RRC connection in the idle state. Accordingly, the new RRC connection may be established between the electronic device 101 and the network 300. Although FIG. 5A illustrates that the UE capability is transmitted after establishment of the new RRC connection, the UE capability may not be transmitted even after the new RRC connection according to implementation of the network 300.

According to various embodiments, the electronic device 101 may determine whether the UE capability enquiry message is received from the network 300 in operation 553. When the UE capability enquiry message is received (Yes of operation 553), the electronic device 101 may transmit a UE capability information message including the changed UE capability to the network 300 in operation 555. This may be the UE capability transfer process based on the new RRC connection illustrated in FIG. 5A. Non-reception of the UE capability enquiry message may refer, for example, to the UE capability not being transmitted. When the UE capability enquiry message is not received (No of operation 553), the electronic device 101 may perform an operation for deregistration from the core network in operation 557. For example, the electronic device 101 may perform the operation for releasing registration in the core network based on non-reception of the UE capability enquiry message for a predetermined period. The electronic device 101 may perform the operation for releasing registration in the core network based on identification of another event (for example, reception of a message in a different type from the network 300) in the state in which the UE capability enquiry message is not received, and there is no limitation in the reference for determining non-reception of the UE capability enquiry message. The electronic device 101 may transmit a message for releasing registration (for example, a detach request message for the EPC or a deregistration request message for the 5GC) to the network 300 as the operation for releasing registration in the core network. The network 300 may deregister the electronic device 101 based on reception of the message for deregistration. For example, the network 300 may delete information related to the electronic device 101 (for example, UE context). The network 300 may transmit a message for accepting deregistration (for example, a detach request message for the EPC or a deregistration request message for the 5GC) to the electronic device 101.

According to various embodiments, the electronic device 101 may perform an operation for registration in the core network after deregistration in operation 559. For example, the electronic device 101 may transmit a registration request message (for example, an attach request message for the EPC or a registration request message for the 5GC) and receive a registration accept message (For example, an attach accept message for the EPC or a registration accept message for the 5GC) from the network 300 in response thereto. Meanwhile, since the network 300 has deleted all of the UE context for the electronic device 101, the UE capability may be required. The electronic device 101 may receive a UE capability enquiry message from the network 300 in operation 561. The electronic device 101 may transmit a UE capability information message including the changed UE capability to the network 300 in response to the UE capability enquiry message in operation 563. Accordingly, even when the UE capability is not updated after establishment of the new RRC connection, UE capabilities of the electronic device 101 and the network 300 may be synchronized.

Figure 5D:
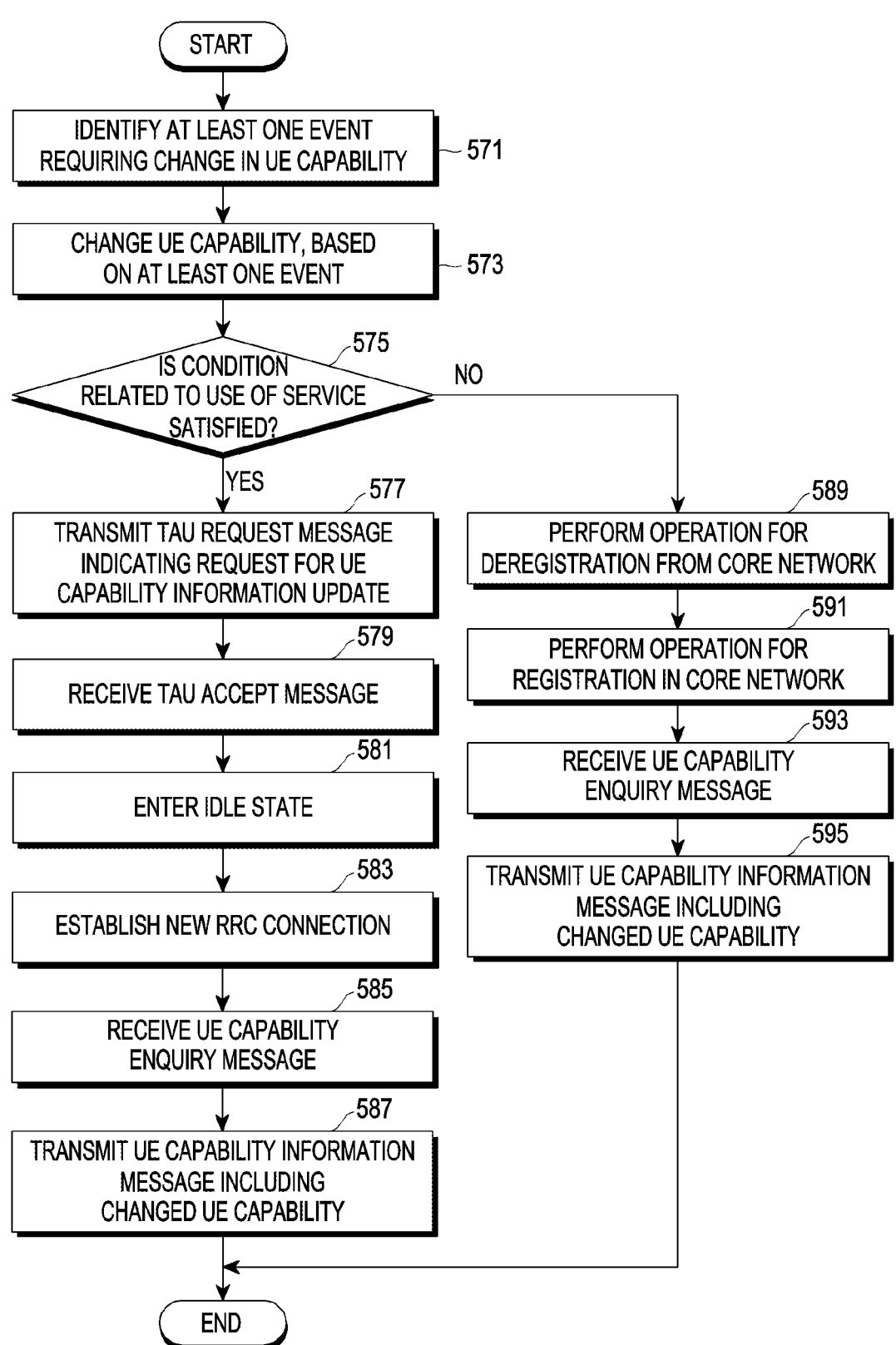
FIG. 5D is a flowchart illustrating an example method of operating the electronic device according to various embodiments.

FIG. 5D is a flowchart illustrating an example method of operating the electronic device according to various embodiments.

According to various embodiments, the electronic device 101 (for example, at least one of the processor 120, the first communication processor 212, the second communication processor 214, or the integrated communication processor 260) may identify at least event requiring a change in the UE capability in operation 571. In operation 573, the electronic device 101 may change the UE capability based on at least one event. An event identification and a UE capability change have been described with reference to FIG. 5A, so detailed description thereof may not be repeated.

According to various embodiments, the electronic device 101 may determine whether a condition related to the use of a service is satisfied in operation 575. For example, the electronic device 101 may determine whether the condition related to the use of the service is satisfied based on the existence or non-existence of a TCP/UDP connection. Meanwhile, any condition for determining whether the service (for example, transmission and reception of user data) is currently being used and/or is scheduled to be used can be the condition related to the use of the service. Alternatively, for example, when the number of connections established based on the TCP/UDP satisfies a predetermined (e.g., specified) condition (for example, the number is larger than or equal to 1), the electronic device 101 may determine that the service is being used. Alternatively, for example, when the number of established PDU sessions satisfies a predetermined condition (for example, the number is larger than or equal to 1), the electronic device 101 may determine that the service is being used. When the condition related to the use of the service is satisfied (Yes of operation 575), the electronic device 101 may transmit a TAU request message indicating that an update of UE capability information is requested in operation 577. The electronic device 101 may receive a TAU accept message in the state in which a UE capability enquiry message is not received in operation 579. As illustrated in FIG. 5A, the electronic device 101 may enter an idle state based on reception of the TAU accept message in the state in which the UE capability enquiry message is not received in operation 581. The electronic device 101 may perform at least one operation for establishing a new RRC connection in the idle state in operation 583. When the new RRC connection is established, the electronic device 101 may receive the UE capability enquiry message in operation 585. In operation 587, the electronic device 101 may transmit a UE capability information message including the changed UE capability to the network 300. As described above, the procedure of establishing the new RRC connection may have a shorter processing time than the procedure of deregistration from or registration in the core network. When the service is currently being used or is scheduled to be used, the electronic device 101 may perform the procedure of transmitting the UE capability by establishing the new RRC connection.

According to various embodiments, when the condition related to the use of the service is not satisfied (No of operation 575), the electronic device 101 may perform the operation for deregistration from the core network in operation 589. The electronic device 101 may perform the operation for registration in the core network in operation 591. Since the operation for deregistration from and registration in the core network has been described with reference to FIG. 5C, a detailed description thereof may not be repeated. The electronic device 101 may receive the UE capability enquiry message from the network 300 in operation 593. As described above, the deregistration from the core network has been performed, and thus the network 300 should enquire the electronic device 101 about the UE capability. The electronic device 101 may transmit the UE capability information message including the changed UE capability to the network 300 based on reception of the UE capability enquiry message in operation 595. When the service is not being used or is not scheduled to be used, the deregistration and registration process in the core network in which the UE capability transfer procedure is more likely to be performed in spite of a relatively longer required time may be performed.

FIG. 6 is a flowchart illustrating an example method of operating the electronic device according to various embodiments of the disclosure.

According to various embodiments, the electronic device 101 (for example, at least one of the processor 120, the first communication processor 212, the second communication processor 214, or the integrated communication processor 260) may identify an over-temperature state in operation 601. For example, the electronic device 101 may include the sensor module 176 for measuring internal (or surface) temperature of the electronic device 101. The electronic device 101 may identify an over-temperature state through an indication of over-temperature indicating that measured temperature is higher than or equal to threshold temperature, which will be described in greater detail below with reference to FIG. 7A. Alternatively, the electronic device 101 may operate based on the measured temperature, which will be described in greater detail below with reference to FIG. 7B. For example, when the electronic device 101 may execute an application requiring transmission and reception of large data (for example, a game application or a streaming application), the over-temperature state may occur.

According to various embodiments, the electronic device 101 may change the UE capability based on the over-temperature state in operation 603. In one example, the electronic device 101 may change an information element related to carrier aggregation (AG) of the UE capability and/or an information element related to dual connectivity. For example, the electronic device 101 may change the number of CCs of CA (for example, change the CCs from 5 to 2) or deactivate CA based on a change in an item of supportedBandCombinationList of rf-Parameter included in a specific RAT (for example, NR) of a UE-CapabilityRAT-Container of the UE capability. For example, the electronic device 101 may deactivate DC based on a change in an item of supportedBandCombinationList of rf-Parameter of UE-MRDC-Capability included in a specific RAT (for example, NR-EUTRA) of a UE-CapabilityRAT-Containe of the UE capability. Meanwhile, it may be understood by those skilled in the art that the change in the information element according to this embodiment and the change in the information element according to other embodiments are merely examples. Accordingly, the electronic device may enter the idle state based on failure in UE capability transfer, and an information element of a UE capability information message transmitted in response to the UE capability enquiry message received based on a new RRC connection established in the idle state may be different from an information element previously reported to the network 300. The heating generated by the electronic device 101 in the case in which CA and/or DC is performed may be larger than the heating generated by the electronic device 101 in the case in which CA and/or DC is not performed. The electronic device 101 may deactivate CA and/or DC in the over-temperature state and, accordingly, increase a possibility of resolution of the over-temperature state. Meanwhile, when CA is performed, as the CA is performed based on a relatively larger number of CCs, the heating generated by the electronic device 101 may be relatively greater. The electronic device 101 may relatively reduce the number of CCs used for CA in the over-temperature state and, accordingly, increase a possibility of resolution of the over-temperature state.

In one example, the electronic device 101 may change an information element related to a layer. For example, the electronic device 101 may change (for example, reduce the number of layers from 4 to 2) at least one of maxNumberMIMO-LayersPDSCH of FeatureSetDownlinkPerCC of the UE capability, maxNumberMIMO-LayersCB-PUSCH of FeatureSetUplinkPerCC, or maxNumberMIMO-Layers-NonCB-PUSCH of FeatureSetUplinkPerCC. As communication is performed on the basis the relatively larger number of layers, heating generated by the electronic device 101 may be relatively larger. The electronic device 101 may relatively reduce the number of layers in the over-temperature state and, accordingly, increase a possibility of resolution of the over-temperature state.

For example, the electronic device 101 may change an information element related to a bandwidth. For example, the electronic device 101 may change at least one of SupportedBandwidthDL and/or ChannelBW-90 mhz of FeatureSetDownlinkPerCC of the UE capability or SupportedBandwidthUL and/or ChannelBW-90 mhz of FeatureSetUplinkPerCC. As communication is performed based on a relatively larger bandwidth, heating generated by the electronic device 101 may be relatively larger. The electronic device 101 may relatively reduce a bandwidth in the over-temperature state and, accordingly, increase a possibility of resolution of the over-temperature state. For example, the electronic device 101 may reduce information (for example, bandwidth value of SupportedBandwidthDL and/or SupportedBandwidthUL and/or deactivate ChannelBW-90 mhz. In one example, the electronic device 101 may reduce the bandwidth to an initial carrier bandwidth but it is only an example and there is no limitation on a bandwidth value thereafter. For example, the electronic device 101 may reduce the bandwidth to the initial carrier bandwidth (or another value) when the initial carrier bandwidth is larger than or equal to a threshold bandwidth (for example, 10 MHz or 20 MHz) and change the bandwidth to a predetermined value (for example, 10 MHz) when the initial carrier bandwidth is smaller than the threshold bandwidth.

For example, the electronic device 101 may change an information element related to a modulation and coding scheme (MCS). As communication is performed based on a relatively larger MCS, heating generated by the electronic device 101 may be relatively larger. For example, the electronic device 101 may reduce at least one of supportedModulationOrderDL of FeatureSetDownlinkPerCC of the UE capability or supportedModulationOrderUL of FeatureSetUplinkPerCC (for example, reduction from qam 256 to qam 64). The electronic device 101 may relatively reduce the number of MCSs in the over-temperature state and, accordingly, increase a possibility of resolution of the over-temperature state.

For example, the electronic device 101 may change an information element related to a sounding reference signal (SRS). For example, the electronic device 101 may change srs-TxSwitch Parameter of BandCombinationList of the UE capability to not-supported. The heating generated by the electronic device 101 when the SRS is transmitted may be larger than the heating generated by the electronic device 101 when the SRS is not transmitted. The electronic device 101 may deactivate transmission of the SRS in the over-temperature state and, accordingly, increase a possibility of resolution of the over-temperature state.

For example, the electronic device 101 may change an information element related to a supported radio access technology (RAT) and/or communication system. For example, NR may be deleted from UE-capabilityRAT-container of the UE capability. The heating generated by the electronic device 101 when the specific RAT is activated may be larger than the heating generated by the electronic device 101 when another RAT is activated. The electronic device 101 may deactivate the specific RAT in the over-temperature state and, accordingly, increase a possibility of resolution of the over-temperature state.

According to various embodiments, the electronic device 101 may transmit a TAU request message indicating an update of UE capability information is requested in operation 605. The electronic device 101 may receive a TAU accept message in the state in which a UE capability enquiry message is not received in operation 607. The electronic device 101 may enter an idle state based on reception of the TAU accept message in the state in which the UE capability enquiry message is not received in operation 609. The electronic device 101 may establish a new RRC connection in the idle state in operation 611. The electronic device 101 may receive the UE capability enquiry message based on the new RRC connection in operation 613. The electronic device 101 may transmit a UE capability information message including the changed UE capability based on the UE capability enquiry message in operation 615.

FIG. 7A is a flowchart illustrating an example method of operating an electronic device according to various embodiments.

According to various embodiments, the electronic device 101 (for example, at least one of the first communication processor 212, the second communication processor 214, or the integrated communication processor 260) may identify an indication indicating over-temperature in operation 701. For example, the processor 120 may acquire temperature information from the sensor module 176. For example, the processor 120 may determine whether acquired temperature information is higher than or equal to predetermined threshold temperature (for example, 43° C.). When the acquired temperature information is higher than or equal to the threshold temperature, the processor 120 may provide an indication indicating over-temperature to a communication processor (for example, at least one of the first communication processor 212, the second communication processor 214, or the integrated communication processor 260). Meanwhile, in another implementation, the communication processor (for example, at least one of the first communication processor 212, the second communication processor 214, or the integrated communication processor 260) may directly acquire temperature information from the sensor module 176. In this case, the communication processor (for example, at least one of the first communication processor 212, the second communication processor 214, or the integrated communication processor 260) may determine whether the acquired temperature information is higher than or equal to the predetermined threshold temperature.

The electronic device 101 may change each of at least one information element configured in accordance with the indication to predetermined (e.g., specified) information based on acquisition of the indication (or based on identification that the acquired temperature information is higher than or equal to the predetermined threshold temperature) in operation 703. At least one of the information element related to deactivation of CA and/or DC, the information element related to the number of CCs of CA, the information element related to reduction in bandwidths, the information element related to reduction in the number of layers, the information element related to reduction in the number of MCSs, the information element related to deactivation of switching of SRS transmission antennas, or the information element related to deactivation of the specific RAT may be pre-configured as the information element to be changed in accordance with the indication indicating over-temperature. In one example, when the over-temperature indication is identified, the electronic device 101 may change the UE capability by deactivating CA and/or DC, reducing the bandwidth (for example, change to 20 MHz), changing the number of layers to 2, changing the number of MCSs to a value corresponding to 64 QAM, and deactivating transmission of the SRS, but there is no limitation on an information element of a target to be changed and information corresponding to the corresponding information element.

FIG. 7B is a flowchart illustrating an example method of operating the electronic device according to various embodiments.

According to various embodiments, the electronic device 101 (for example, at least one of the processor 120, the first communication processor 212, the second communication processor 214, or the integrated communication processor 260) may identify information related to the over-temperature state in operation 711. For example, the electronic device 101 may manage a plurality of temperature ranges. The electronic device 101 may identify a temperature range including the measured temperature as information related to the over-temperature state.

According to various embodiments, the electronic device 101 may identify at least one information element corresponding to the information related to the over-temperature state in operation 713. In operation 715, the electronic device 101 may change each of at least one information element to predetermined (e.g., specified) information (or change to a predetermined degree) based on the information related to the over-temperature state. For example, the electronic device 101 may identify at least one information element of a target to be changed based on the temperature range including the measured temperature. For example, the electronic device 101 may identify information of the information element of the target to be changed based on the temperature range including the measured temperature. In one example, the electronic device 101 may change a relatively smaller number of information elements when an over-temperature state in a relatively low temperature range is identified, and change a relatively larger number of information elements when an over-temperature state in a relatively high temperature range is identified. For example, the electronic device 101 may deactivate CA and DC when a temperature range from 40° C. to 50° C. is identified, deactivate CA and DC and deactivate switching of the SRS transmission antenna when a temperature range from 50° C. to 60° C. is identified, and deactivate CA and DC, reduce the bandwidth, and deactivate switching of the SRS transmission antenna when a temperature range from 60° C. to 70° C. is identified, but the information elements of the targets to be changed are merely examples. In one example, the electronic device 101 may change information on a specific information element to a configured value for a relatively high quality when the over-temperature state in the relatively low temperature range is identified, and change information on a specific information element to a configured value for a relatively low quality when the over-temperature state in the relatively high temperature range is identified. For example, the electronic device 101 may configure the number of layers as 4 when the temperature range from 40° C. to 50° C. is identified and configure the number of layers as 2 when the temperature range from 50° C. to 60° C. is identified, but the values are merely examples.

Meanwhile, although it is described that the information on the specific information element corresponds to the specific temperature range in the embodiment, it is only example. The electronic device 101 according to various embodiments may be implemented to reduce information on a specific information element of the current UE capability when the over-temperature state is identified. For example, when the over-temperature state is identified, the electronic device 101 may reduce the bandwidth to 10 MHz if the bandwidth of the current UE capability is 20 MHz and reduce the bandwidth to 20 MHz if the bandwidth of the current UE capability is 400 MHz. For example, even though the same temperature is measured, information after the change may be different according to the current UE capability.

FIG. 7C is a flowchart illustrating an example method of operating an electronic device according to various embodiments.

According to various embodiments, the electronic device 101 (for example, at least one of the processor 120, the first communication processor 212, the second communication processor 214, or the integrated communication processor 260) may report the UE capability including first information to the network 600 when the temperature identified by the sensor module 176 of the electronic device 101 is included in a first temperature range in operation 721. The electronic device 101 may identify that the temperature identified by the sensor module 176 is changed from the first temperature range to a second temperature range in operation 723. For example, the first temperature range may be a temperature range higher or lower than the second temperature range. In operation 725, the electronic device 101 may perform an operation (for example, at least some of the operations of FIGS. 5A, 5B, 5C and 5D) for reporting the UE capability including second information corresponding to the second temperature range. In one example, the electronic device 101 may configure the second information based on an information element configured in accordance with the second information and/or information on the information element. The operation for reporting the UE capability including the second information may be performed by at least some of FIGS. 5A, 5B, 5C and 5D. In another example, the electronic device 101 may identify the second information according to the application of a degree of the change in the information corresponding to the second temperature range to the first information.

According to various embodiments, in operation 727, the temperature identified by the sensor module 176 is changed from the second temperature range to a third temperature range. For example, the second temperature range may be a temperature range higher or lower than the third temperature range. In operation 729, the electronic device 101 may perform the operation for reporting the UE capability including third information corresponding to the third temperature range. In one example, the electronic device 101 may configure the third information based on an information element configured in accordance with the third information and/or information on the information element. The operation for reporting the UE capability including the third information may be performed by at least some of FIGS. 5A, 5B, 5C and 5D. In another example, the electronic device 101 may identify the third information according to the application of a degree of the change in the information corresponding to the third temperature range to the third information. As described above, after change the UE capability once and reporting the same to the network 300, the electronic device 101 may additionally change the UE capability and report the same to the network 300.

Figure 8:
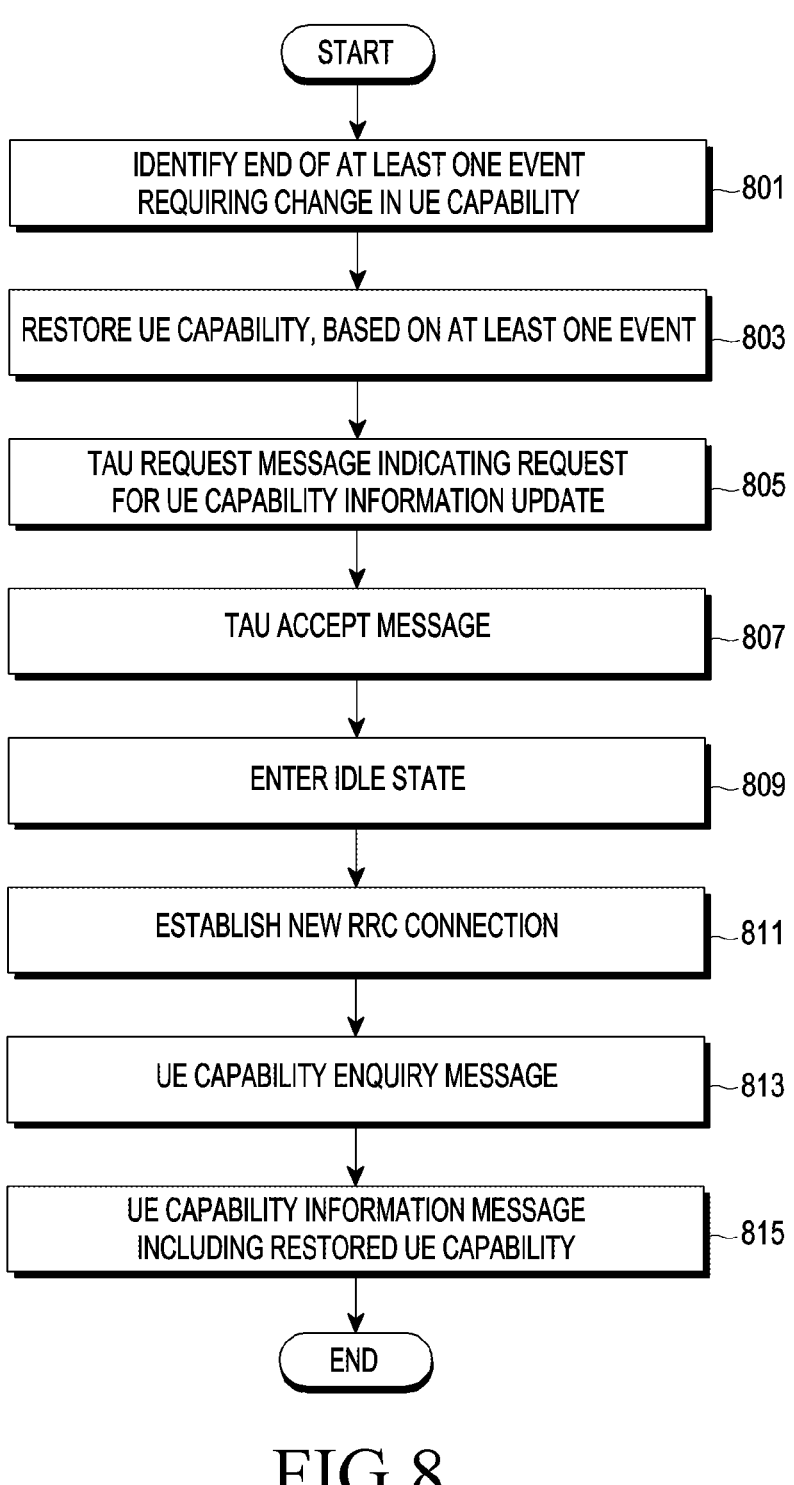
FIG. 8 is a flowchart illustrating an example method of operating an electronic device according to various embodiments.

FIG. 8 is a flowchart illustrating an example method of operating the electronic device according to various embodiments of the disclosure.

According to various embodiments, the electronic device 101 (for example, at least one of the processor 120, the first communication processor 212, the second communication processor 214, or the integrated communication processor 260) may identify the end of at least one event requiring the change in the UE capability in operation 801. For example, it is assumed that the electronic device 101 performs a procedure of changing the UE capability based on the generation of an event and reporting the changed UE capability to the network 300, for example, the procedure by at least one of FIGS. 5A, 5B, 5C and 5D. After reporting the changed UE capability, the electronic device 101 may identify the end of the event in operation 801. For example, when the UE capability is changed by the over-temperature state, the electronic device 101 may identify release of the over-temperate state as the end of the event.

According to various embodiments, the electronic device 101 may restore the UE capability based on the end of at least one event in operation 803. The electronic device 101 may restore changed information on the information element based on the generation of the event to information before the change. In operation 805, the electronic device 101 may transmit a TAU request message indicating that an update of UE capability information is requested to the network 300. In operation 807, the electronic device 101 may receive a TAU accept message from the network 300. The electronic device 101 may enter an idle state based on reception of the TAU accept message in the state in which a UE capability enquiry message is not received in operation 809. The electronic device 101 may perform at least one operation for establishing a new RRC connection in the idle state in operation 811. In operation 813, the electronic device 101 may receive the UE capability enquiry message based on the new RRC connection. In operation 815, the electronic device 101 may transmit a UE capability information message including the restored UE capability to the network 300. Accordingly, when the UE capability is restored according to the end of the event, UE capabilities of the electronic device 101 and the network 300 may be synchronized.

Figure 9A:
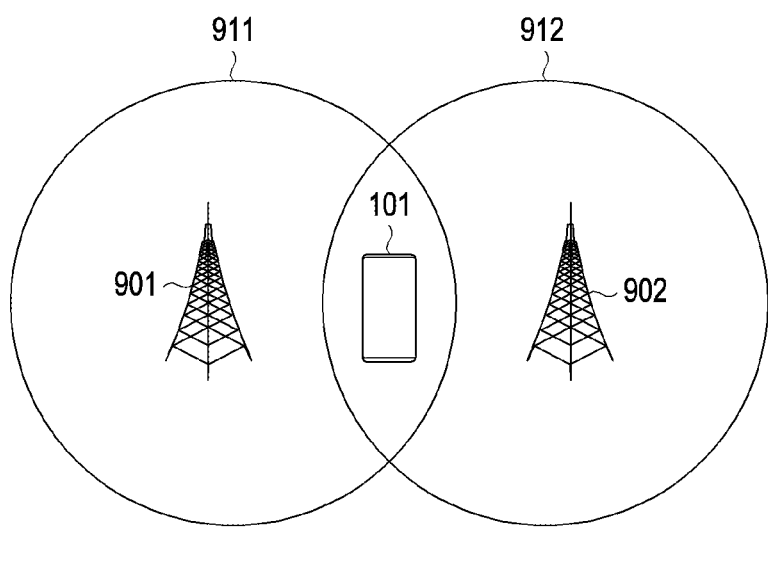
FIG. 9A is a diagram illustrating an electronic device and coverages of a cell according to various embodiments.

FIG. 9A is a diagram illustrating an electronic device and coverages of a cell according to various embodiments.

According to various embodiments, a first cell 901 supporting a first RAT (for example, NR) and/or a first communication system (for example, 5GS) and a second cell 902 supporting a second RAT (for example, E-UTRA) and/or a second communication system (for example, EPS) may be supported. The first cell 901 may support a first coverage 911, and the second cell 902 may support a second coverage 912. The electronic device 101 may be included in the first coverage 911 but may be disposed near an edge of the first coverage 911. In this case, the electronic device 101 may perform cell reselection multiple times. In the edge of the first coverage 911, the cell reselection may be performed based on relatively small intensity of a signal from the cell. Thereafter, the electronic device 101 may reselect the first cell 901 again after reselecting the second cell 902, and accordingly cell reselection may be frequently performed. Due to the frequent cell reselection, it may be difficult to provide a stable communication service.

Figure 9B:
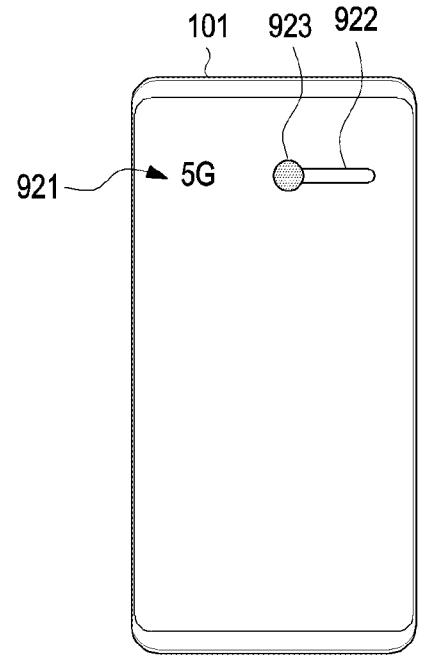
FIG. 9B is a diagram illustrating an example screen displayed by the electronic device according to various embodiments.

FIG. 9B is a diagram illustrating an example screen displayed by the electronic device according to various embodiments.

As illustrated in FIG. 9A, when the electronic device 101 is located at an edge of a cell coverage of a specific cell, frequency cell reselection may be performed and thus provision of a stable communication service may be difficult. The electronic device 101 may deactivate a specific RAT and/or communication service (for example, NR and/or 5GS) in order to provide a stable communication service. For example, the electronic device 101 may display text 921 and a UI including, for example, a slide bar 922 and an indicator 923 indicating 5G corresponding to a specific communication service as illustrated in FIG. 9B. For example, the electronic device 101 may display a UI (or a popup window including an object for calling the UI) based on the generation of cell reselection a predetermined threshold number of times or more for a predetermined period. Alternatively, the electronic device 101 may display the UI based on a UI call command by the user, and there is no limitation on an event for displaying the UI. The electronic device 101 may identify a command (for example, touch, drag, or flick) causing movement of the indicator 923 from the user. The electronic device 101 may change the location of the indicator 923 based on the identified command. For example, the electronic device 101 may deactivate the specific RAT and/or communication service (for example, NR and/or 5GS) while the indicator 923 is disposed at a first location (for example, left location). For example, the electronic device 101 may activate the specific RAT and/or communication service (for example, NR and/or 5GS) while the indicator 923 is disposed at a second location (For example, right location).

Figure 9C:
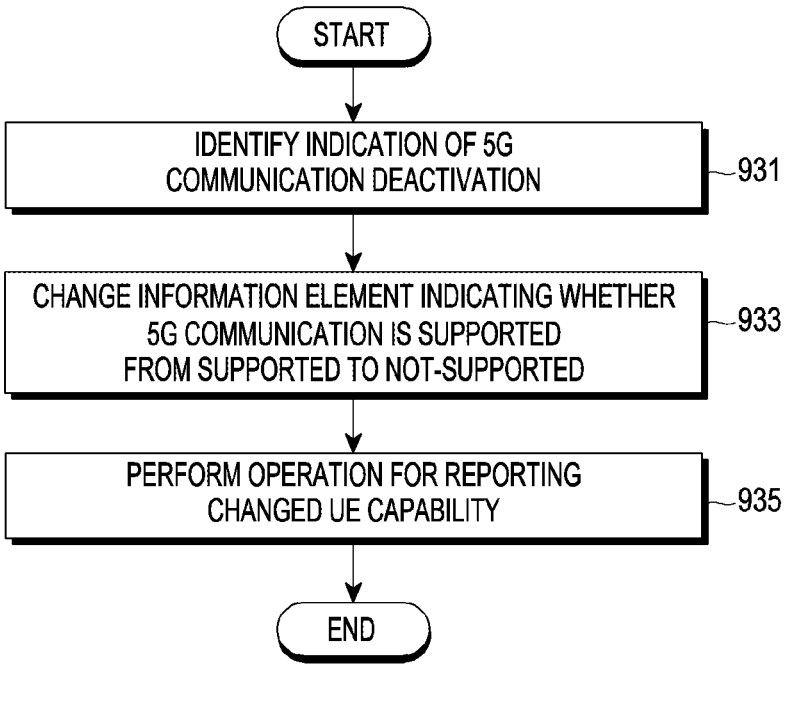
FIG. 9C is a flowchart illustrating an example method of operating the electronic device according to various embodiments.

FIG. 9C is a flowchart illustrating an example method of operating the electronic device according to various embodiments.

According to various embodiments, the electronic device 101 (for example, at least one of the first communication processor 212, the second communication processor 214, or the integrated communication processor 260) may identify an indication of 5G communication deactivation in operation 931. As illustrated in FIG. 9B, the electronic device 101 (for example, processor 120) may identify a command for deactivating 5G communication and provide the same to a communication processor (for example, at least one of the first communication processor 212, the second communication processor 214, or the integrated communication processor 260). The communication processor (for example, at least one of the first communication processor 212, the second communication processor 214, or the integrated communication processor 260) may change an information element indicating whether 5G communication (or NR) is supported from supported to not-supported in operation 933. For example, NR may be deleted from UE-capabilityRAT-container of the UE capability. The electronic device 101 according to various embodiments may perform an operation (for example, at least some of the operations illustrated in FIGS. 5A, 5B, 5C and 5D) for reporting the changed UE capability in operation 935.

Figure 9D:
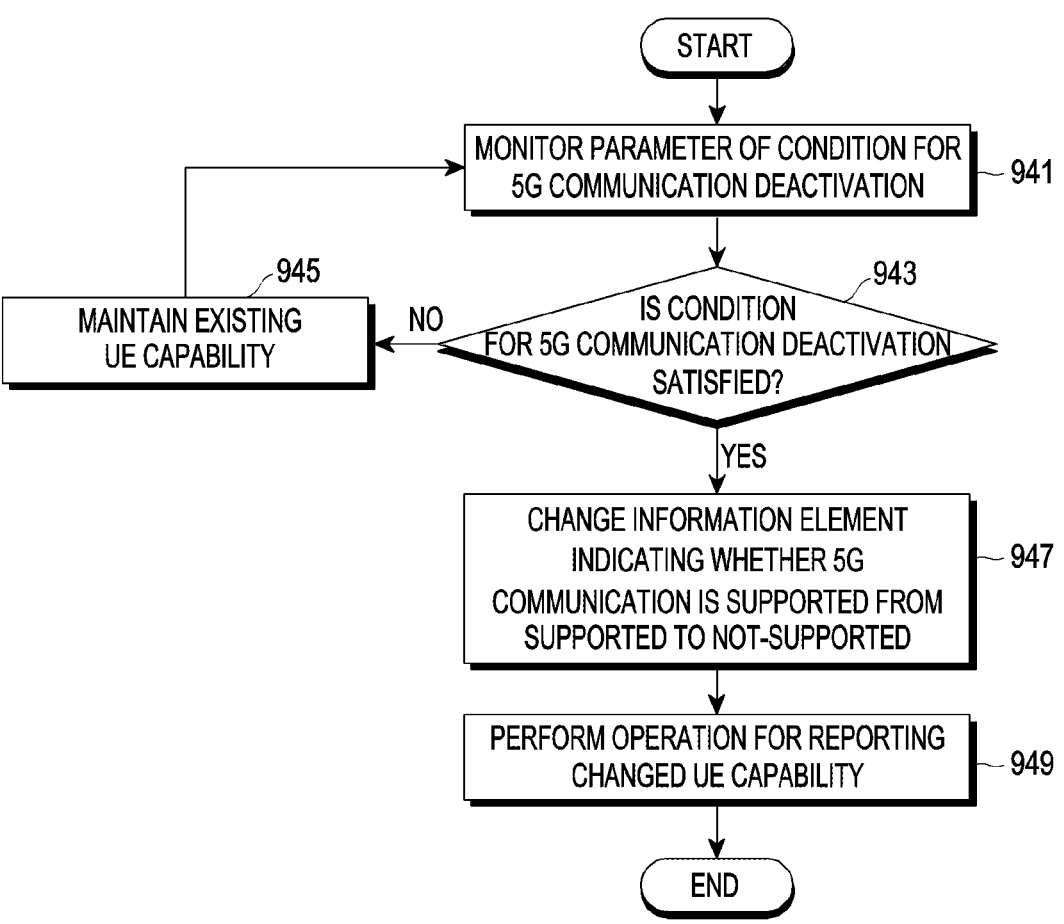
FIG. 9D is a flowchart illustrating an example method of operating the electronic device according to various embodiments.

FIG. 9D is a flowchart illustrating an example method of operating the electronic device according to various embodiments.

According to various embodiments, the electronic device 101 (for example, at least one of the first communication processor 212, the second communication processor 214, or the integrated communication processor 260) may monitor a parameter of a condition for deactivating 5G communication in operation 941. The electronic device 101 may determine whether the condition for deactivating 5G communication is satisfied based on the monitored parameter in operation 943. In one example, the electronic device 101 may determine that the condition for deactivating 5G communication is satisfied based on the number of cell reselections being larger than or equal to a threshold number within a threshold period. In another example, the electronic device 101 may determine that the condition for deactivating 5G communication is satisfied based on the number of failures in the RRC connection for the cell supporting 5G communication being larger than or equal to a threshold number within a threshold period. In another example, the electronic device 101 may determine that the condition for deactivating 5G communication is satisfied based on satisfaction of a predetermined condition by an intensity of a signal received from a specific cell (for example, equal to or lower than a threshold intensity). Meanwhile, it may be understood by those skilled in the art that not only the above-described examples but also any condition for the case in which 5G communication cannot be stably performed is implemented as the condition for deactivating 5G communication.

According to various embodiments, when the condition for deactivating 5G communication is not satisfied (No of operation 943), the electronic device 101 may maintain the existing UE capability in operation 945. The electronic device 101 may continuously monitor the parameter while maintaining the existing UE capability like in operation 941. When the condition for deactivating 5G communication is satisfied (Yes of operation 943), the electronic device 101 may change the information element indicating whether 5G communication (or RAT) is supported from supported to not-supported in operation 947. The electronic device 101 may perform an operation for reporting the changed UE capability (for example, at least some of the operations described with reference to FIGS. 5A, 5B, 5C and 5D) in operation 949.

As described above, the electronic device 101 may deactivate 5G communication (or RAT) automatically rather than based on a user command. For example, the electronic device 101 may support an automatic selection mode related to selection of a communication mode. In the automatic selection mode, the electronic device 101 may determine whether to activate or deactivate specific communication based on the monitored parameter.

Meanwhile, although not illustrated, the electronic device 101 may identify that 5G communication is activated again. For example, the electronic device 101 may identify an activation command (for example, touch, drag, or flick) of 5G communication through the UE as illustrated in FIG. 9B. Alternatively, the electronic device 101 may determine whether to automatically activate 5G communication based on the monitored parameter. For example, the electronic device 101 may activate 5G communication again based on degradation of a communication quality of another RAT (for example, E-UTRA) but there is no limitation in a condition for reactivating 5G communication. The electronic device 101 may restore the UE capability based on activation of 5G communication. The electronic device 101 may change the information element indicating whether 5G communication is supported from not-supported to supported. The electronic device 101 may perform an operation for reporting the changed UE capability (for example, at least some of the operations described with reference to FIGS. 5A, 5B, 5C and 5D) in operation 949.

Figure 10A:
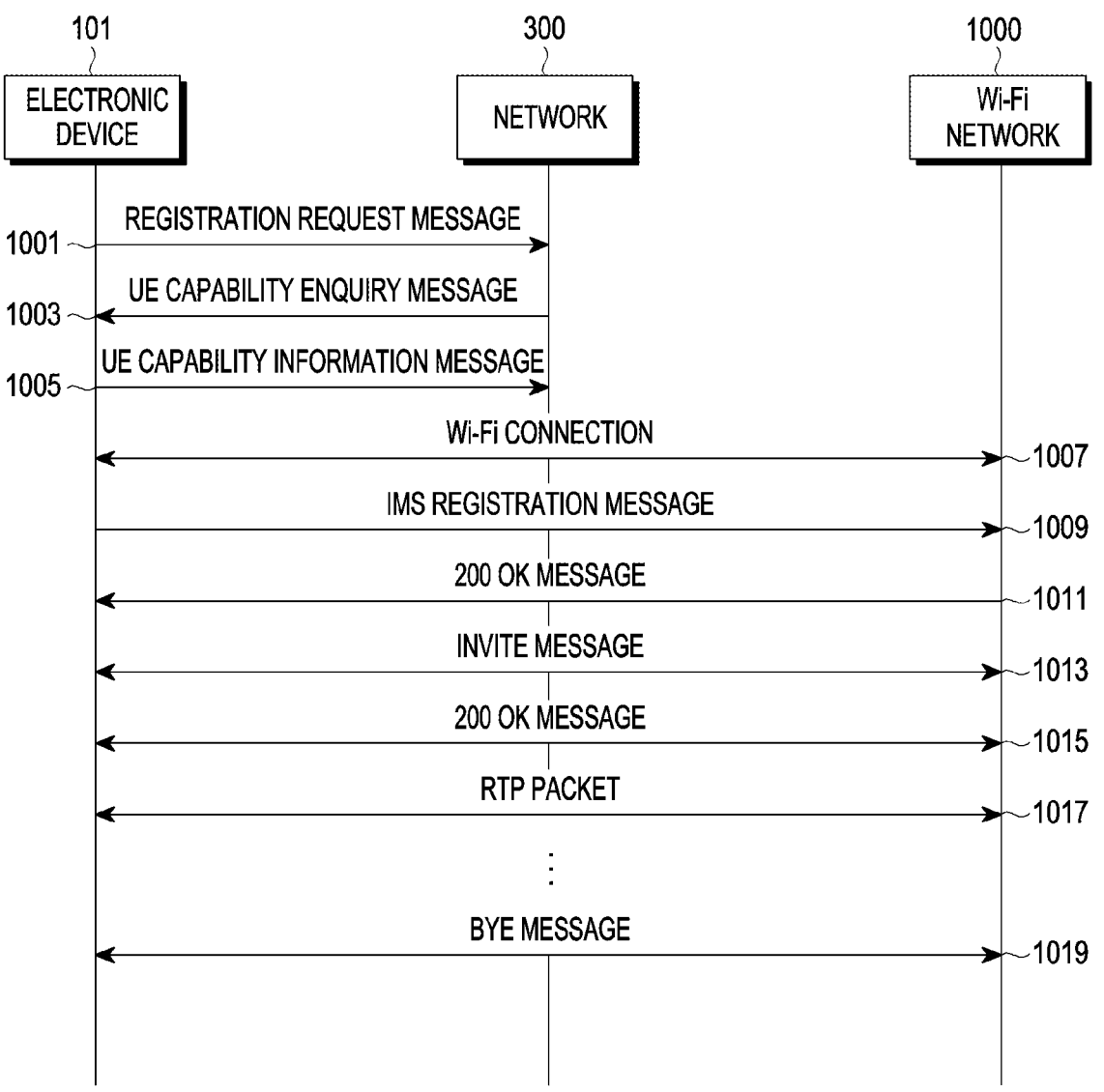
FIG. 10A is a signal flow diagram illustrating an example method of operating an electronic device according to various embodiments.

FIG. 10A is a signal flow diagram illustrating an example method of operating an electronic device according to various embodiments.

According to various embodiments, the electronic device 101 (for example, at least one of the processor 120, the first communication processor 212, the second communication processor 214, or the integrated communication processor 260) may transmit a registration request message (for example, an attach request message of the EPC or a registration request message of the 5GC) to the network 300 in operation 1001. In operation 1003, the electronic device 101 may receive a UE capability enquiry message from the network 300. The electronic device 101 may transmit a UE capability information message to the network 300 based on reception of the UE capability enquiry message in operation 1005. The network 300 may store and/or manage the UE capability for the electronic device 101 based on information included in the UE capability information message.

According to various embodiments, the electronic device 101 (for example, Wi-Fi module) may establish a Wi-Fi connection with a Wi-Fi network 1000 in operation 1007. An operation for establishing the Wi-Fi connection may follow, for example, at least some of the lower standard of 802.11, and a detailed description of the corresponding operation is not provided here. The electronic device 101 may transmit an IMS registration message to an IMS server (or IMS core) (not shown) through the Wi-Fi network 1000 based on the Wi-Fi connection in operation 1009. The IMS registration message may be a session initiation protocol (SIP)-based message and may be transmitted to the IMS server through, for example, the Wi-Fi network 1000, or an ePDG, but there is no limitation. When the electronic device 101 is registered in the IMS server, the IMS server may transmit a 200 OK message to the electronic device 101 through the Wi-Fi network 1000. In operation 1011, the electronic device 101 may receive the 200 OK message from the Wi-Fi network 1000.

According to various embodiments, the electronic device 101 may transmit or receive an INVITE message through the Wi-Fi network 1000 in operation 1013. When the electronic device 101 is a mobile originating (MO) terminal, the electronic device 101 may transmit the INVITE message. When the electronic device 101 is a mobile terminated (MT) terminal, the electronic device 101 may receive the INVITE message. The electronic device 101 may transmit or receive the 200 OK message in operation 1015. For example, when the electronic device 101 transmits the INVITE message and the MT terminal accepts reception, the MT terminal may receive the 200 OK message. For example, when the electronic device 101 receives the INVITE message and identifies acceptance of reception of a phone call, the electronic device may transmit the 200 OK message. Although not illustrated, between transmission/reception of the INVITE message and transmission/reception of the 200 OK message, other SIP messages (for example, TRYING message and RINGING message) may be transmitted/received. A session may be established between the electronic device 101 and another terminal based on reception of the 200 OK message. The electronic device 101 may transmit and/or receive an RTP packet to and/or from another terminal based on the established session in operation 1017. Accordingly, multimedia data for a phone call may be transmitted and received. According to various embodiments, the electronic device 101 may transmit or receive a BYE message based on the end of the phone call in operation 1019.

Meanwhile, switching between the network 300 and the Wi-Fi network 1000, for example, switching between LTE communication and Wi-Fi and switching between 5G communication and Wi-Fi are defined in the 3GPP standard. For example, an N3IWF entity may be required for switching between 5G communication and Wi-Fi. However, the N3IWF entity may not be implemented according to a network service provider. In this case, switching between 5G communication and Wi-Fi may not be performed. At this time, deactivating 5G communication by the electronic device 101 may be advantageous to use a seamless phone call service.

Figure 10B:
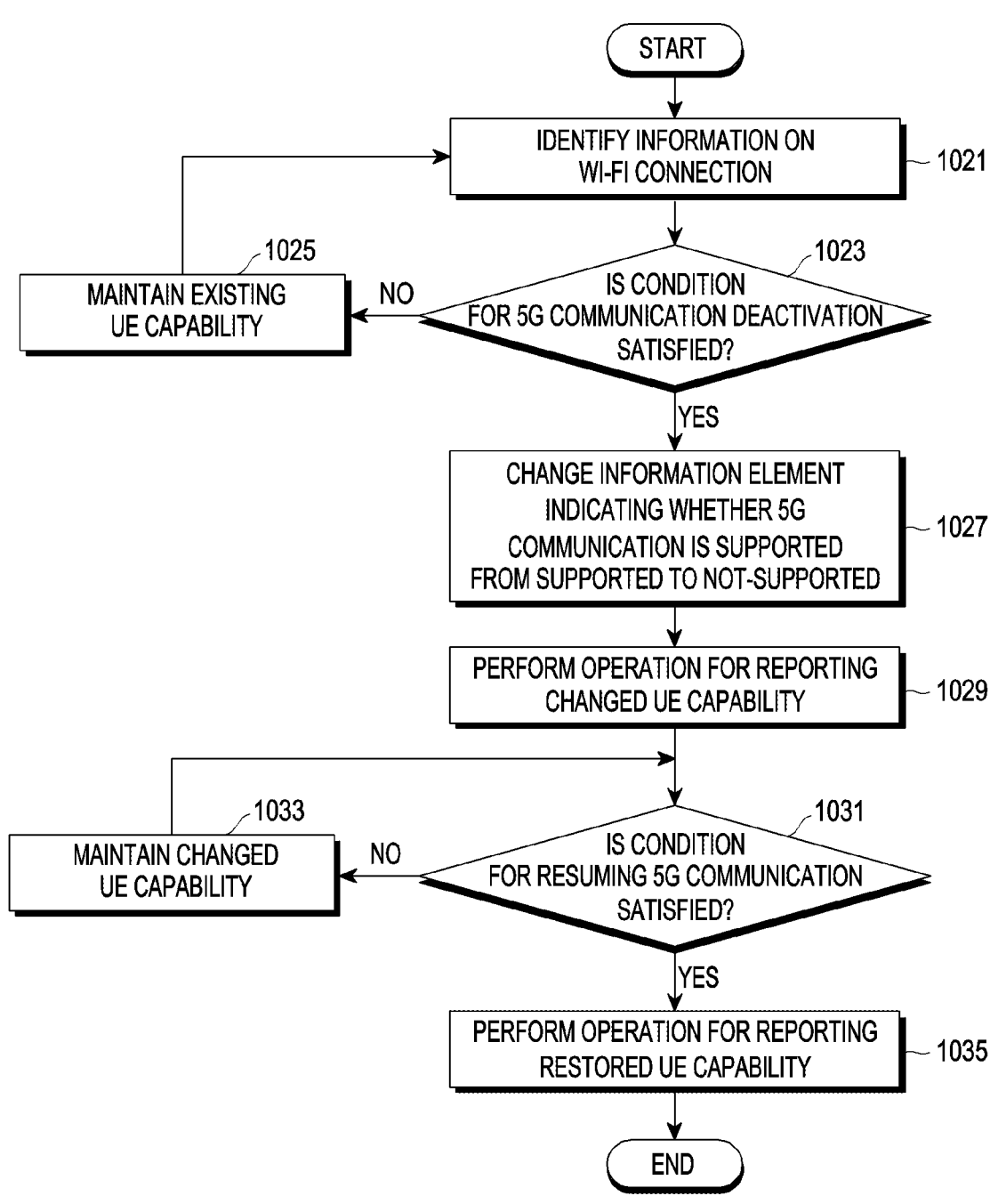
FIG. 10B is a flowchart illustrating an example method of operating the electronic device according to various embodiments.

FIG. 10B is a flowchart illustrating an example method of operating the electronic device according to various embodiments.

According to various embodiments, the electronic device 101 (for example, at least one of the first communication processor 212, the second communication processor 214, or the integrated communication processor 260) may identify information on the Wi-Fi connection in operation 1021. For example, when information on the Wi-Fi connection through the Wi-Fi module is identified, the processor 120 may provide the information to a communication processor (for example, at least one of the first communication processor 212, the second communication processor 214, or the integrated communication processor 260). For example, the information on the Wi-Fi connection may be an indication indicating a state in which the Wi-Fi connection is established by the Wi-Fi module, but there is no limitation in a format of the information if the information indicates establishment of the Wi-Fi connection.

According to various embodiments, the electronic device 101 may determine whether the condition for deactivating 5G communication is satisfied in operation 1023. For example, the electronic device 101 may identify at least of transmission and/or reception of at least some of a plurality of messages for the Wi-Fi connection in operation 1007 of FIG. 10A, transmission or reception of the IMS registration message in operation 1009, transmission or reception of the 200 OK message in operation 1011, transmission or reception of the INVITE message in operation 1013, transmission or reception of the 200 OK message in operation 1015, and transmission or reception of at least one RPT packet in operation 1017 as satisfaction of the condition for deactivating 5G communication. When the condition for deactivating 5G communication is not satisfied (No of operation 1023), the electronic device 101 may maintain the existing UE capability in operation 1025. The electronic device 101 may continuously monitor the parameter while maintaining the existing UE capability like in operation 1021. When the condition for deactivating 5G communication is satisfied (Yes of operation 1023), the electronic device 101 may change the information element indicating whether 5G communication (or RAT) is supported from supported to not-supported in operation 1027. The electronic device 101 may perform an operation for reporting the changed UE capability (for example, at least some of the operations described with reference to FIGS. 5A, 5B, 5C and 5D) in operation 1029.

According to various embodiments, the electronic device 101 may determine whether a condition for resuming 5G communication is satisfied in operation 1031. For example, the electronic device 101 may identify at least one of transmission or reception of the BYE message, release of the SIP session, deregistration from the IMS server, or Wi-Fi disconnection in FIG. 10A as satisfaction of the condition for resuming 5G communication. When the condition for resuming 5G communication is not satisfied (No of operation 1031), the electronic device 101 may maintain the changed UE capability in operation 1033. When the condition for resuming 5G communication is satisfied (Yes of operation 1031), the electronic device 101 may perform an operation for reporting the restored UE capability in operation 1035. The electronic device 101 may change the information element indicating whether 5G communication (or RAT) is supported from not-supported to supported based on satisfaction of the condition for resuming 5G communication. The electronic device 101 may perform an operation for reporting the changed UE capability (for example, at least some of the operations described with reference to FIGS. 5A, 5B, 5C and 5D).

Figure 11:
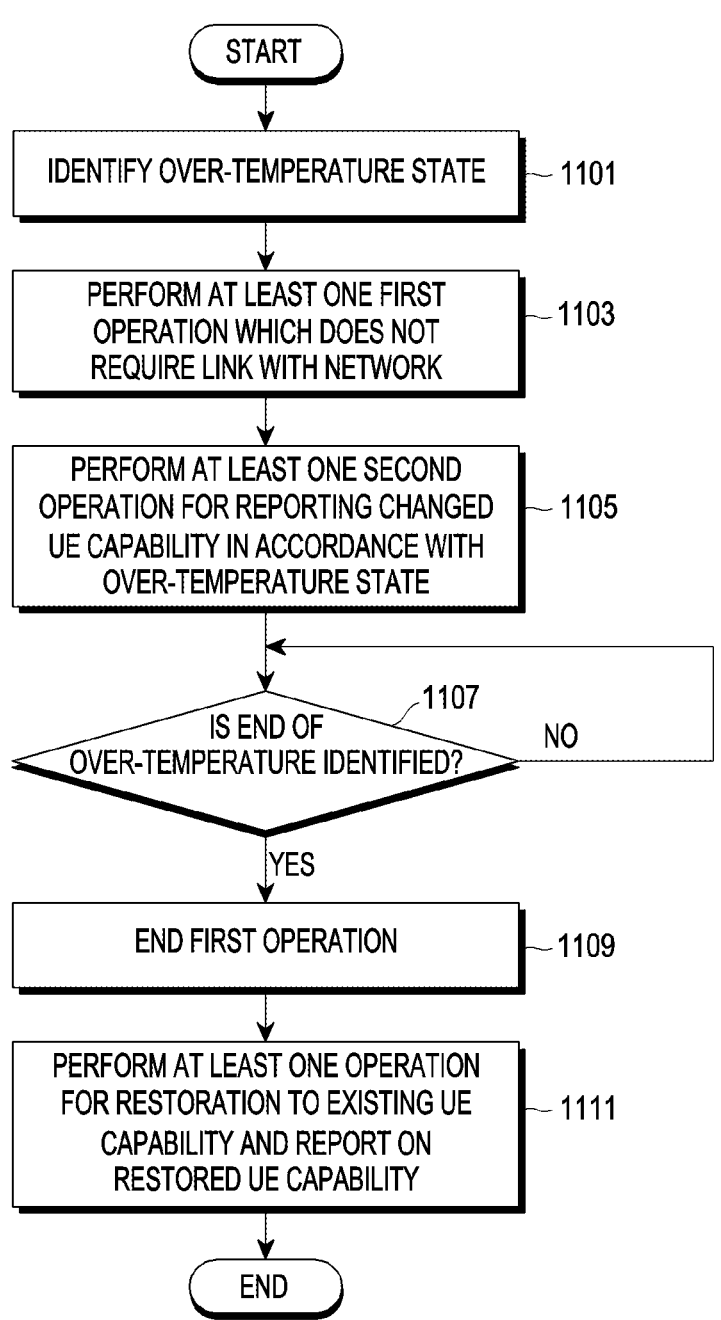
FIG. 11 is a flowchart illustrating an example method of operating an electronic device according to various embodiments.

FIG. 11 is a flowchart illustrating an example method of operating the electronic device according to various embodiments of the disclosure.

According to various embodiments, the electronic device 101 (for example, at least one of the processor 120, the first communication processor 212, the second communication processor 214, or the integrated communication processor 260) may identify an over-temperature state in operation 1101. For example, as illustrated in FIG. 7A, the electronic device 101 may identify an indication of over-temperature indicating that measured temperature is higher than or equal to threshold temperature as an over-temperature state. Alternatively, as illustrated in FIG. 7B, the electronic device 101 may operate based on the measured temperature (or temperature range including the measured temperature).

According to various embodiments, the electronic device 101 may perform at least one first operation which does not need association with the network 300 in operation 1103. In one example, the electronic device 101 may perform the control of the number of antennas for reception as the first operation, which will be described below. In another example, the electronic device 101 may perform the control of transmission power as the first operation, which will be described below. It is understood by those skilled in the art that, if the report on the changed information to the network 300 is not a necessary operation, it may be performed as at least one first operation. For example, as the number of antennas for reception is relatively larger, the heating generated by the electronic device 101 may be relatively larger. Accordingly, in the heating state, the electronic device 101 may reduce the heating by reducing the number of antennas for reception.

According to various embodiments, the electronic device 101 may perform at least one second operation for reporting the changed UE capability in accordance with the over-temperature state in operation 1105. For example, as described with reference to FIG. 6, the electronic device 101 may perform at least one of a change in the information element related to CA of the UE capability and/or the information element related to DC, a change in the information element related to the layer, a change in the information element related to the bandwidth, a change in the information element related to a modulation and coding scheme (MCS), a change in the information element related to a sound reference signal (SRS), and a change in the information element related to a radio access technology (RAT) and/or a communication system, and there is no limitation in the type of the changed information element. For example, the change in the UE capability may be at least partially the same as the change in the UE capability described in connection with at least one of FIG. 5A, 5B, 5C, 5D, 6, 7A, 7B, 8, 9A, 9B, 9C, 9D, 10A, or 10B. The electronic device 101 may perform the operation for reporting the changed UE capability to the network 300 (for example, at least some of the operations described with reference to FIGS. 5A, 5B, 5C and 5D). Alternatively, after transmitting the TAU request message, the electronic device 101 may transmit a UE capability information message including the changed UE capability based on reception of the UE capability enquiry message from the network 300. Alternatively, after transmitting the TAU request message, the electronic device 101 may receive an RRC connection release message from the network 300 and establish a new RRC connection based on the RRC connection release message. The electronic device 101 may receive the UE capability enquiry message based on the new RRC connection and transmit a UE capability information message including the changed UE capability.

According to various embodiments, the electronic device 101 may determine whether the end of over-temperature is identified in operation 1107. When it is identified that over-temperature does not end (No of operation 1107), the electronic device 101 may maintain the changed state of the UE capability and the performance of the first operation. When it is identified that over-temperature ends (Yes of operation 1107), the electronic device 101 may end the first operation in operation 1109. For example, when the electronic device 101 controls the number of antennas for reception as the first operation, the electronic device 101 may restore the number of antennas for reception to the number before the control. Alternatively, when the electronic device 101 performs backoff of power transmission as the first operation, the electronic device 101 may stop performing the backoff. The electronic device 101 may perform at least one operation for restoring the existing UE capability and reporting the restored UE capability in operation 1111. For example, the electronic device 101 may change the UE capability as a second operation. The electronic device 101 may restore the UE capability to information before the change based on the end of over-temperature and perform at least one operation for reporting the restored information to the network 300.

Figure 12:
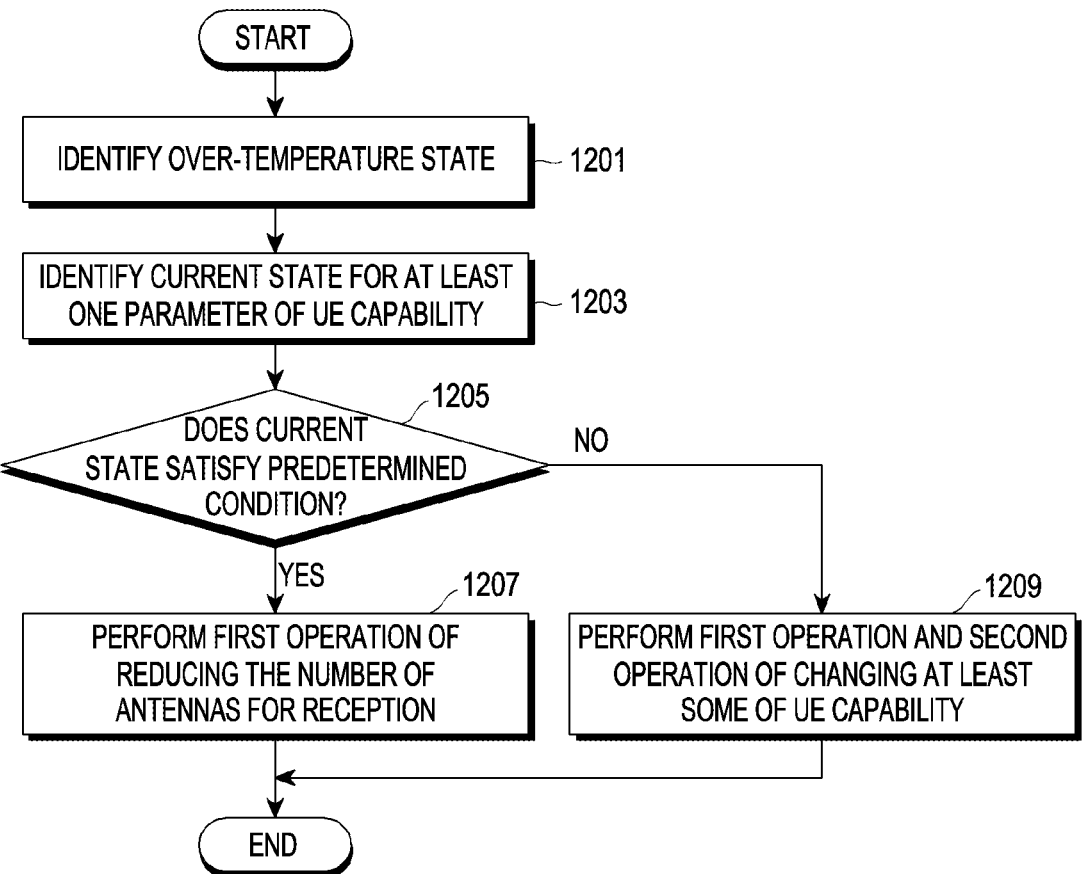
FIG. 12 is a flowchart illustrating an example method of operating an electronic device according to various embodiments.
Figure 13:
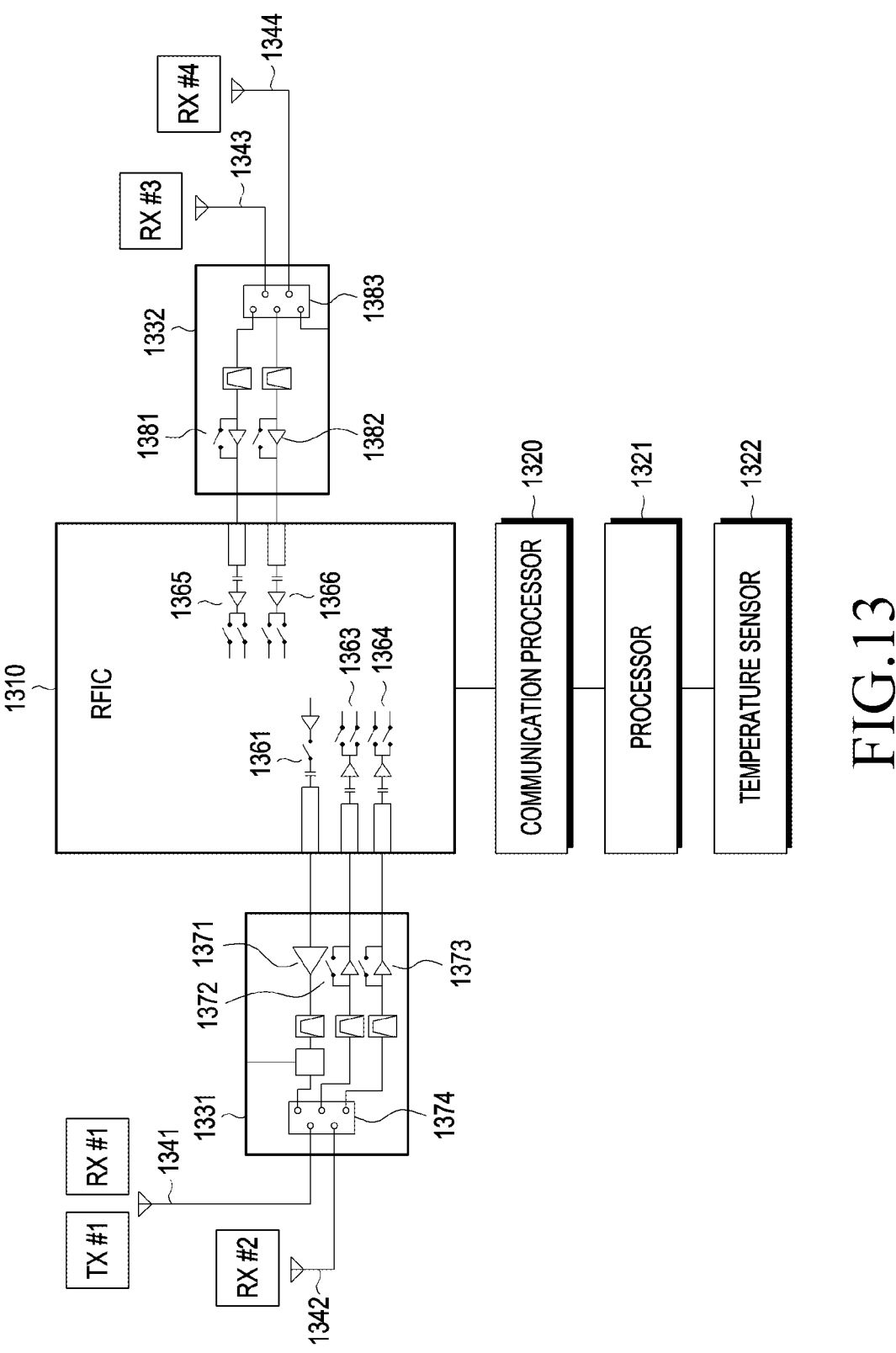
FIG. 13 is a block diagram illustrating an example configuration of an electronic device according to various embodiments.

FIG. 12 is a flowchart illustrating an example method of operating the electronic device according to various embodiments. The embodiment of FIG. 12 will be described with reference to FIG. 13. FIG. 13 is a block diagram illustrating an example configuration of the electronic device according to various embodiments.

According to various embodiments, the electronic device 101 (for example, at least one of the processor 120, the first communication processor 212, the second communication processor 214, or the integrated communication processor 260) may identify an over-temperature state in operation 1201. In operation 1203, the electronic device 101 may identify the current state for at least one parameter of the UE capability. In operation 1205, the electronic device 101 may determine whether the current state satisfies a predetermined (e.g., specified) condition. In one example, the electronic device 101 may determine whether the electronic device 101 performs CA as a part of the operation for determining whether the predetermined condition is satisfied. For example, when CA is not performed, it may be determined that the predetermined condition is satisfied. In one example, the electronic device 101 may determine whether the electronic device 101 performs DC as a part of the operation for determining whether the predetermined (e.g., specified) condition is satisfied. For example, when DC is not performed, it may be determined that the predetermined condition is satisfied. In one example, the electronic device 101 may determine whether the electronic device 101 transmits the SRS and/or whether receives an SRS setting from the network 300 as a part of the operation for determining whether the predetermined (e.g., specified) condition is satisfied. For example, when the SRS is not transmitted and/or when the SRS setting is not received, it may be determined that the predetermined condition is satisfied. In one example, the electronic device 101 may determine whether a current supported bandwidth (for example, supported band width) of the electronic device 101 is the same as an initial carrier bandwidth (initial carrier bandwidth) as a part of the operation for determining whether the predetermined condition is satisfied. The initial carrier bandwidth may be acquired from system information. For example, when the initial carrier bandwidth and the current supported bandwidth are the same as each other, it may be determined that the predetermined condition is satisfied. Meanwhile, any condition which does not cause a change in the operation performed by the electronic device 101 and the network 300 through the change in the UE capability may be the predetermined condition. For example, when CA or DC is not currently performed, the operation of the electronic device 101 and the network 300 has no change even though the information element for CA or DC of the UE capability is deactivated, and accordingly a possibility of resolution of the over-temperature state according to the change in the UE capability may be small.

According to various embodiment, when the predetermined (e.g., specified) condition is satisfied (Yes of operation 1205), the electronic device 101 may perform a first operation of reducing the number of antennas for reception in operation 1207. When the predetermined (e.g., specified) condition is not satisfied (No of operation 1205), the electronic device 101 may perform the first operation of reducing the number of antennas for reception and a second operation of changing at least some of the UE capability.

Referring to FIG. 13, the electronic device (for example, the electronic device 101 of FIG. 1) according to various embodiments may include a communication processor (e.g., including processing circuitry) 1320 (for example, at least one of the first communication processor 212, the second communication processor 214, or the integrated communication processor 260) a processor (e.g., including processing circuitry) 1321 (for example, the processor 120), a temperature sensor 1322 (for example, the sensor module 176), an RFIC 1310 (for example, at least one of the first RFIC 222, the second RFIC 224, the third RFIC 226, or the fourth RFIC 228), a first RFFE 1331, a second RFFE 1332, a first antenna 1341, a second antenna 1342, a third antenna 1343, and a fourth antenna 1344. A communication processor 1320 may control at least some of the RFIC 1310 or the RFFEs 1331 and 1332 in order to control the number of antennas for reception.

According to various embodiments, in transmission, the RFIC 1310 may convert a baseband signal generated by the communication processor 1320 into a radio frequency (RF) signal. For example, the RFIC 1310 may transmit the RF signal to the first antenna 1341 through the first RFFE 1331. Alternatively, in reception, the RFIC 1310 may convert the RF signal received from the RFFE, (for example, the first RFFE, 1331 or the second RFFE 1332) into a baseband signal and provide the baseband signal to the communication processor 1320. An element 1361 for transmission and elements 1363, 1364, 1365, and 1366 for reception may be included in the RFIC 1310. An element 1371 for transmission, elements 1372 and 1373 for reception, and a switch 1374 may be included in the first RFFE 1331. The switch 1374 may control the connection between each of the elements 1371, 1372, and 1373 and each of the antennas 1341 and 1342. Elements 1381 and 1382 for reception and a switch 1383 may be included in the second FRRE 1332. The switch 1383 may control the connection between each of the elements 1381 and 1382 and each of the antennas 1343 and 1344. The first antenna 1341 may be used for both transmission and reception and may be named an PRX antenna. The second antenna 1342, the third antenna 1343, and the fourth antenna 1344 may be used for reception and may be named DRX antennas. Meanwhile, the electronic device 101 may use the DRX antenna to transmit the SRS. Although not illustrated, the electronic device 101 may further include a switching structure for applying an RF signal for the SRS to the DRX antennas 1342, 1343, and 1344. For example, when the UE capability of the electronic device 101 is configured as 1t4r, the electronic device 101 may sequentially (for example, according to SRS transmission timing) apply the RF signal to the first antenna 1341 which is the PRX antenna, and the second antenna 1342, the third antenna 1343, and the fourth antenna 1344 which are the DRX antennas. For example, when the UE capability of the electronic device 101 is configured as 1t2r, the electronic device 101 may sequentially (for example, according to SRS transmission timing) apply the RF signal to the first antenna 1341 which is the PRX antenna, and one of the DRX antennas.

For example, when the number of antennas for reception is configured as 4, the communication processor 1320 may control at least some of the RFIC 1310 and the RFFEs 1331 and 1332 to perform reception through all of the first antenna 1341, the second antenna 1342, the third antenna 1343, and the fourth antenna 1344. Meanwhile, the processor 1321 may provide information indicating the over-temperature state to the communication processor 1320 based on temperature information acquired from the temperature sensor

1322. The communication processor 1320 may perform the first operation of controlling the number of antennas for reception based on the acquired information indicating the over-temperature state. For example, the communication processor 1320 may control the number of antennas for reception to be 2. In this case, the communication processor 1320 may control the RFIC 1310 and the second RFFE 1332 not to perform the reception operation through the third antenna 1343 and the fourth antenna 1344. In this case, at least some of the elements 1365, 1366, 1381, and 1382, and the antenna 1383 may be controlled not to receive the signal from the antennas 1343 and 1344. Alternatively, the communication processor 1320 may control the number of antennas for reception to be 1. In this case, the communication processor 1320 may control the RFIC 1310 and the RFFEs 1331 and 1332 not to perform the reception operation through the second antenna 1342, the third antenna 1343, and the fourth antenna 1344. In this case, at least some of the elements 1364, 1365, 1366, 1381, and 1382, and the antennas 1374 and 1383 may be controlled not to receive the signal from the antennas 1342, 1343, and 1344. The electronic device 101 may increase or decrease the number of antennas for reception during the current operation, and there is no limitation in the increased or decreased number.

According to various embodiments, the electronic device 101 may perform the first operation of reducing the number of antennas for reception when temperature sensed by the sensor module 176 is included in a first temperature range. The electronic device 101 may be configured to perform the second operation of changing at least some of the UE capability when temperature sensed by the sensor module 176 is included in a second temperature range different from the first temperature range. The second temperature range may be higher than the first temperature range, but may be lower than the first temperature range according to implementation.

Figure 14:
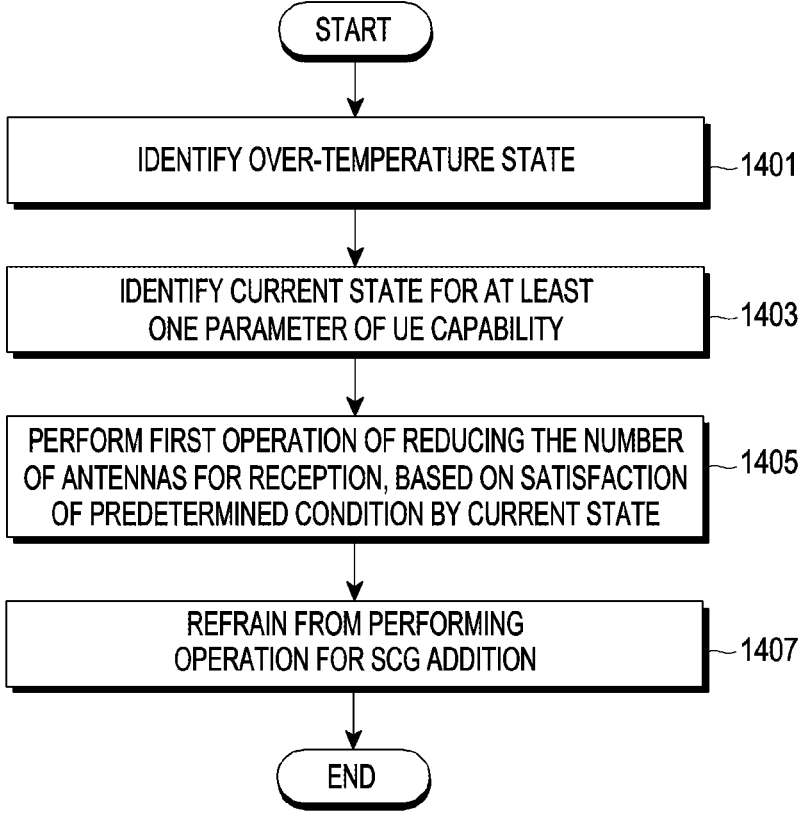
FIG. 14 is a flowchart illustrating an example method of operating an electronic device according to various embodiments.

FIG. 14 is a flowchart illustrating an example method of operating the electronic device according to various embodiments.

According to various embodiments, the electronic device 101 (for example, at least one of the processor 120, the first communication processor 212, the second communication processor 214, or the integrated communication processor 260) may identify an over-temperature state in operation 1401. In operation 1403, the electronic device 101 may identify the current state for at least one parameter of the UE capability. In operation 1405, the electronic device 101 may perform the first operation of reducing the number of antennas for reception based on satisfaction of a predetermined (e.g., specified) condition by the current state. As illustrated in FIG. 12, the electronic device 101 may perform only the first operation without the operation for changing and reporting the UE capability when there is no change in the operation of the electronic device 101 and the network 300 according to the change in the UE capability. Meanwhile, since the UE capability has not been changed, the network 300 may perform, for example, the operation for DC.

According to various embodiments, the electronic device 101 may refrain from performing the operation for adding a second cell group (SCG) in operation 1407. In one example, when an RRC reset message including a measurement object (MO) for SCG addition is received, the electronic device 101 may refrain from measuring the corresponding MO and/or performing a measurement report (MR). Alternatively, when the RRC reset message for SCG addition is received, the electronic device 101 may refrain from performing the operation for SCG addition, for example, performing an RACH procedure for the SCG and may transmit an SCG failure message to the network 300.

Meanwhile, not illustrated, the electronic device 101 may refrain from performing CA or transmitting the SRS. For example, since the UE capability has not been changed, the network 300 may perform, for example, the operation for CA or the SRS. Even when the RRC reset message for CA is received, the electronic device 101 may refrain from performing the operation for CA. The electronic device 101 may also refrain from transmitting the SRS when the SRS setting is included in the RRC reset message.

Figure 15:
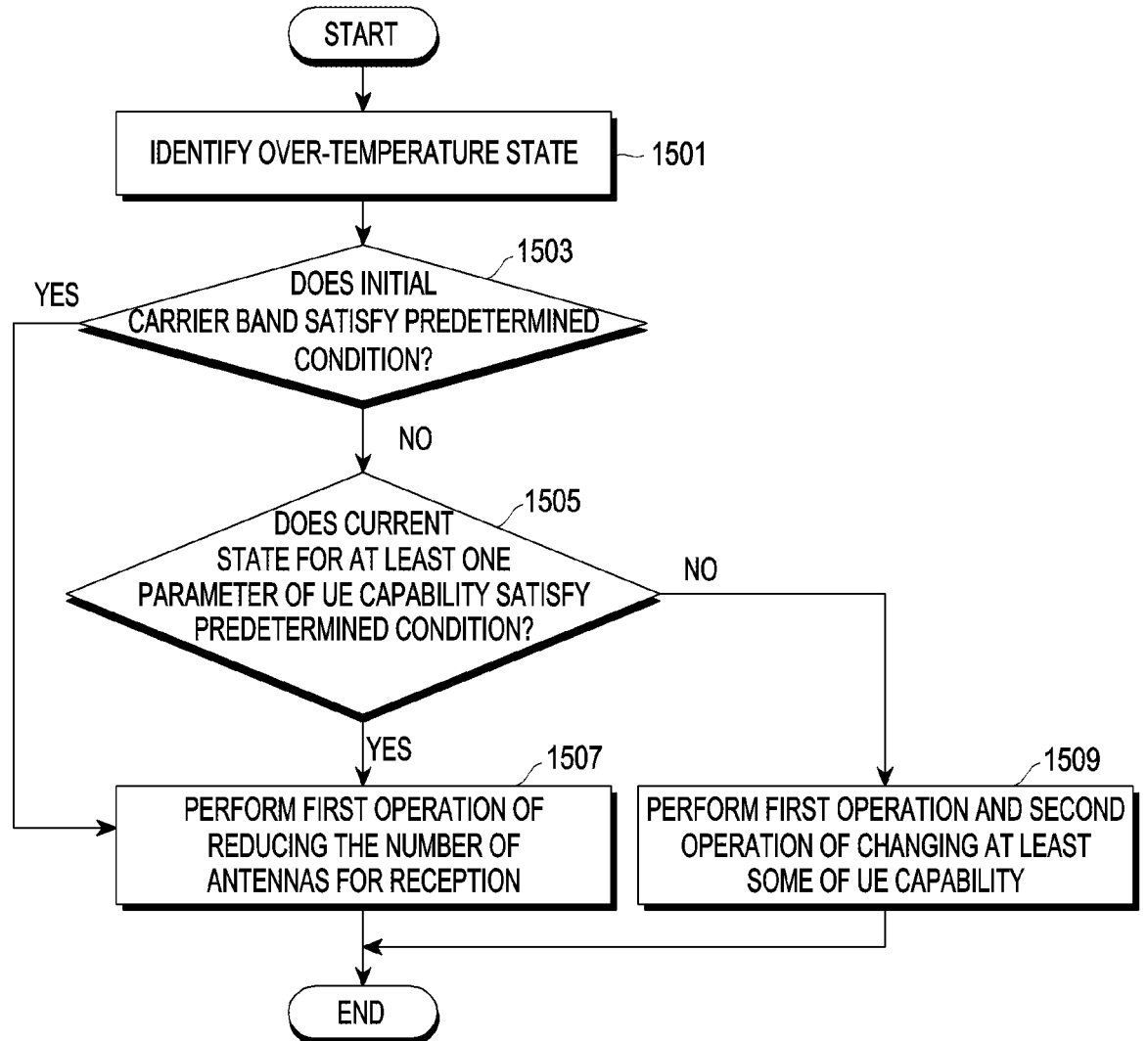
FIG. 15 is a flowchart illustrating an example method of operating an electronic device according to various embodiments.

FIG. 15 is a flowchart illustrating an example method of operating the electronic device according to various embodiments.

According to various embodiments, the electronic device 101 (for example, at least one of the processor 120, the first communication processor 212, the second communication processor 214, or the integrated communication processor 260) may identify an over-temperature state in operation 1501. In operation 1503, the electronic device 101 may determine whether an initial carrier band (initialcarrierbandwidth) satisfies a predetermined (e.g., specified) condition. For example, the electronic device 101 may determine whether the initial carrier bandwidth is included in a predetermined range (for example, equal or lower than 10 MHz or equal to or lower than 20 MHz). For example, 10 MHz may be the size configured to stably perform a voice over NR (VoNR) service or a ultra reliable low latency communication (URLLC) service. The VoNR service has a relatively low data rate used for a call service and a QoS class identifier (QCI) which is a guaranteed bit rate (GBR) type, and thus may be stably performed even though the UE capability is changed and/or the number of antennas for reception is controlled. The URLLC service is a service for low latency and high reliability and may not need a large data rate. For example, 3GPP TS 22.186 provides KPI of V2X and may need a data rate of about 53 Mbps, which may be a data rate which can be supported through a bandwidth of 10 MHz. For example, when only one CC is used as a bandwidth of 10 MHz in 5G communication, a data rate of about 84 Mbps may be acquired based on 2×2 MIMO and 64 QAM, which may be larger than 53 Mbps required by URLLC. For example, 20 MHz may be a bandwidth in which the URLLC service or the VoNR service is performed and also stable performance of another service is guaranteed. Alternatively, 20 MHz may be a bandwidth in which stable provision of a service (for example, eMBB service) requiring a relatively high data rate is guaranteed.

According to various embodiments, when the initial carrier bandwidth satisfies the predetermined condition (Yes of operation 1503), the electronic device 101 may perform the first operation of reducing the number of antennas for reception in operation 1507. When the initial carrier bandwidth does not satisfy the predetermined condition (Yes of operation 1503), the electronic device 101 may determine whether the current state for at least one parameter of the UE capability satisfies a predetermined (e.g., specified) condition in operation 1505. Information indicating whether the predetermined (e.g., specified) condition is satisfied in operation 1505 may be the same as or similar to that illustrated in FIG. 13. When the predetermined (e.g., specified) condition is satisfied (Yes of operation 1505), the electronic device 101 may perform the first operation of reducing the number of antennas for reception in operation 1507. When the predetermined (e.g., specified) condition is not satisfied (No of operation 1505), the electronic device 101 may perform the first operation and the second operation of changing at least some of the UE capability in operation 1509. As described above, when the initial carrier bandwidth is smaller than, for example, a specific bandwidth, the electronic device 101 may be configured to not control the UE capability in order to stably perform a specific service (for example, VoNR service or URLLC service).

Figure 16:
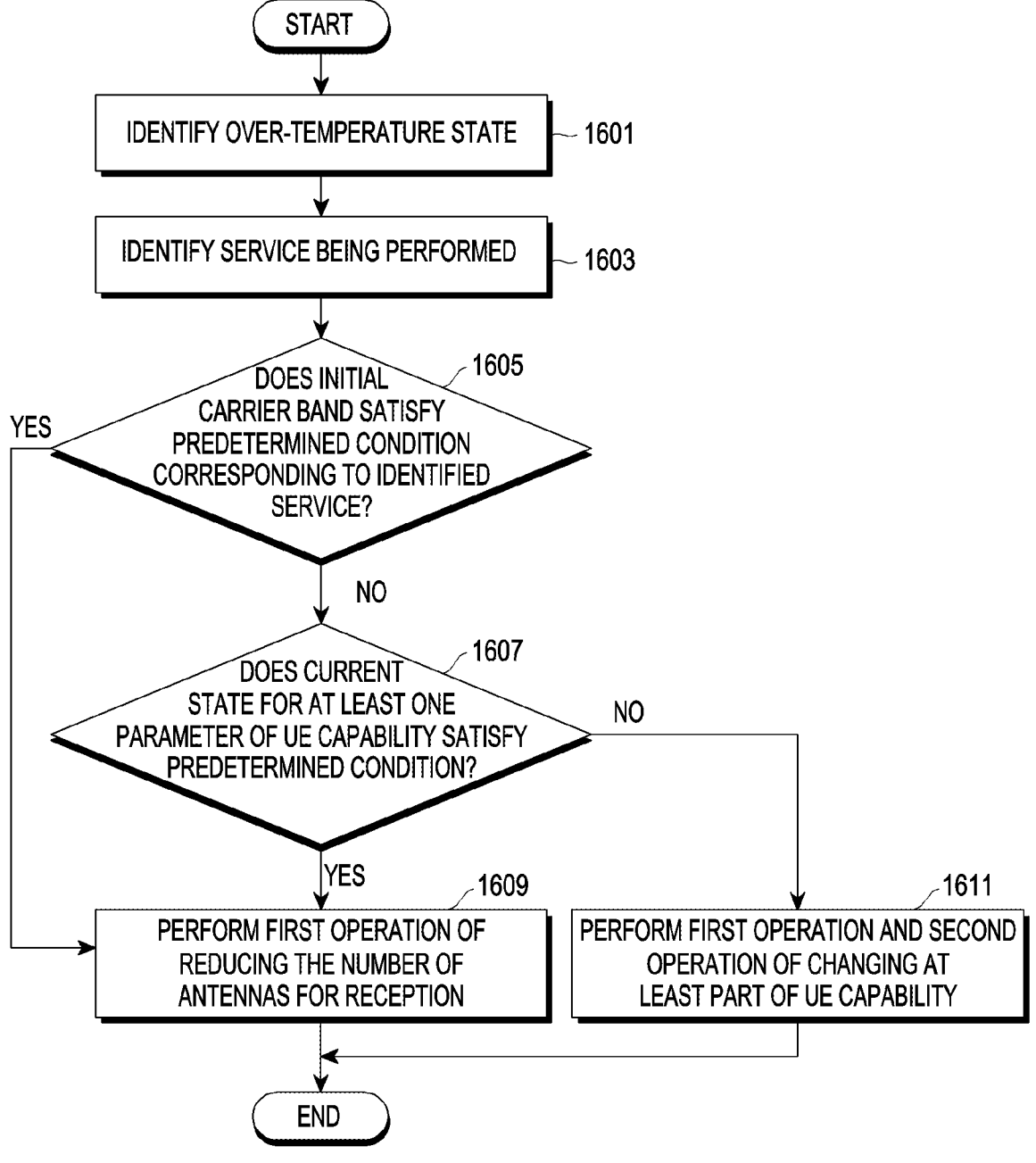
FIG. 16 is a flowchart illustrating an example method of operating an electronic device according to various embodiments.

FIG. 16 is a flowchart illustrating an example method of operating the electronic device according to various embodiments of the disclosure.

According to various embodiments, the electronic device 101 (for example, at least one of the processor 120, the first communication processor 212, the second communication processor 214, or the integrated communication processor 260) may identify an over-temperature state in operation 1601. In operation 1603, the electronic device 101 may identify a service being performed. In one example, when an over-temperature state is identified, the processor 120 may provide information on the over-temperature state and information on a service type being performed (for example, slice/service type (SST)) to a communication processor (for example, at least one of the first communication processor 212, the second communication processor 214, or the integrated communication processor 260). The communication processor (for example, at least one of the first communication processor 212, the second communication processor 214, or the integrated communication processor 260) may identify the service being performed based on the information on the service type being performed, received along with the information on the over-temperature state. In another example, the communication processor (for example, at least one of the first communication processor 212, the second communication processor 214, or the integrated communication processor 260) may establish at least one protocol data unit (PDU) session before the over-temperature state is identified. The communication processor (for example, at least one of the first communication processor 212, the second communication processor 214, or the integrated communication processor 260) may transmit a PDU session establishment request message to the network based on a network request (or network connection request) from an application. The PDU session establishment request message may include an SST. In this case, the communication processor (for example, at least one of the first communication processor 212, the second communication processor 214, or the integrated communication processor 260) may pre-store information on the SST. When information on the over-temperate state is received from the processor 120, the communication processor (for example, at least one of the first communication processor 212, the second communication processor 214, or the integrated communication processor 260) may identify the pre-stored service being performed on the basis thereof.

According to various embodiments, the electronic device 101 may determine whether the initial carrier band satisfies a predetermined (e.g., specified) condition corresponding to the identified service in operation 1605. When the initial carrier band satisfies the predetermined condition corresponding to the identified service (Yes of operation 1605), the electronic device 101 may perform the first operation of reducing the number of antennas for reception without any change in the UE capability in operation 1609. For example, when the URLLC service is being performed, the electronic device 101 may determine whether the initial carrier band is smaller than 10 MHz. Alternatively, in order to guarantee the stable performance of URLLC and another service, the electronic device 101 may determine whether the initial carrier band is smaller than 20 MHz when the URLLC service is being performed. For example, when the eMBB service is being performed, the electronic device 101 may determine whether the initial carrier band is smaller than 20 MHz. Meanwhile, the bandwidths for respective services to be compared are merely examples. A scheme for identifying the provided service based on the SST is also an example. In another example, the electronic device 101 may determine whether the initial carrier band satisfies a predetermined condition corresponding to a data rate being used by the initial carrier band. For example, the electronic device 101 may identify the used data rate and identify a bandwidth for stably supporting the identified data rate. When the initial carrier band is smaller than or equal to the identified bandwidth, the electronic device 101 may perform the first operation of reducing the number of antennas for reception but not change the UE capability.

According to various embodiments, when the initial carrier band does not satisfy a predetermined (e.g., specified) condition corresponding to the identified service (No of operation 1605), the electronic device 101 may determine whether the current state for at least one parameter of the UE capability satisfies a predetermined (e.g., specified) condition in operation 1607. When the current state for at least one parameter of the UE capability satisfies the predetermined (e.g., specified) condition (Yes of operation 1607), the electronic device 101 may perform the first operation of reducing the number of antennas for reception but not change the UE capability in operation 1609. When the current state for at least one parameter of the UE capability does not satisfy the predetermined condition (No of operation 1607), the electronic device 101 may perform the first operation and the second operation of changing at least some of the UE capability in operation 1611.

Figure 17:
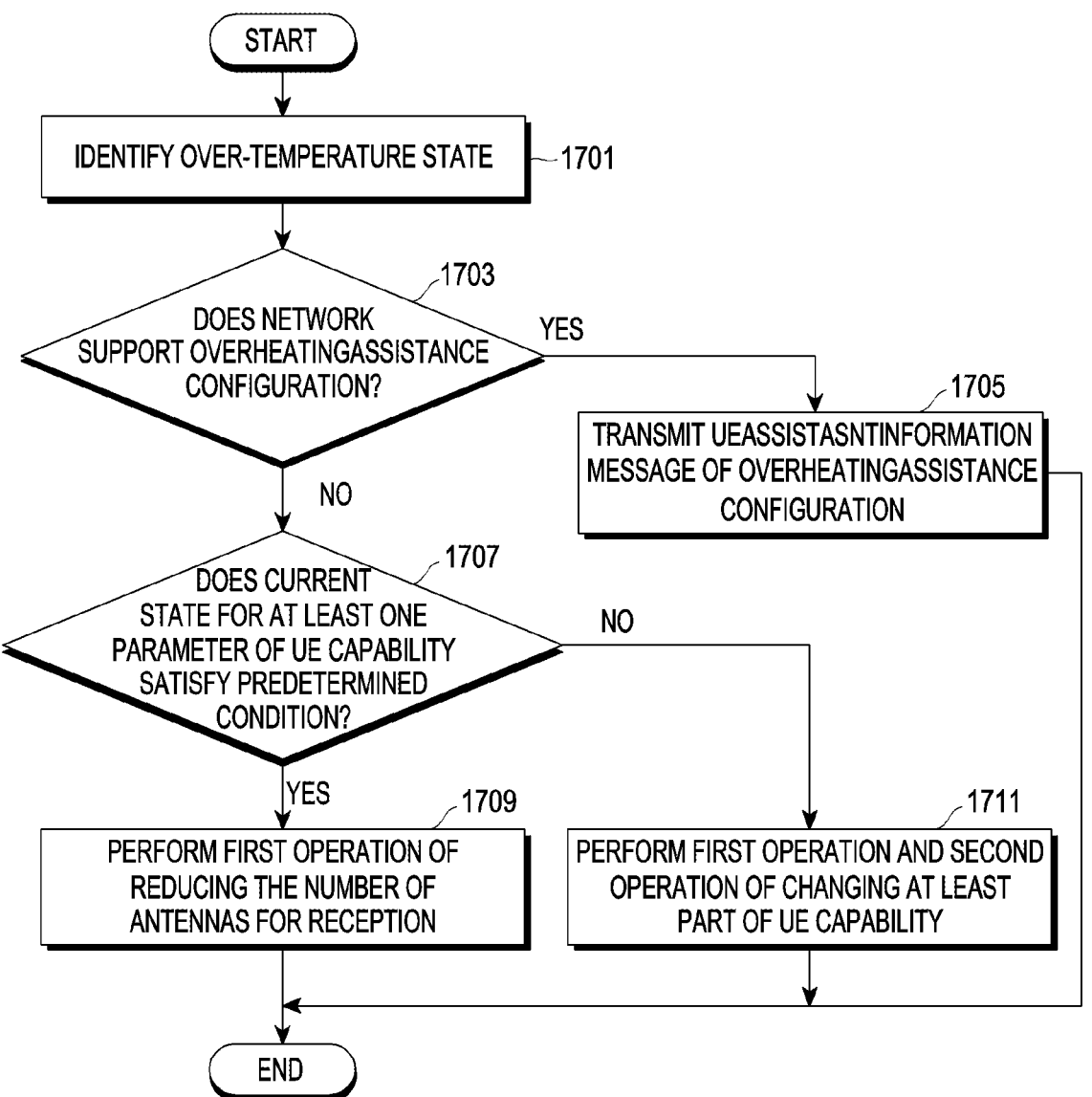
FIG. 17 is a flowchart illustrating an example method of operating an electronic device according to various embodiments.

FIG. 17 is a flowchart illustrating an example method of operating the electronic device according to various embodiments of the disclosure.

According to various embodiments, the electronic device 101 (for example, at least one of the processor 120, the first communication processor 212, the second communication processor 214, or the integrated communication processor 260) may identify an over-temperature state in operation 1701. The electronic device 101 may determine whether the network 300 supports an OverheatingAssistance setting or configuration in operation 1703. For example, when otherconfig including the OverheatingAssistance is received, the electronic device 101 may determine that the network supports the OverheatingAssistance setting. For example, when otherconfig including the OverheatingAssistance is not received, the electronic device 101 may determine that the network does not support the OverheatingAssistance setting.

According to various embodiments, when it is determined that the network 300 supports the OverheatingAssistance setting (Yes of operation 1703), the electronic device 101 may transmit a UEAssistantInformation message of the OverheatingAssistance setting in operation 1705. The electronic device 101 may make a request for at least one of the reduction in the maximum number of CCs of CA, the reduction in the maximum bandwidth, or the reduction in the maximum number of MIMO layers based on the OverheatingAssistance setting. In one example, when the electronic device 101 identifies an over-temperature indication, the electronic device may transmit a UEAssistantInformation message including preconfigured information in accordance with the over-temperature indication. For example, the over-temperature indication may be included in temperature information received from the temperature sensor or may be generated by the processor 120 based on temperature information. Alternatively, the electronic device 101 may transmit the UEAssistantInformation message including identified information in accordance with the current temperature (or range including the current temperature). The network 300 may reduce at least one of the maximum number of CCs of CA, the maximum bandwidth, or the maximum number of MIMO layers based on the UEAssistantInformation message of the OverheatingAssistance setting. Alternatively, the network 300 may not configure SRS transmission antenna switching for the electronic device 101 based on reception of the UEAssistantInformation message of the OverheatingAssistance setting. For example, the network 300 may transmit an RRC reset message for releasing the SRS-related setting to the electronic device 101. Alternatively, the network 300 may perform control to reduce transmission power of the electronic device 101 based on reception of the UEAssistantInformation message of the OverheatingAssistance setting. For example, the network 300 may perform control to reduce transmission power of the electronic device 101 by performing transmit power control (TPC). For example, the network 300 may transmit downlink control information (DCI) causing reduction in transmission power to the electronic device 101.

According to various embodiments, when it is determined that the network 300 does not support the OverheatingAssistance setting (No of operation 1703), the electronic device 101 may determine whether the current state for at least one parameter of the UE capability satisfies a predetermined (e.g., specified) condition in operation 1707. When the predetermined (e.g., specified) condition is satisfied (Yes of operation 1707), the electronic device 101 may perform the first operation of reducing the number of antennas for reception but not change the UE capability in operation 1709. When the predetermined condition is not satisfied (No of operation 1707), the electronic device 101 may perform the first operation and the second operation of changing at least some of the UE capability in operation 1711.

Figure 18:
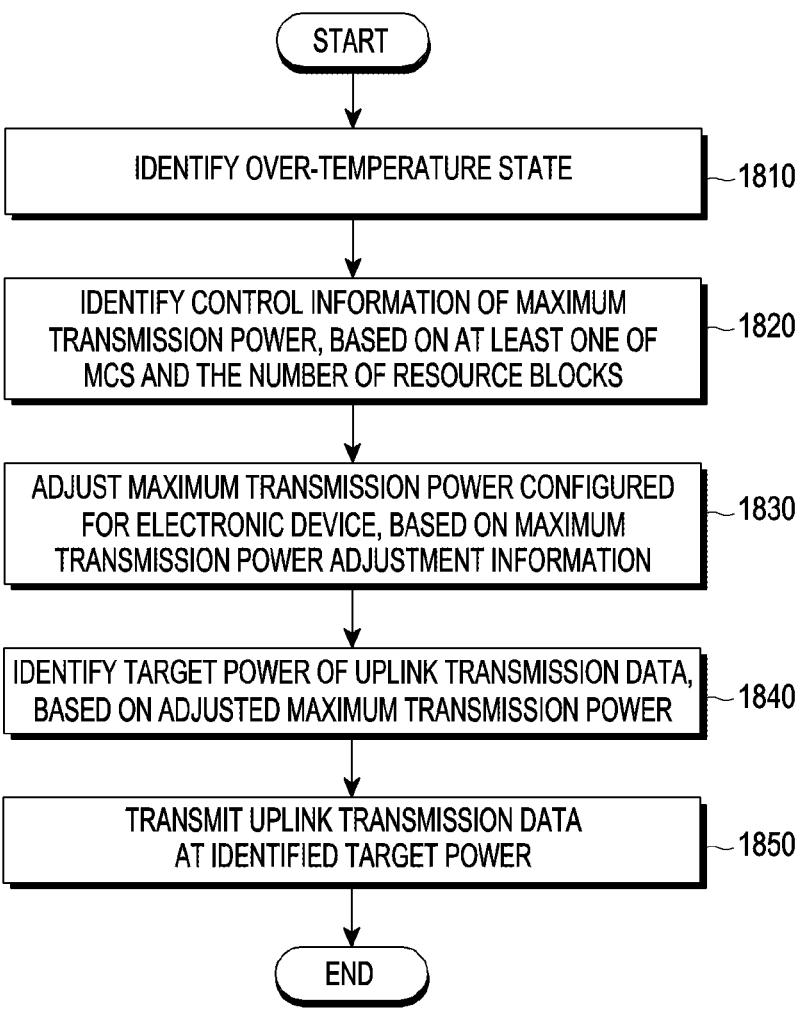
FIG. 18 is a flowchart illustrating an example method of operating an electronic device according to various embodiments.

FIG. 18 is a flowchart illustrating an example method of operating an electronic device according to various embodiments of the disclosure. Referring to FIG. 18, according to various embodiments, the electronic device 101 (for example, at least one of the processor 120, the first communication processor 212, the second communication processor 214, or the integrated communication processor 260) may identify an over-temperature state (or information related to the over-temperature state) in operation 1810. For example, the electronic device 101 may identify an indication indicating over-temperature in operation 1810. For example, the processor 120 may acquire temperature information from the sensor module 176. For example, the processor 120 may determine whether acquired temperature information is higher than or equal to predetermined threshold temperature (for example, 43° C.). When the acquired temperature information is higher than or equal to the threshold temperature, the processor 120 may provide an indication indicating over-temperature to a communication processor (for example, at least one of the first communication processor 212, the second communication processor 214, or the integrated communication processor 260). Meanwhile, in another implementation, the communication processor (for example, at least one of the first communication processor 212, the second communication processor 214, or the integrated communication processor 260) may directly acquire temperature information from the sensor module 176. In this case, the communication processor (for example, at least one of the first communication processor 212, the second communication processor 214, or the integrated communication processor 260) may determine whether the acquired temperature information is higher than or equal to the predetermined threshold temperature.

According to various embodiments, the electronic device 101 may identify information related to the over-temperature state in operation 1810. For example, the electronic device 101 may manage a plurality of temperature ranges. The electronic device 101 may identify a temperature range including the measured temperature as information related to the over-temperature state.

According to various embodiments, the electronic device 101 may control transmission power based on information related to a physical (PHY) layer (for example, information related to resource allocation) in accordance with identification of the over-temperature state (or information related to the over-temperature state). For example, the electronic device 101 may identify whether maximum power transmission (max Tx power) is controlled and/or control information of the maximum transmission power based on information related to the physical layer in accordance with identification of the over-temperature state. The information related to the physical layer may include at least one of a modulation and coding scheme (MCS), the number of resource blocks (RBs) (NRB), a grant ratio, a block error rate (BLER), a data rate (or throughput (T-put), a buffer status index (BSI), or a path loss (PL). According to various embodiments, the electronic device 101 may use an average value for a configured unit time (for example, 1 second) to apply the information related to the physical layer in the following embodiments.

According to various embodiments, the electronic device 101 may control power of the transmission signal according to target power required by a base station within maximum power transmission which can be transmitted by the electronic device 101. For example, the electronic device may control power of the transmission signal to be a minimum value among the target power and the maximum transmission power of the electronic device (UE Tx MAX Power). According to various embodiments, a minimum value among available maximum transmission power (PcMax) of the electronic device considering the characteristic of the electronic device, maximum transmission power (PeMax) according to a power class configured in the electronic device, and maximum transmission power (SAR Max Power) considering a specific absorption rate (SAR) backoff event may be determined as the maximum transmission power of the electronic device (UE Tx MAX Power), but there is no limitation in a determination method thereof. In the following description, it is assumed that the maximum transmission power (UE Tx MAX Power) is the available maximum transmission power (PcMax) of the electronic device.

According to various embodiments, the target power may be changed according to a channel state varying in real time, and may be determined according to transmitting power control (TPC) by the base station. For example, the electronic device 101 may determine the target power based on [Equation 1] below according to the standard document 3GPP TS 38.213.

$$P_{O\_PUSCH,b,f,c}(j) + 10\log_{10}\left(2^{\mu} \cdot M^{PUSCH}_{RB,b,f,c}(i)\right) + \qquad \text{[Equation 1]}$$

-continued
$$\alpha_{b,f,c}(j) \cdot PL_{b,f,c}(q_d) + \Delta_{TF,b,f,c}(i) + f_{b,f,c}(i, l)$$

The definition of [Equation 1] above may follow 3GPP TS 38.213, and, for example, $P_{O\_PUSCH,b,f,c}(j)$ may be provided by p0 for an active uplink bandwidth part (UL BWP) (b) of a carrier (f) of a serving cell (c). $M^{PUSCH}_{RB,b,f,c}(i)$ is a bandwidth expressed by numbers of resource blocks for a transmission occasion (i) in the active UL BWP (b) of the carrier (f) of the serving cell (c), and μ is subcarrier spacing (SCS). $\alpha_{b,f,c}(j)$ may be provided by alpha for the active UL BWP of the carrier (f) of the serving cell (c). $PL_{b,f,c}(q_d)$ is a downlink path loss predicted in units of dB by the user equipment (UE) using an RS resource index ($q_d$) for an active downlink BWP (DL BWP) of the serving cell (c). $f_{b,f,c}(i)$ may follow 3GPP TS 38.213 and is a value which can be controlled by downlink control information (DCI) transmitted from the base station to the electronic device. According to various embodiments, the electronic device 101 may determine the target power determined based on [Equation 1] above within a range that exceeds the maximum transmission power of the electronic device. For example, when the maximum transmission power of the electronic device is configured as 20 dBm and the target power determined based on [Equation 1] above is 21 dBm, transmission power for uplink data transmission by the electronic device 101 may be limited to 20 dBm.

According to various embodiments, the electronic device 101 may identify control information of the maximum transmission power based on information related to the physical (PHY) layer (for example, information related to resource allocation) in accordance with identification of the over-temperature state (or information related to the over-temperature state) in operation 1810. For example, the electronic device 101 may identify the control information of the maximum transmission power based on at least one of the MCS and the number of resource blocks in operation 1820. For example, the electronic device 101 may identify information on the MCS and identify the control information of the maximum transmission power based on the MCS index. The control information of the maximum transmission power may include a control value (γ) of the maximum transmission power.

The MCS index may be indicated as shown in [Table 1] below, but is not limited thereto.

TABLE 1

| MCS Index | Modulation Order | Spectral efficiency | Target code Rate x [1024] |
|---|---|---|---|
| 0 | 2 | 0.2344 | 120 |
| 1 | 2 | 0.377 | 193 |
| 2 | 2 | 0.6016 | 308 |
| 3 | 2 | 0.877 | 449 |
| 4 | 2 | 1.1758 | 602 |
| 5 | 4 | 1.4766 | 378 |
| 6 | 4 | 1.6953 | 434 |
| 7 | 4 | 1.9141 | 490 |
| 8 | 4 | 2.1602 | 553 |
| 9 | 4 | 2.4063 | 616 |
| 10 | 4 | 2.5703 | 658 |
| 11 | 6 | 2.7305 | 466 |
| 12 | 6 | 3.0293 | 517 |
| 13 | 6 | 3.3223 | 567 |
| 14 | 6 | 3.6094 | 616 |
| 15 | 6 | 3.9023 | 666 |
| 16 | 6 | 4.2129 | 719 |
| 17 | 6 | 4.5234 | 772 |

TABLE 1-continued

| MCS Index | Modulation Order | Spectral efficiency | Target code Rate x [1024] |
|---|---|---|---|
| 18 | 6 | 4.8164 | 822 |
| 19 | 6 | 5.1152 | 873 |
| 20 | 8 | 5.332 | 682.5 |
| 21 | 8 | 5.5547 | 711 |
| 22 | 8 | 5.8906 | 754 |
| 23 | 8 | 6.2266 | 797 |
| 24 | 8 | 6.5703 | 841 |
| 25 | 8 | 6.9141 | 885 |
| 26 | 8 | 7.1602 | 916.5 |
| 27 | 8 | 7.4063 | 948 |
| 28 | 2 | | reserved |
| 29 | 4 | | reserved |
| 30 | 6 | | reserved |

According to various embodiments, the electronic device 101 may map and apply at least one MCS index or a range of the MCS index and the control value (γ) of the maximum transmission power. For example, the electronic device 101 may configure one MCS index to be mapped to the control value (γ) of specific maximum transmission power or configure a plurality of MCS indexes to be mapped to the control value (γ) of specific maximum transmission power. In another example, the electronic device 101 may map an interval or a range including at least one MCS index to the control value (γ) of specific maximum transmission power and store the same. For example, the control value (γ) of the maximum transmission power may be configured as −1 and controlled by −1 dB from the currently configured maximum transmission power when the range of the MCS index is from 3 to 10, the control value (γ) of the maximum transmission power may be configured as −2 and controlled by −2 dB from the currently configured maximum transmission power when the range of the MCS index is from 11 to 19, and the control value (γ) of the maximum transmission power may be configured as −3 and controlled by −3 dB from the currently configured maximum transmission power when the range of the MCS index is from 20 to 27. For example, when the maximum transmission power (for example, an initial value of the maximum transmission power or a current value of the maximum transmission power) is configured as 23 dBm, the maximum transmission power may be controlled to be 22 dBm if the maximum transmission power is controlled by −1 dB according to the MCS index, the maximum transmission power may be controlled to be 21 dBm if the maximum transmission power is controlled by −2 dB according to the MCS index, and the maximum transmission power may be controlled to be 20 dBm if the maximum transmission power is controlled by −3 dB according to the MCS index.

According to various embodiments, the electronic device 101 may identify information related to the number of resource blocks allocated to the electronic device and identify control information of the maximum transmission power based on the identified number of resource blocks. For example, the electronic device 101 may map and apply the number of resource blocks or a range of the number of resource blocks and the control value (γ) of the maximum transmission power. For example, the control value (γ) of the maximum transmission power may be configured as −1 and controlled by −1 dB from the currently configured maximum transmission power when the range of the number of resource blocks is from 0 to 30, the control value (γ) of the maximum transmission power may be configured as −2 and controlled by −2 dB from the currently configured maximum transmission power when the range of the number of resource blocks is from 31 to 60, and the control value (γ) of the maximum transmission power may be configured as −3 and controlled by −3 dB from the currently configured maximum transmission power when the range of the number of resource blocks is larger than 60. For example, when the maximum transmission power (for example, the initial value of the maximum transmission power or the current value of the maximum transmission power) is configured as 23 dBm, the maximum transmission power may be controlled to be 22 dBm if the maximum transmission power is controlled by −1 dB according to the number of resource blocks, the maximum transmission power may be controlled to be 21 dBm if the maximum transmission power is controlled by −2 dB according to the number of resource blocks, and the maximum transmission power may be controlled to be 20 dBm if the maximum transmission power is controlled by −3 dB according to the number of resource blocks.

Figure 20:
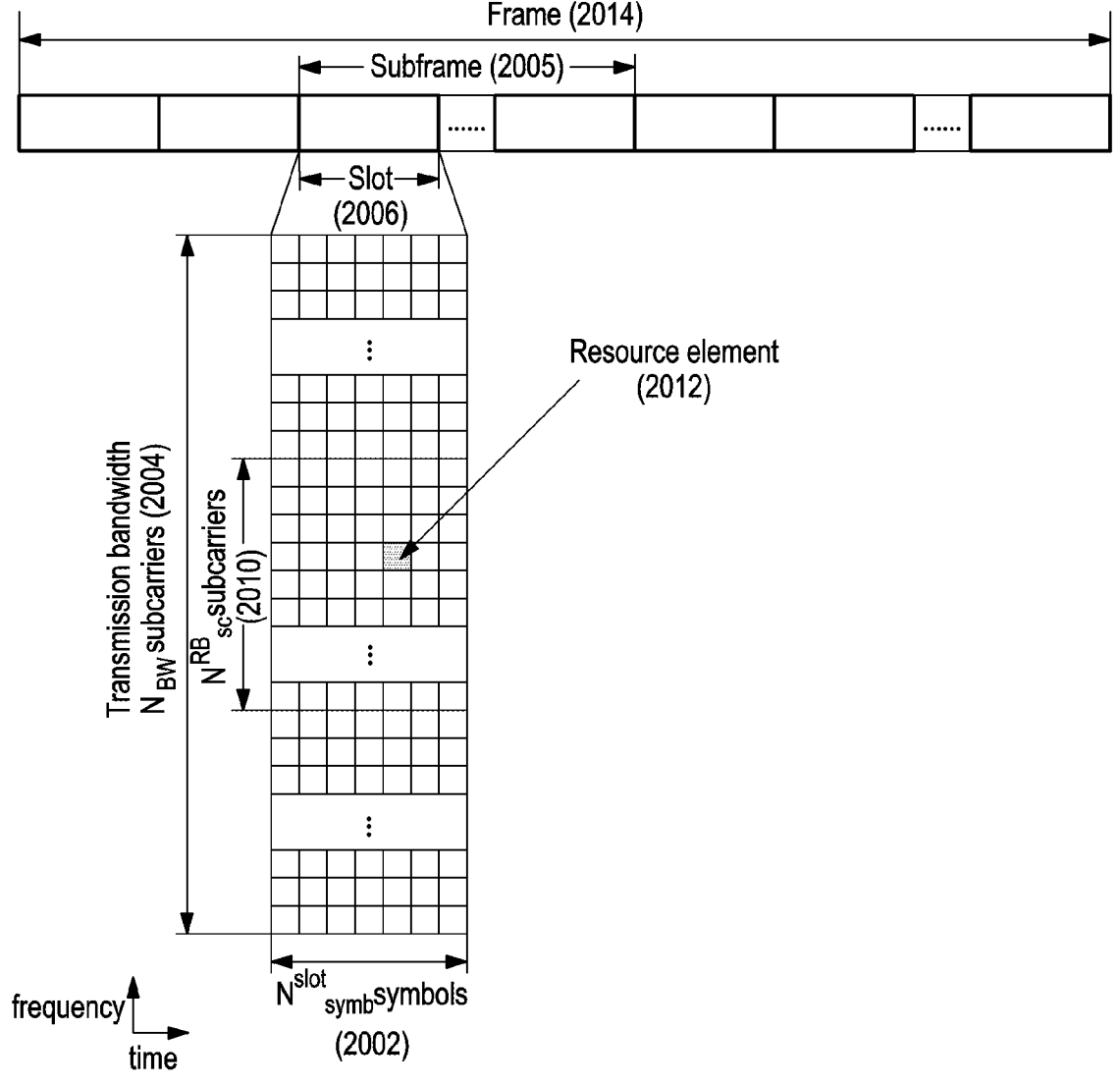
FIG. 20 is a diagram illustrating an example structure of resource blocks allocated to an electronic device according to various embodiments.

FIG. 20 illustrates a structure of resource blocks allocated to an electronic device according to various embodiments. Referring to FIG. 20, a horizontal axis indicates a time domain and a vertical axis indicates a frequency domain. A minimum transmission unit in the time domain of the 5G system is an orthogonal frequency division multiplexing (OFDM) symbol, one slot 2006 may include $$N_{symb}^{slot}$$

symbols 2002, and one subframe 2005 may include $$N_{slot}^{subframe}$$

slots. A length of the subframe may be 1.0 ms, and one subframe 2014 having a length of 10 ms may include 10 subframes. A minimum transmission unit in the frequency region is a subcarrier, and the bandwidth of an entire system transmission band may include a total of $N_{BW}$ subcarriers 2004.

A basic unit of resources in the time-frequency domain is a resource element (RE) 2012 and may be indicated by an OFDM symbol index and a subcarrier index. A resource block (RB) may be defined as $$N_{sc}^{RB}$$

consecutive subcarriers 2010 in the frequency domain. In the 5G system, $$N_{sc}^{RB} = 12,$$

and a data rate may increase in proportion to the number of RBs scheduled in the electronic device 101. In the 5G system, the BS may map data in units of RBs and schedule RBs included in one slot for each electronic device 101. For example, a basic time unit for scheduling in the 5G system may be a slot, and a basic frequency unit for scheduling may be an RB. Although FIG. 20 illustrates RBs in the 5G system, various embodiments are not limited to the 5G system and may be applied to various communication systems including an LTE system in the same or similar way.

According to various embodiments, the electronic device 101 may identify control information of the maximum transmission power based on the MCS and the number of resource blocks in accordance with identification of the over-temperature state (or information related to the over-temperature state) in operation 1820. For example, the electronic device 101 may identify control information of the maximum transmission power in consideration of both the MCS and the number of resource blocks. For example, according to the embodiment, the electronic device 101 may identify control information of the maximum transmission power (for example, a control value (γ) of the maximum transmission power) based on a mapping table considering both the MCS and resource blocks as shown in [Table 2] below.

TABLE 2

| | | Control value (γ) according to number of resource blocks | | |
| --- | --- | --- | --- | --- |
| | | 1~30 | 31~60 | 61~ |
| MCS index | 3~10 | +1 | 0 | −1 |
| | 11~19 | 0 | −1 | −2 |
| | 20~27 | −1 | −2 | −3 |

According to various embodiments, the electronic device 101 may control or adjust maximum transmission power configured for the electronic device based on the identified control information of the maximum transmission power in operation 1830. For example, referring to [Table 2] above, when the MCS index is 11 to 19 and the number of resource blocks is 31 to 60, the control value (γ) of the maximum transmission power may be configured as −1 and the maximum transmission power may be controlled by −1 dB. For example, when the current maximum transmission power or the initial value of the maximum transmission power is 23 dBm, the maximum transmission power may be configured or controlled as 22 dBm according to the MCS index and the number of resource blocks. According to various embodiments, the electronic device 101 may identify target power of uplink (UL) transmission data based on the controlled or adjusted maximum transmission power in operation 1840. For example, the target power of the uplink transmission data may be configured a value making the target power determined based on [Equation 1] above not exceed the controlled maximum transmission power. For example, when the target power determined based on [Equation 1] above is 23 dBm and the maximum transmission power is controlled from 23 dBm to 22 dBm, target power of final uplink transmission date may be configured or identified as 22 dBm. According to various embodiments, the electronic device 101 may transmit the uplink transmission data with the configured or identified target power based on the controlled or adjusted maximum transmission power in operation 1850.

According to various embodiments, although the control value (γ) of the maximum transmission power is used for controlling the maximum transmission power in the above embodiment, the control value (γ) of the maximum transmission power may be used for controlling the target power in [Equation 1] described above. For example, referring to [Table 2] above, when the MCS index is 11 to 19 and the number of resource blocks is 31 to 60, the control value (γ)

of the maximum transmission power may be configured as −1 and the target power may be controlled by −1 dB.

According to various embodiments, the electronic device 101 may determine whether to apply the control of the maximum transmission power in operations 1820 and 1830 based on information related to the physical (PHY) layer (for example, information related to resource allocation).

For example, when the path loss is larger than or equal to a configured value (30 dB), it may be determined that the electronic device 101 is located in a peripheral area of the cell or that the electronic device is in a weak electric field, the control of the maximum transmission power may not be applied. For example, even though the maximum transmission power can be controlled form 23 dBm to 22 dBm according to the MCS and/or the number of resource blocks, if the path loss is larger than or equal to the configured value, the maximum transmission power may not be reduced any more or inversely the maximum transmission power may be controlled to be increased.

According to various embodiments, when controlling the maximum transmission power, the electronic device 101 may configure the same not to exceed a configured maximum value or not to be smaller than a configured minimum value. For example, when the maximum value of the maximum transmission power is configured as 25 dBm and the minimum value is configured as 10 dBm, the electronic device 101 may control the maximum transmission power not to exceed 25 dBm configured as the maximum value even through the maximum transmission power increases according to the MCS and/or the number of resource blocks and control the maximum transmission power not to be smaller than 10 dBm configured as the minimum value even though the maximum transmission power decreases.

According to various embodiments, the electronic device 101 may not apply the control of the maximum transmission power when the grant ratio is larger than or equal to a configured value. For example, the grant ratio is larger than or equal to 50%, the electronic device 101 may perform control not to further reduce the maximum transmission power from the currently configured value or control the maximum transmission power not to be reduced by a configured value (for example, 3 dB) or more from the initial value of the maximum transmission power.

Figure 21:
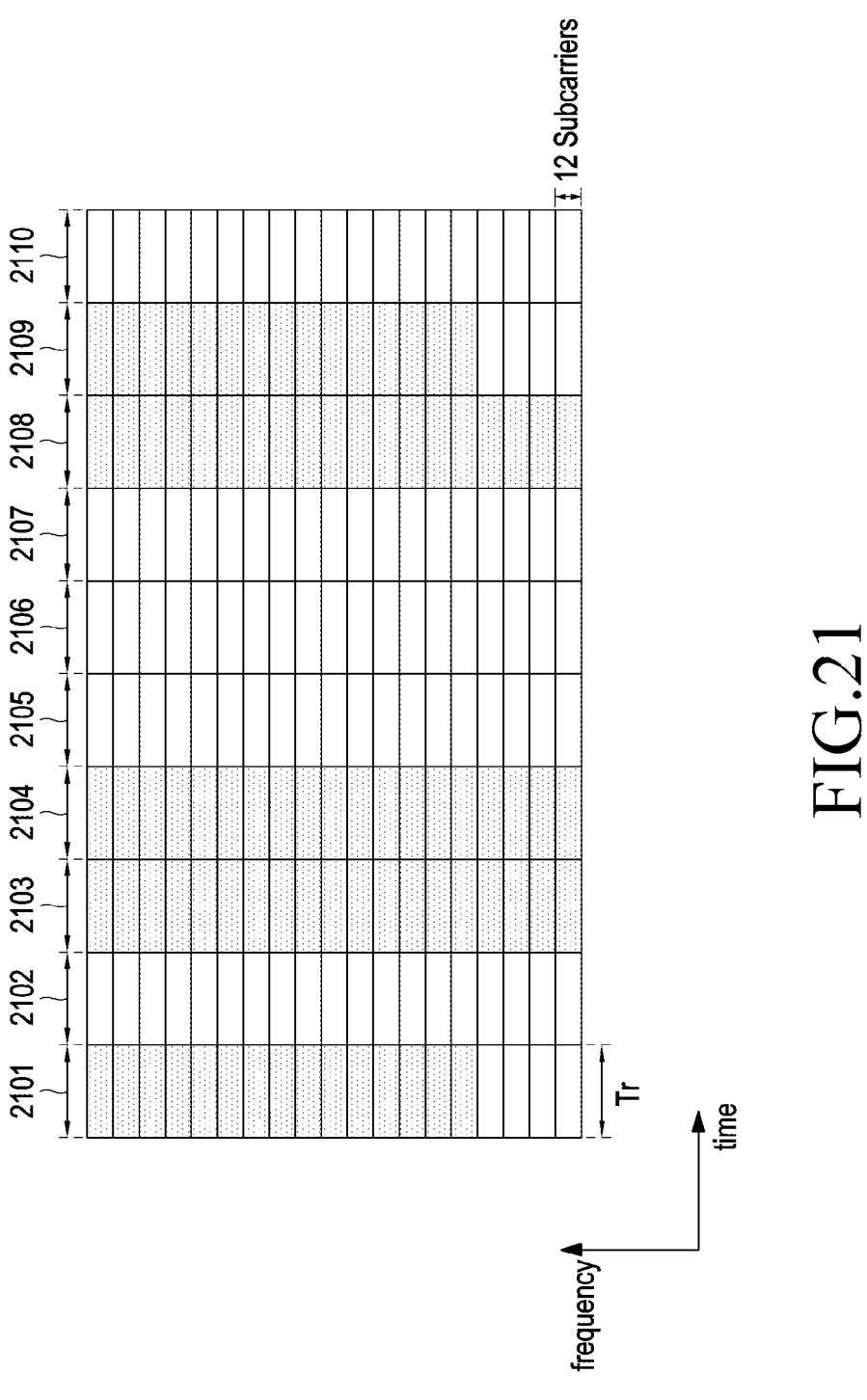
FIG. 21 is a diagram illustrating the concept of a grant ratio allocated to an electronic device according to various embodiments.

According to various embodiments, the grant ratio may be determined as illustrated in FIG. 21. Referring to FIG. 21, the grant ratio may indicate a ratio of allocated resource blocks in the time axis. In FIG. 21, the horizontal axis may indicate a time axis and the vertical axis may indicate a frequency axis. In FIG. 21, one box may indicate one resource block (RB), but is not limited thereto. For example, in FIG. 21, one box in the horizontal axis may indicate one OFDM symbol, two or more OFDM symbols, or one slot including a plurality of OFDM symbols, but is not limited thereto. In the following description, in FIG. 21, it is assumed that one box in the horizontal axis is one slot including 14 OFDM symbols and one box in the vertical axis includes 12 subcarriers for convenience of description. For example, in one slot 2101 of FIG. 21, 15 RBs of a total of 19 RBs may be allocated for data transmission by the electronic device 101. In a second slot 2102, a third slot 2103, a sixth slot 2106, a seventh slot 2107, and a tenth slot 2110, no RB may be allocated. In a fourth slot 2104, a fifth slot 2105, and an eight slot 2108, all of the total of 19 RBs may be allocated. In a ninth slot 2109, 5 RBs may be allocated. Referring to FIG. 21, in 5 slots of a total of 10 slots, at least one RB is allocated, and thus the grant ratio may be calculated as 50% (5/10). According to various embodiments, when the grant ratio is larger than or equal to 50% and the maximum transmission power is reduced by 3 dB or more, the grant ratio should be increased two times, and thus the BS may have difficulty in additionally allocated resource blocks, thereby performing control not to further reduce the maximum transmission power in order to guarantee a transmission rate (for example, data rate) for the electronic device 101.

According to various embodiments, when the BSI is larger than or equal to a preset value, the electronic device 101 may not apply the control of the maximum transmission power. The BSI may be an index configured according to the size of a buffer for a predetermined time within a memory buffer of the electronic device 101 and may be configured as shown in [Table 3] below, but is not limited thereto.

TABLE 3

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 406 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |

TABLE 3-continued

| Index | Buffer Size (BS) value [bytes] |
|---|---|
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

For example, when the BSI is larger than or equal to a specific value, the electronic device 101 may perform control not to further reduce the maximum transmission power from the currently configured value or not to reduce the maximum transmission power by a configured value (for example, 3 dB) or more from the initial value of the maximum transmission power. The BSI may be transmitted while being inserted into a buffer status report (BSR) transmitted from the electronic device 101 to the network. For example, the electronic device 101 may transmit the BSR including the BSI to the network through a medium access control (MAC) control element (CE). According to various embodiments, the electronic device 101 may identify the BSI included in the BSR to be transmitted to the network and, when the BSI is larger than or equal to a configured value, may perform control not to reduce the maximum transmission power. For example, referring to [Table 3] above, when the BSI is 50, the buffer size may corresponding to 19325 bytes to 22624 bytes, and the electronic device 101 may perform control not to reduce the maximum transmission power in order to guarantee transmission of data corresponding to the buffer size.

According to various embodiments, when a BLER is larger than or equal to a configured value, the electronic device 101 may not apply the control of the maximum transmission power. For example, when the BLER is larger than or equal to 10%, the electronic device 101 may perform control not to further reduce the maximum transmission power from a currently configured value.

Figure 19:
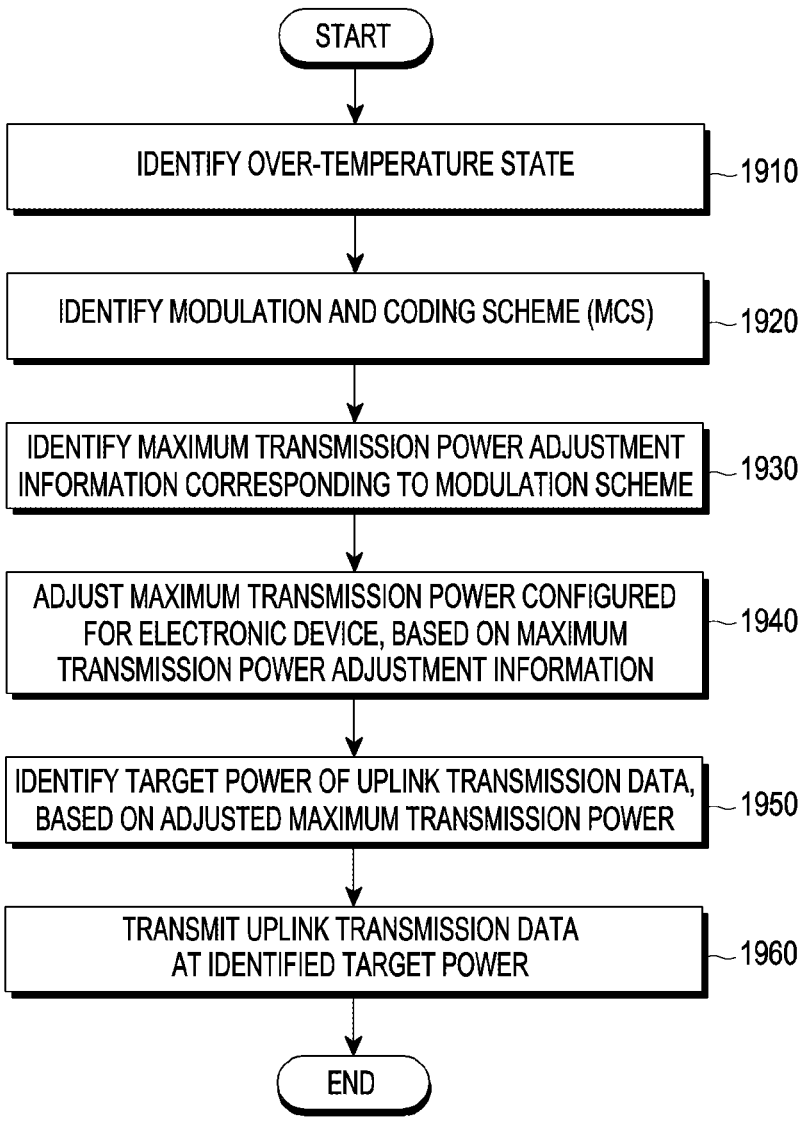
FIG. 19 is a flowchart illustrating an example method of operating an electronic device according to various embodiments.

FIG. 19 is a flowchart illustrating an example method of operating the electronic device according to various embodiments. Referring to FIG. 19, according to various embodiments, the electronic device 101 (for example, at least one of the processor 120, the first communication processor 212, the second communication processor 214, or the integrated communication processor 260) may identify an over-temperature state (or information related to the over-temperature state) in operation 1910. For example, the electronic device 101 may identify an indication indicating over-temperature in operation 1910. For example, the processor 120 may acquire temperature information from the sensor module 176. For example, the processor 120 may determine whether acquired temperature information is higher than or equal to predetermined threshold temperature (for example, 43° C.). When the acquired temperature information is higher than or equal to the threshold temperature, the processor 120 may provide an indication indicating over-temperature to a communication processor (for example, at least one of the first communication processor 212, the second communication processor 214, or the integrated communication processor 260). Meanwhile, in another implementation, the communication processor (for example, at least one of the first communication processor 212, the second communication processor 214, or the integrated communication processor 260) may directly acquire temperature information from the sensor module 176. In this case, the communication processor (for example, at least one of the first communication processor 212, the second communication processor 214, or the integrated communication processor 260) may determine whether the acquired temperature information is higher than or equal to the predetermined threshold temperature.

According to various embodiments, the electronic device 101 may identify information related to the over-temperature state in operation 1910. For example, the electronic device 101 may manage a plurality of temperature ranges. The electronic device 101 may identify a temperature range including the measured temperature as information related to the over-temperature state.

According to various embodiments, the electronic device 101 may control transmission power based on an MCS in accordance with identification of the over-temperature state (or information related to the over-temperature state). For example, the electronic device 101 may identify control information of maximum transmission power based on the MCS in accordance with identification of the over-temperature state. According to various embodiments, the electronic device 101 may use an average value for a configured time unit (for example, 1 second) to apply the MCS in embodiments described below.

According to various embodiments, the electronic device 101 may control power of the transmission signal according to target power required by a base station within maximum power transmission which can be transmitted by the electronic device 101. For example, the electronic device may control power of the transmission signal to be a minimum value among the target power and the maximum transmission power of the electronic device (UE Tx MAX Power). According to various embodiments, a minimum value among available maximum transmission power (PcMax) of the electronic device considering the characteristic of the electronic device, maximum transmission power (PeMax) according to a power class configured in the electronic device, and maximum transmission power (SAR Max Power) considering a specific absorption rate (SAR) backoff event may be determined as the maximum transmission power of the electronic device (UE Tx MAX Power), but there is no limitation in a determination method thereof. In the following description, for convenience of description, it is assumed that the maximum transmission power (UE Tx MAX Power) is the available maximum transmission power (PcMax) of the electronic device.

According to various embodiments, the target power may be changed according to a channel state varying in real time, and may be determined according to transmitting power control (TPC) by the base station. For example, the electronic device 101 may determine target power based on [Equation 1] above according to the standard document 3GPP TS 38.213 as described with reference to FIG. 18.

According to various embodiments, the electronic device 101 may identify information related to the MCS in operation 1920 in accordance with identification of the over-temperature state (or information related to the over-temperature state) in operation 1910. According to various embodiments, the electronic device 101 may identify control information of maximum transmission power corresponding to the identified modulation scheme from the information related to the MCS in operation 1930. The modulation scheme may correspond to a modulation order in [Table 1] above, but is not limited thereto. For example, the modulation order may be 2 when the modulation scheme is QPSK, the modulation order may be 4 when the modulation scheme is 16 QAM, the modulation order may be 6 when the modulation scheme is 64 QAM, and the modulation order may be 8 when the modulation scheme is 256 QAM.

According to various embodiments, the electronic device 101 may map and apply each modulation scheme and a control value of maximum transmission power. For example, the maximum transmission power may be maintained without being controlled when the modulation scheme is QPSK, may be configured to be controlled by −1 dB from the currently configured maximum transmission power when the modulation scheme is 16 QAM, may be configured to be controlled by −2 dB from the currently configured maximum transmission power when the modulation scheme is 64 QAM, and may be configured to be controlled by −3 dB from the currently configured maximum transmission power when the modulation scheme is 128 QAM.

According to various embodiments, the electronic device 101 may identify control information of the maximum transmission power configured for the identified modulation scheme in operation 1930. The electronic device 101 may control or adjust the maximum transmission power configured for the electronic device based on the control information of the maximum transmission power in operation 1940. For example, when the maximum transmission power (for example, the initial value of the maximum transmission power or the current value of the maximum transmission power) is configured as 23 dBm, the maximum transmission power may be controlled to be 22 dBm if the maximum transmission power is controlled by −1 dB according to the modulation scheme, the maximum transmission power may be controlled to be 21 dBm if the maximum transmission power is controlled by −2 dB according to the modulation scheme, and the maximum transmission power may be controlled to be 20 dBm if the maximum transmission power is controlled by −3 dB according to the modulation scheme.

According to various embodiments, the electronic device 101 may identify target power of uplink (UL) transmission data based on the controlled or adjusted maximum transmission power in operation 1950. For example, the target power of the uplink transmission data may be configured a value making the target power determined based on [Equation 1] above not exceed the controlled maximum transmission power. For example, when the target power determined based on [Equation 1] above is 23 dBm and the maximum transmission power is controlled from 23 dBm to 22 dBm, target power of final uplink transmission date may be configured or identified as 22 dBm.

According to various embodiments, the electronic device 101 may transmit the uplink transmission data with the configured or identified target power based on the controlled or adjusted maximum transmission power in operation 1960.

According to various embodiments, the electronic device 101 may determine whether to apply the control of the maximum transmission power in operations 1920 and 1940 based on information related to the physical (PHY) layer (for example, information related to resource allocation). In various embodiments in which the electronic device 101 determines whether to apply the control of the maximum transmission power, the methods described above with reference to FIG. 18 may be applied in the same or similar way.

Figure 22:
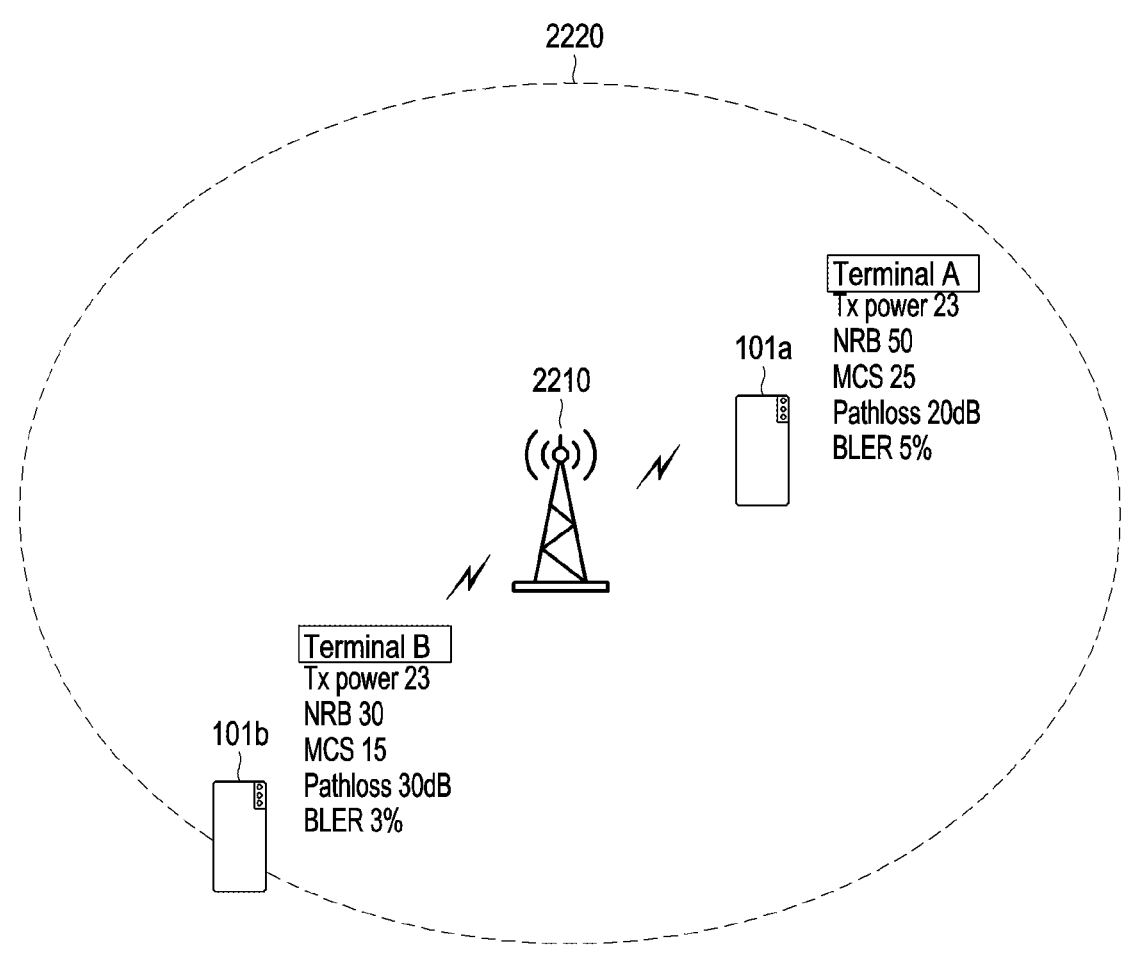
FIG. 22 is a diagram illustrating an electronic device and locations within a cell according to various embodiments.

FIG. 22 is a diagram illustrating an electronic device and the location within a cell according to various embodiments. Referring to FIG. 22, a BS 2210 may communicate with at least one electronic device (for example, a terminal A 101a and a terminal B 101b) located within a cell 2220 covered by itself. The terminal A 101a may be relatively closer to the BS 2210 than the terminal B 101b. For example, although the terminal A 101a and the terminal B 101b transmit data with the same target power, intensities of signals received by the BS 2210 are different from each other, and thus resource allocations may be different.

For example, as illustrate din FIG. 22, the terminal A 101a may transmit uplink data with target power of 23 dBm and the BS 2210 may allocate 50 resource blocks and an MCS index of 25 to the terminal A 101a. Path loss between the BS 2210 and the terminal A 101a may be calculated as 20 dB and a BLER may be measured as 5%. Compared to the terminal A 101a, the terminal B 101b may transmit uplink data with target power of 23 dBm, and the BS 2210 may allocate 30 resource blocks and an MCS index of 15 to the terminal B 101b. Path loss between the BS 2210 and the terminal A 101a may be calculated as 30 dB and a BLER may be measured as 3%. According to various embodiments, although the terminal A 101a and the terminal B 101b transmit uplink data with the same target power, the terminal A is relatively closer to the BS 2210 and thus may have smaller path loss. The BS 2210 may allocate relatively larger resources or a higher modulation scheme to the terminal A 101a compared to the terminal B 101b, thereby providing a higher transmission rate.

According to various embodiments, since the terminal A 101a is not located at a cell boundary unlike the terminal B 101b and thus has relatively small path loss. Therefore, when the heating is generated by the terminal A 101a, the terminal A may perform control to reduce transmission power based on information related to the physical (PHY) layer (for example, information related to resource allocation) as described above. For example, the terminal A 101a may control maximum transmission power based on the MCS index (for example, 25) and/or the number (for example, 50) of resource blocks in accordance with identification of the over-temperature state. For example, when the over-temperature state is identified, the terminal A 101a may control maximum transmission power by applying [Table 2] above. Since the MCS index is 25 and the number of resource blocks is 50 through the application of [Table 2] above, the terminal A 101a may control the maximum transmission power by −2 dB. For example, when current maximum transmission power or an initial value of maximum transmission power of the terminal A 101a is 23 dBm and target power is 23 dBm, the maximum transmission power is controlled by −2 dB from 23 dBm and configured as 21 dBm, and thus target power may be reduced to 21 dBm. As the terminal A 101a transmits uplink data with relatively lower target power, a BLER of data received by the BS 2210 may increase, and the BS 2210 may change the MCS index to a lower value and reduce the number of allocated resource blocks for the terminal A 101a according to the increase in the BLER. According to various embodiments, when quality of service (QoS) for a service received by the terminal A 101a should guarantee a data transmission rate higher than or equal to a configured value, the BS 2210 may increase a grant ratio instead of controlling the MCS index or the number of allocated resource blocks for the terminal A 101a.

Figure 23:
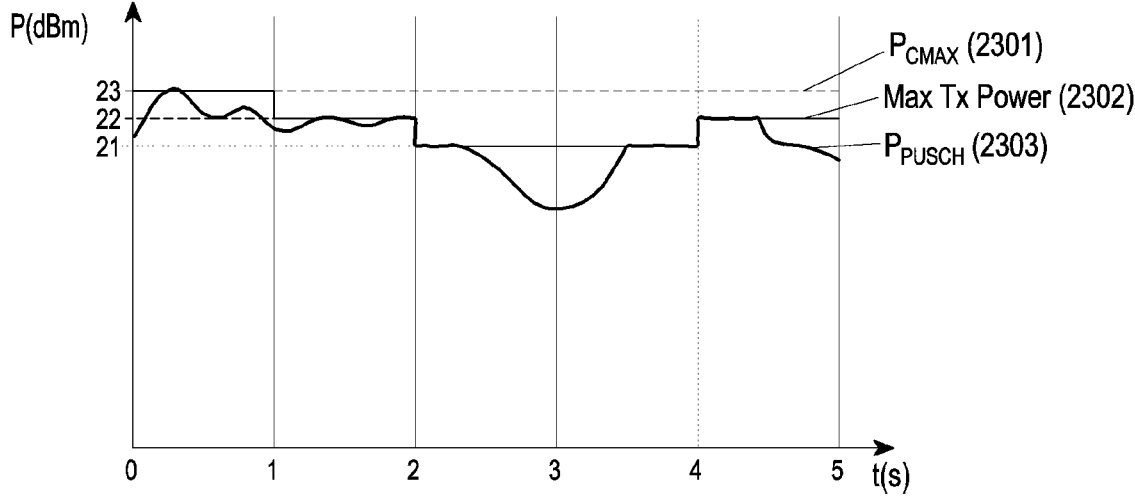
FIG. 23 is a graph comparing power according to various embodiments.

FIG. 23 is a graph comparing power according to various embodiments. Referring to FIG. 23, the electronic device 101 may control power of a transmission signal according to target power required by the BS within maximum transmission power which can be transmitted by the electronic device 101. For example, the electronic device may control power of the transmission signal to be a minimum value among the target power and the maximum transmission power of the electronic device (UE Tx MAX Power).

According to various embodiments, a minimum value among available maximum transmission power (PcMax) of the electronic device considering the characteristic of the electronic device, maximum transmission power (PeMax) according to a power class configured in the electronic device, and maximum transmission power (SAR Max Power) considering a specific absorption rate (SAR) backoff event may be determined as the maximum transmission power of the electronic device (UE Tx MAX Power), but there is no limitation in a determination method thereof. In FIG. 23, it is assumed that the maximum transmission power (UE Tx MAX Power) is the available maximum transmission power (PcMax; $P_{CMAX}$) 2301 of the electronic device.

According to various embodiments, an initial value or a reference value of maximum transmission power (Max Tx Power) 2302 may be configured as available maximum transmission power ($P_{CMAX}$) of the electronic device, and the maximum transmission power 2302 may be controlled based on the MCS and/or the number of resource blocks every configured time (for example, every second). For example, the maximum transmission power 2302 may be configured as 23 dBm which is the same as the available maximum transmission power (PcMax; $P_{CMAX}$) 2301 as the initial value. According to various embodiments, the electronic device 101 may configure the maximum transmission power 2302 after 1 second as 22 dBm controlled to be lower by −1 dB based on identification of the over-temperature state. The electronic device 101 may control the maximum transmission power 2302 as 21 dBm after 2 seconds according to continuous identification of the over-temperature state. According to various embodiments, the electronic device 101 may configure the maximum transmission power 2302 as a value which is the same as the previous value after 3 seconds, and when the electronic device 101 escapes from the over-temperature state after 4 seconds, may control the maximum transmission power 2302 to be higher by 1 dB from 22 dBm.

According to various embodiments, the electronic device 101 may configure transmission power ($P_{PUSC}$H) 2303 of uplink data based on the controlled maximum transmission power 2302. For example, as illustrated in FIG. 23, the transmission power 2303 of the uplink data may be changed according to the channel state varying in real time as described above, and may be determined according to transmitting power control (TPC) by the BS. For example, the electronic device 101 may determine target power based on [Equation 1] above according to the standard document 3GPP TS 38.213 as described with reference to FIG. 18. According to various embodiments, the electronic device 101 may transmit uplink data with the transmission power 2303 of the uplink data determined based on the target power calculated according to [Equation 1] above and the controlled maximum transmission power 2302. For example, by determining a smaller value (for example, a minimum value) among the target power calculated according to [Equation 1] above and the controlled maximum transmission power 2302 as the transmission power 2303 of the uplink data, the transmission power 2303 of the uplink data may be configured to not exceed the controlled maximum transmission power 2302.

According to various embodiments, the electronic device 101 may insert information on difference between the controlled maximum transmission power 2302 and the determined transmission power 2303 of the uplink data into a power headroom report (PHR) and transmit the PHR to the BS (for example, the BS 2210 of FIG. 22). For example, the electronic device 101 may transmit the PHR to the network through a medium access control (MAC) control element (CE). The BS may perform transmitting power control for the electronic device 101 based on the PHR transmitted from the electronic device 101. For example, when it is identified that there is no difference between the controlled maximum transmission power 2302 and the determined transmission power 2303 of the uplink data based on the identification result of the PHR, the current transmission power 2303 may refer, for example, to maximum transmission power, and thus the BS may perform control to maintain or reduce target power of the electronic device 101 without controlling the target power to be higher.

Figure 24:
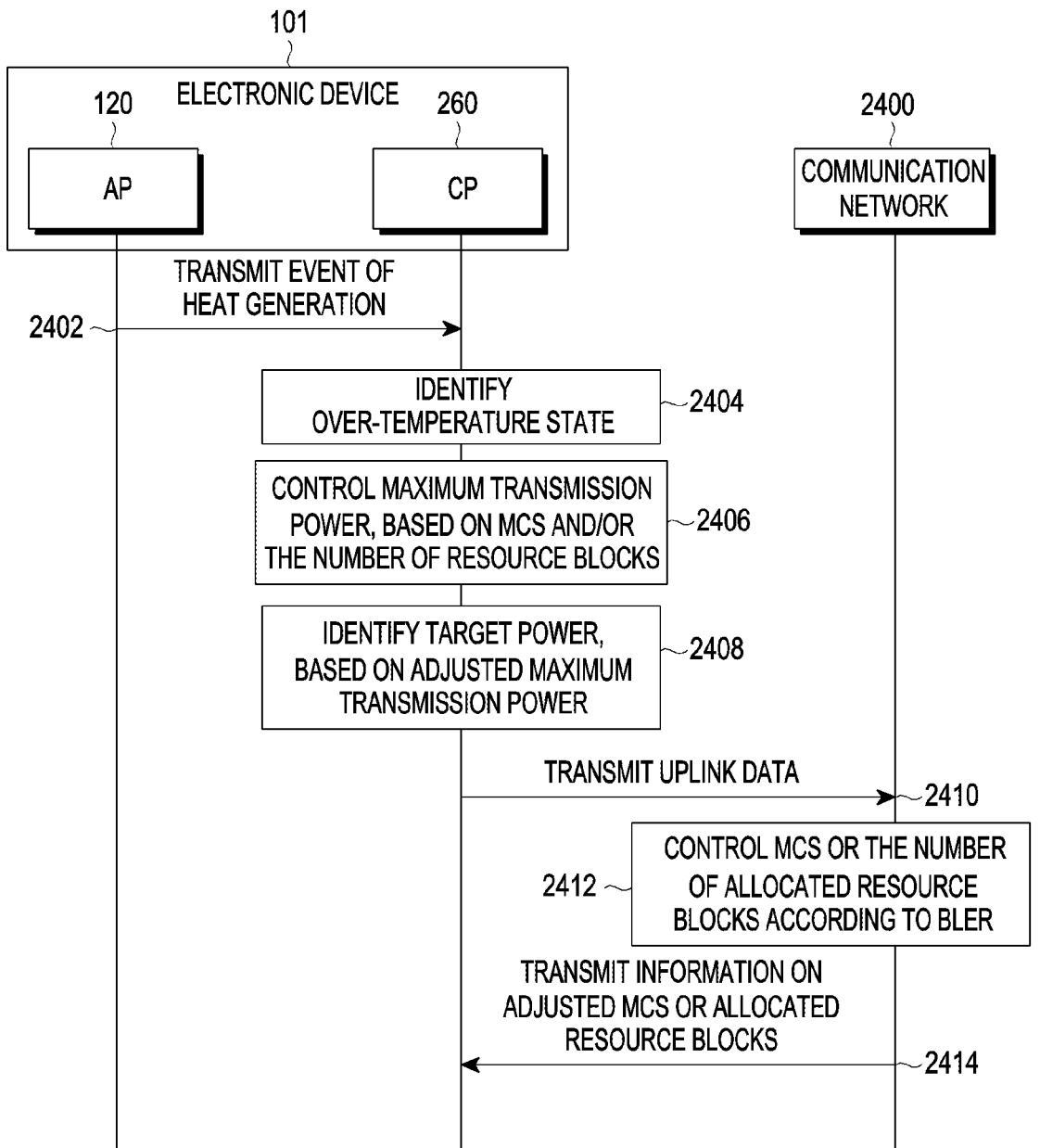
FIG. 24 is a signal flow diagram illustrating an example method of operating an electronic device according to various embodiments.

FIG. 24 is a signal flow diagram illustrating a method of operating the electronic device according to various embodiments. Referring to FIG. 24, according to various embodiments, the AP 120 (for example, the processor 120) of the electronic device 101 may transmit a heating event to the CP 260 (for example, at least one of the first communication processor 212, the second communication processor 214, or the integrated communication processor 260) in operation 2402.

According to various embodiments, the CP 260 (for example, at least one of the first communication processor 212, the second communication processor 214, or the integrated communication processor 260) of the electronic device 101 may identify an over-temperature state (or information related to the over-temperature state) in operation 2404.

According to various embodiments, the CP of the electronic device 101 may control maximum transmission power to a lower value based on at least one of the MCS and/or the number of resource blocks in accordance with identification of the over-temperature state (or information related to the over-temperature state) in operation 2406. Since various embodiments for controlling the maximum transmission power have been described with reference to FIGS. 18 and 19, a detailed description may not be repeated.

According to various embodiments, the CP 260 of the electronic device 101 may configure or identify target power (for example, transmission power of uplink data) based on the maximum transmission power controlled to be lower in operation 2408 and may transmit the uplink transmission data to a communication network 2400 (for example, the BS 2210) in operation 2410.

According to various embodiments, the communication network 2400 may receive uplink data with the transmission power controlled to be lower, and a BLER for the received uplink data may increase according to the transmission power controlled to be lower. The communication network 2400 may control the MCS or the number of allocated resource blocks according to a change in the BLER in operation 2412. For example, the communication network 2400 may reduce the MCS index or the number of allocated resource blocks according to an increase in the BLER. The communication network 2400 may transmit the controlled MCS or information on allocation of the resource blocks to the electronic device 101 in operation 2414.

According to various embodiments, the electronic device 101 may move to a location in a weak electric field. For example, the electronic device 101 may move from the location of the terminal A 101a to the location (for example, a boundary area of the cell 2220) of the terminal B 101b of FIG. 22. As the maximum transmission power is controlled to be lower according to the over-temperature state of the electronic device 101 even though the electronic device 101 moves to the location in the weak electric field, normal communication between the electronic device 101 and the communication network 2400 may be difficult. According to various embodiments, when the electronic device 101 moves to the location in the weak electric field, the maximum transmission power may be controlled to be higher again. According to various embodiments, the electronic device 101 may identify a weak electric field condition based on a reference signal received power (RSRP) of the received signal or the number of failures in decoding of the received signal. For example, when the RSRP of the received signal is equal to or smaller than a configured value (for example, −115 dBm), the electronic device 101 may determine the weak electric field state.

Figure 25:
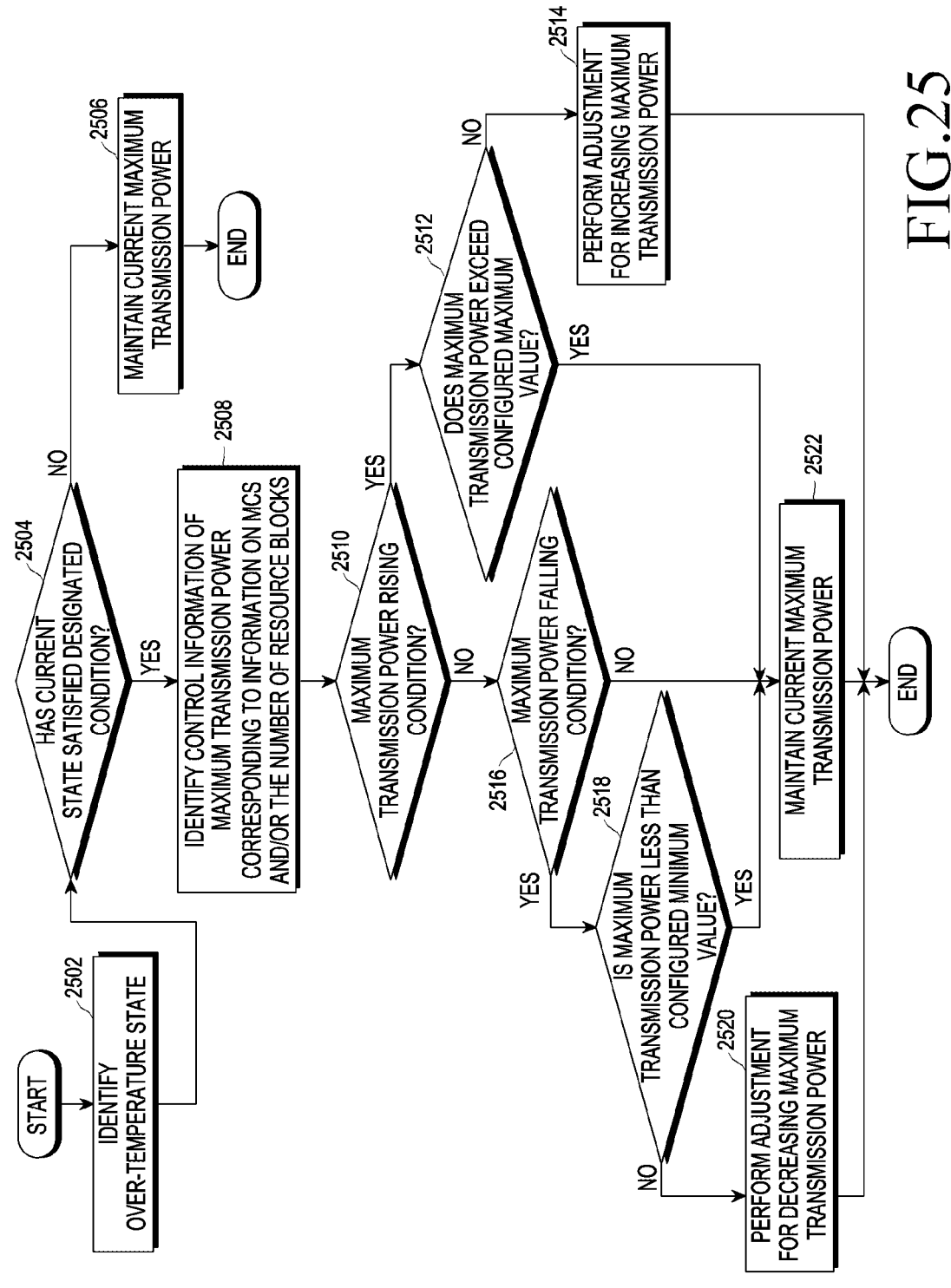
FIG. 25 is a flowchart illustrating an example method of operating an electronic device according to various embodiments.

FIG. 25 is a flowchart illustrating an example method of operating the electronic device according to various embodiments. Referring to FIG. 25, according to various embodiments, the electronic device 101 (for example, at least one of the processor 120, the first communication processor 212, or the second communication processor 214, or the integrated communication processor 260) may identify an over-temperature state (or information related to the over-temperature state) in operation 2502.

According to various embodiments, the electronic device 101 may identify whether the current state satisfies a predetermined (e.g., designated) condition in accordance with identification of the over-temperature state (or information related to the over-temperature state) in operation 2504. For example, the state satisfying the predetermined condition may include at least one of operation 1205 of FIG. 12, operation 1505 of FIG. 15, operation 1607 of FIG. 16, and operation 1707 of FIG. 17. When the predetermined (e.g., designated) condition is not satisfied based on the identification result (No of operation 2504), the current maximum transmission power (for example, $P_{CMAX}$) may be maintained in operation 2506.

According to various embodiments, when the predetermined (e.g., designated) condition is satisfied based on the identification result (Yes of operation 2504), the electronic device 101 may identify control information of maximum transmission power corresponding to at least one of the MCS and the number of resource blocks in operation 2508. For example, the electronic device 101 may identify control information of maximum transmission power corresponding to the MCS and the number of resource blocks with reference to [Table 4] below.

TABLE 4

| | | Number of resource blocks | | |
|---|---|---|---|---|
| | | 1~30 | 31~60 | 61~ |
| MCS index | 3~10 | increase | maintain | decrease |
| | 11~19 | maintain | decrease | decrease |
| | 20~27 | decrease | decrease | decrease |

Referring to [Table 4] above, when the MCS index is 11 to 19 and the number of resource blocks is 31 to 60, maximum transmission power may be controlled to decrease by a unit setting value (for example, 1 dB). In another example, when the MCS index is 3 to 10 and the number of resource blocks is 1 to 30, maximum transmission power may be controlled to increase by a unit setting value (for example, 1 dB). In another example, when the MCS index is 11 to 19 and the number of resource blocks is 31 to 60, the current maximum transmission power may be configured to be maintained. According to various embodiments, the electronic device 101 may identify the control information of the maximum transmission power and identify whether the identified control information of the maximum transmission power corresponds to an increase condition (for example, a condition configured to increase by a unit setting value) in operation 2510. For example, referring to [Table 4] above, when the MCS index is 3 to 10 and the number of resource blocks is 1 to 30, the electronic device 101 may identify that maximum transmission power corresponds an increase or ascending condition. When the maximum transmission power increase condition is identified based on the identification result (Yes of operation 2510), the electronic device 101 may identify whether a value obtained by increasing the maximum transmission power is larger than a configured maximum value in operation 2512. When the value is larger than the configured maximum value based on the identification result (Yes of operation 2512), the electronic device 101 may perform control to maintain the current maximum transmission power without any increase in operation 2522. When the value is not larger than the configured maximum value based on the identification result (No of operation 2512), the electronic device 101 may control the current maximum transmission power to perform adjustment for increasing maximum transmission power by the unit setting value in operation 2514. According to various embodiments, when the maximum transmission power does not correspond to the increase condition based on the identification result in operation 2510 (No of operation 2510), the electronic device 101 may identify whether the control information of the maximum transmission power identified in operation 2508 corresponds to the decrease condition (for example, a condition configured to decrease by a unit setting value) in operation 2516. For example, referring to [Table 4] above, when the MCS index is 11 to 19 and the number of resource blocks is 31 to 60, the electronic device 101 may identify that the maximum transmission power corresponds to the decrease or descending condition. When the maximum transmission power descending condition is identified based on the identification result (Yes of operation 2516), the electronic device 101 may identify whether a value obtained by decreasing the maximum transmission power is less than a configured minimum value in operation 2518. When the value is less than the configured minimum value based on the identification result (Yes of operation 2518), the electronic device 101 may perform control to maintain the current maximum transmission power without any decrease in operation 2522. When the value controlled to decrease the maximum transmission power is not less than the configured minimum value (No of operation 2518), the electronic device 101 may perform adjustment to decrease the current maximum transmission power by the unit setting value in operation 2520. FIG. 26 is a flowchart illustrating an example method of operating the electronic device according to various embodiments of the disclosure. Referring to FIG. 26, according to various embodiments, the electronic device 101 (for example, at least one of the processor 120, the first communication processor 212, the second communication processor 214, or the integrated communication processor 260) may identify an over-temperature state (or information related to the over-temperature state) in operation 2610. For example, the electronic device 101 may identify an indication indicating over-temperature in operation 2610. For example, the processor 120 may acquire temperature information from the sensor module 176. For example, the processor 120 may determine whether acquired temperature information is higher than or equal to predetermined threshold temperature (for example, 43° C.). When the acquired temperature information is higher than or equal to the threshold temperature, the processor 120 may provide an indication indicating over-temperature to a communication processor (for example, at least one of the first communication processor 212, the second communication processor 214, or the integrated communication processor 260). Meanwhile, in another implementation, the communication processor (for example, at least one of the first communication processor 212, the second communication processor 214, or the integrated communication processor 260) may directly acquire temperature information from the sensor module 176. In this case, the communication processor (for example, at least one of the first communication processor 212, the second communication processor 214, or the integrated communication processor 260) may determine whether the acquired temperature information is higher than or equal to the predetermined threshold temperature.

According to various embodiments, the electronic device 101 may identify information related to the over-temperature state in operation 2610. For example, the electronic device 101 may manage a plurality of temperature ranges. The electronic device 101 may identify a temperature range including the measured temperature as information related to the over-temperature state.

According to various embodiments, the electronic device 101 may control transmission power based on information related to a physical (PHY) layer (for example, information related to resource allocation) in accordance with identification of the over-temperature state (or information related to the over-temperature state). For example, the electronic device 101 may identify whether maximum power transmission (max Tx power) is controlled and/or control information of the maximum transmission power based on information related to the physical layer in accordance with identification of the over-temperature state. The information related to the physical layer may include at least one of a modulation and coding scheme (MCS), the number of resource blocks (RBs) (NRB), a grant ratio, a block error rate (BLER), a data rate (or throughput (T-put), a buffer status index (BSI), or a path loss (PL). According to various embodiments, the electronic device 101 may use an average value for a configured unit time (for example, 1 second) to apply information related to the physical layer in the following embodiments.

According to various embodiments, the electronic device 101 may control power of the transmission signal according to target power required by a base station within maximum power transmission which can be transmitted by the electronic device 101. For example, the electronic device may control power of the transmission signal to be a minimum value among the target power and the maximum transmission power of the electronic device (UE Tx MAX Power). According to various embodiments, a minimum value among available maximum transmission power (PcMax) of the electronic device considering the characteristic of the electronic device, maximum transmission power (PeMax) according to a power class configured in the electronic device, and maximum transmission power (SAR Max Power) considering a specific absorption rate (SAR) backoff event may be determined as the maximum transmission power of the electronic device (UE Tx MAX Power), but there is no limitation in a determination method thereof. In the following description, it is assumed that the maximum transmission power (UE Tx MAX Power) is the available maximum transmission power (PcMax) of the electronic device.

According to various embodiments, the target power may be changed according to a channel state varying in real time, and may be determined according to transmitting power control (TPC) by the base station. According to various embodiments, the electronic device 101 may determine the target power determined based on [Equation 1] above within a range that does not exceed the maximum transmission power of the electronic device. For example, when the maximum transmission power of the electronic device is configured as 20 dBm and the target power determined based on [Equation 1] above is 21 dBm, transmission power for uplink data transmission by the electronic device 101 may be limited to 20 dBm.

According to various embodiments, the electronic device 101 may identify control information of the maximum transmission power based on information related to the physical (PHY) layer (for example, information related to resource allocation) in accordance with identification of the over-temperature state (or information related to the over-temperature state) in operation 2610. For example, the electronic device 101 may identify control or adjustment information of the maximum transmission power based on a transmission rate (or throughput (T-put)) in operation 2620. For example, the electronic device 101 may determine the transmission rate (for example, data rate (or throughput) based on [Equation 2] below according to the standard document 3GPP TS 38.306.

[Equation 2]

$$\text{data rate (in } Mbps) = 10^{-6} \cdot$$
$$\sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot \left( 1 - OH^{(j)} \right) \right)$$

Definition of [Equation 2] above may follow 3GPP TS 38.306, and for example, v denotes the number of layers, Qm denotes a modulation order, f denotes a scaling factor, and Rmax denotes a code rate. In [Equation 2] above, N denotes the number of RBs allocated to the electronic device 101, T denotes numerology, and OH (overhead) denotes overhead considering control data. For example, the data rate may be determined based on the MCS and/or the number of resource blocks as shown in [Equation 2].

According to various embodiments, the electronic device 101 may map and apply the data rate or a range of the data rate and a control value of the maximum transmission power. For example, the maximum transmission power may be configured to be controlled by −1 dB from the currently configured maximum transmission power when the data rate is within a configured first range, the maximum transmission power may be configured to be controlled by −2 dB from the currently configured maximum transmission power when the data rate is within a configured second range, and the maximum transmission power may be configured to be controlled by −3 dB from the currently configured maximum transmission power when a range of the MCS index is from 20 to 27.

According to various embodiments, the electronic device 101 may identify control information of maximum transmission power in consideration of the grant ratio in addition to the transmission rate in operation 2620. For example, the control information of the maximum transmission power may be identified based on a value obtained by dividing the transmission rate determined by [Equation 2] above by the grant ratio.

According to various embodiments, the electronic device 101 may adjust maximum transmission power configured for the electronic device based on the identified adjustment information of the maximum transmission power in operation 2630. For example, when the maximum transmission power (for example, an initial value of the maximum transmission power or a current value of the maximum transmission power) is configured as 23 dBm, the maximum transmission power may be controlled to be 22 dBm if the maximum transmission power is controlled by −1 dB according to the data rate, the maximum transmission power may be controlled to be 21 dBm if the maximum transmission power is controlled by −2 dB according to the data rate, and the maximum transmission power may be controlled to be 20 dBm if the maximum transmission power is controlled by −3 dB according to the data rate.

According to various embodiments, the electronic device 101 may transmit the uplink transmission data with the configured or identified target power in operation 2650, based on the controlled maximum transmission power in operation 2640.

According to various embodiments, the electronic device 101 may determine whether to apply the control of the maximum transmission power in operations 2620 and 2630 based on information related to the physical (PHY) layer (for example, information related to resource allocation).

For example, when the path loss is larger than or equal to a configured value (30 dB), it may be determined that the electronic device 101 is located in a peripheral area of the cell or that the electronic device is in a weak electric field, the control of the maximum transmission power may not be applied. For example, even though the maximum transmission power can be controlled form 23 dBm to 22 dBm according to the MCS and/or the number of resource blocks, if the path loss is larger than or equal to the configured value, the maximum transmission power may not be reduced any more or inversely the maximum transmission power may be controlled to be increased.

According to various embodiments, when controlling the maximum transmission power, the electronic device 101 may configure the same not to exceed a configured maximum value or not to be smaller than a configured minimum value. For example, when the maximum value of the maximum transmission power is configured as 25 dBm and the minimum value is configured as 10 dBm, the electronic device 101 may control the maximum transmission power not to exceed 25 dBm configured as the maximum value even through the maximum transmission power increases according to the MCS and/or the number of resource blocks and control the maximum transmission power not to be smaller than 10 dBm configured as the minimum value even though the maximum transmission power decreases.

According to various embodiments, the electronic device 101 may not apply the control of the maximum transmission power when the grant ratio is larger than or equal to a configured value. For example, the grant ratio is larger than or equal to 50%, the electronic device 101 may control the maximum transmission power not to be lower than the currently configured value or control the maximum transmission power not to be reduced by a configured value (for example, 3 dB) or more from the initial value of the maximum transmission power.

According to various embodiments, when the BSI is larger than or equal to a preset value, the electronic device 101 may not apply the control of the maximum transmission power. For example, when the BSI is larger than or equal to a specific value, the electronic device 101 may perform control not to reduce the maximum transmission power from the currently configured value or not to reduce the maximum transmission power from the initial value of the maximum transmission power by a configured value (for example, 3 dB) or more. The BSI may be transmitted while being inserted into a buffer status report (BSR) transmitted from the electronic device 101 to the network. For example, the electronic device 101 may transmit the BSR including the BSI to the network through a medium access control (MAC) control element (CE). According to various embodiments, the electronic device 101 may identify the BSI included in the BSR to be transmitted to the network and, when the BSI is larger than or equal to a configured value, may perform control not to reduce the maximum transmission power. For example, when the BSI is 50, the buffer size may correspond to 19325 bytes to 22624 bytes, and the electronic device 101 may perform control not to reduce the maximum transmission power in order to guarantee transmission of data corresponding to the buffer size.

According to various embodiments, when a BLER is larger than or equal o a configured value, the electronic device 101 may not apply the control of the maximum transmission power. For example, when the BLER is larger than or equal to 10%, the electronic device 101 may perform control not to further reduce the maximum transmission power from a currently configured value.

According to various example embodiments, an electronic device (for example, the electronic device 101) may include: a plurality of antennas (for example, the antennas 1341, 1342, 1343, and 1344) and at least one processor (for example, at least one of the processor 120, the first communication processor 212, the second communication processor 214, the integrated communication processor 260, or the communication processor 1320), and the at least one processor may be configured to: identify an over-temperature state of the electronic device, identify a current state of the electronic device for at least one parameter of a user equipment (UE) capability of the electronic device based on identification of the over-temperature state, perform a first operation of reducing a number of antennas for reception among the plurality of antennas based on satisfying of a specific condition by the current state of the electronic device for the at least one parameter, and perform the first operation and a second operation of changing at least some of the UE capability of the electronic device based on not satisfying the specific condition by the current state of the electronic device for the at least one parameter.

According to various example embodiments, the at least one processor may be configured to: perform, as at least some of an operation for performing the first operation of reducing the number of antennas for reception among the plurality of antennas based on satisfying the specific condition by the current state of the electronic device for the at least one parameter, the first operation based on CA (Carrier Aggregation) and/or DC (Dual Connectivity) among the at least one parameter not being set for the electronic device.

According to various example embodiments, the at least one processor may be configured to: perform, as at least some of an operation for performing the first operation and the second operation of changing at least some of the UE capability of the electronic device based on not satisfying the specific condition by the current state of the electronic device for the at least one parameter, the first operation and the second operation, by deactivating the CA among the UE capability, deactivating the DC, and/or controlling the number of CCs (Component Carrier) of the CA based on the CA and/or the DC among the at least one parameter being set for the electronic device.

According to various example embodiments, the at least one processor may be configured to: perform, as at least some of an operation for performing the first operation of reducing the number of antennas for reception among the plurality of antennas based on satisfying the specific condition by the current state of the electronic device for the at least one parameter, the first operation based on SRS(Sounding Reference Signal) transmission antenna switching among the at least one parameter not being set for the electronic device.

According to various example embodiments, the at least one processor may be configured to: perform, as at least some of an operation for performing the first operation and the second operation of changing at least some of the UE capability of the electronic device based on not satisfying the specific condition by the current state of the electronic device for the at least one parameter, the first operation and the second operation, by deactivating the SRS transmission antenna switching among the UE capability based on the SRS transmission antenna switching among the at least one parameter being set for the electronic device.

According to various example embodiments, the at least one processor may be configured to: perform, as at least some of an operation for performing the first operation of reducing the number of antennas for reception among the plurality of antennas based on satisfying the specific condition by the current state of the electronic device for the at least one parameter, the first operation based on a supported bandwidth among the at least one parameter being equal to an initial carrier bandwidth configured by a network for the electronic device.

According to various example embodiments, the at least one processor may be configured to: perform, as at least some of an operation for performing the first operation and the second operation of changing at least some of the UE capability of the electronic device based on not satisfying the specific condition by the current state of the electronic device for the at least one parameter, the first operation and the second operation, by reducing the supported bandwidth among the UE capability based on a supported bandwidth among the at least one parameter being unequal to the initial carrier bandwidth configured by the network for the electronic device.

According to various example embodiments, the at least one processor may be further configured to: determine whether an initial carrier bandwidth configured by the network for the electronic device is equal to or less than a threshold bandwidth and perform the first operation based on the initial carrier bandwidth being equal to or less than the threshold bandwidth.

According to various example embodiments, the at least one processor may be further configured to: determine whether the current state of the electronic device for the at least one parameter satisfies the specific condition based on the initial carrier bandwidth being greater than the threshold bandwidth.

According to various example embodiments, the threshold bandwidth may be a specified value or a value identified based on at least one service performed by the electronic device.

According to various example embodiments, the at least one processor may be further configured to" determine whether a network supports an OverheatingAssistance setting, determine whether the current state of the electronic device for the at least one parameter satisfies the specific condition based on non-supporting of the OverheatingAssistance setting by the network, and transmit a UEAssistantInformation message of the OverheatingAssistance setting to the network based on identification of the over-temperature state, based on identification of the OverheatingAssistance setting by the network.

According to various example embodiments, the at least one processor may be further configured to: transmit an SCG (Second Cell Group) failure message corresponding to reception of an RRC(Radio Resource Control) reset message including a measurement report for SCG addition and/or setting of SCG addition based on satisfying the specific condition by the current state of the electronic device for the at least one parameter.

According to various example embodiments, the at least one processor may be configured to: change, as at least some of the second operation, at least one an information element related to deactivation of CA and/or DC, an information element related to reduction in the number of CCs of CA, an information element related to reduction in a bandwidth, an information element related to reduction in the number of layers, an information element related to reduction in the number of MCSs (Modulation and Coding Scheme), an information element related to deactivation of SRS transmission antenna switching, or an information element related to deactivation of a specific RAT (Radio Access Technology).

According to various example embodiments, a method of operating an electronic device including a plurality of antennas may include: identifying an over-temperature state of the electronic device, identifying a current state of the electronic device for at least one parameter of a user equipment (UE) capability of the electronic device based on identification of the over-temperature state, performing a first operation of reducing a number of antennas for reception among the plurality of antennas based on satisfying a specific condition by the current state of the electronic device for the at least one parameter, and performing the first operation and a second operation of changing at least some of the UE capability of the electronic device based on not satisfying the specific condition by the current state of the electronic device for the at least one parameter.

According to various example embodiments, the performing the first operation of reducing the number of antennas for reception among the plurality of antennas based on satisfying the specific condition by the current state of the electronic device for the at least one parameter may include performing the first operation based on CA and/or DC among the at least one parameter not being set for the electronic device.

According to various example embodiments, the performing the first operation of reducing the number of antennas for reception among the plurality of antennas based on satisfying the specific condition by the current state of the electronic device for the at least one parameter may include performing the first operation based on SRS(Sounding Reference Signal) transmission antenna switching among the at least one parameter not being set for the electronic device.

According to various example embodiments, the performing the first operation of reducing the number of antennas for reception among the plurality of antennas based on satisfying the specific condition by the current state of the electronic device for the at least one parameter may include performing the first operation based on a supported bandwidth among the at least one parameter being equal to an initial carrier bandwidth configured by a network for the electronic device.

According to various example embodiments, the method of the electronic device may further include determining whether the initial carrier bandwidth configured by the network for the electronic device is equal to or less than a threshold bandwidth and performing the first operation based on the initial carrier bandwidth being equal to or less than the threshold bandwidth.

According to various example embodiments, the method of the electronic device may further include: determining whether a network supports an OverheatingAssistance setting, determining whether the current state of the electronic device for the at least one parameter satisfies the specific condition based on non-supporting of the OverheatingAssistance setting by the network, and transmitting a UEAssistantInformation message of the OverheatingAssistance setting to the network based on identification of the over-temperature state, based on identification of the OverheatingAssistance setting by the network.

According to various example embodiments, an electronic device may include: a plurality of antennas and at least one processor, and the at least one processor may be configured to: identify an over-temperature state of the electronic device and perform a first operation of reducing a number of antennas for reception among the plurality of antennas and a second operation of changing at least some of a user equipment (UE) capability of the electronic device based on identification of the over-temperature state.

According to various example embodiments, an electronic device may include: a plurality of antennas and at least one processor, and the at least one processor may be configured to: identify a current temperature of the electronic device, perform a first operation of reducing a number of antennas for reception among the plurality of antennas based on the current temperature of the electronic device included in a first temperature range, and perform a second operation of changing at least some of the a user equipment (UE) capability of the electronic device based on the current temperature of the electronic device included in a second temperature range different from the first temperature range.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a plurality of antennas;
at least one processor comprising processing circuitry; and
memory storing instructions,
wherein the instructions, when executed by the at least one processor individually and/or collectively, cause the electronic device to perform operations comprising:
identifying an over-temperature state of the electronic device,
identifying whether a network supports an OverheatingAssistance configuration,
identifying whether an initial carrier bandwidth configured by the network for the electronic device is equal to or less than a threshold bandwidth;
based on identifying the network as a network supporting the OverheatingAssistance configuration, transmitting a UEAssistantInformation message of an OverheatingAssistance setting to the network,
based on identifying the network as a network not supporting the OverheatingAssistance configuration, performing a first operation of reducing a number of antennas for reception of the plurality of antennas without reporting the reducing of the number of antennas for reception to the network; and
based on identifying the over-temperature state of the electronic device and identifying that the initial carrier bandwidth is equal to or less than the threshold bandwidth, performing the first operation of reducing the number of antennas for reception of the plurality of antennas without reporting the reducing of the number of antennas for reception to the network.

2. The electronic device of claim 1, wherein the instructions, when executed by the at least one processor individually and/or collectively, cause the electronic device to perform operations comprising, based on control information identified based on a Modulation and Coding Scheme (MCS) index and a number of resource blocks, adjusting a maximum transmission power set for the electronic device.

3. The electronic device of claim 1, wherein the instructions, when executed by the at least one processor individually and/or collectively, cause the electronic device to perform operations comprising, based on at least one of a Carrier Aggregation (CA) parameter or a Dual Connectivity (DC) parameter not being set for the electronic device, performing the first operation of reducing the number of antennas for reception.

4. The electronic device of claim 1, wherein the instructions, when executed by the at least one processor individually and/or collectively, cause the electronic device to perform operations comprising, based on an SRS (Sounding Reference Signal) transmission antenna switching parameter not being set for the electronic device, performing the first operation of reducing the number of antennas for reception.

5. The electronic device of claim 4, wherein the instructions, when executed by the at least one processor individually and/or collectively, cause the electronic device to perform operations comprising changing a UE capability of the electronic device by deactivating SRS transmission antenna switching based on the SRS transmission antenna switching parameter being set for the electronic device.

6. The electronic device of claim 1, wherein the instructions, when executed by the at least one processor individually and/or collectively, cause the electronic device to perform operations comprising, based on an initial carrier bandwidth being larger than or equal to a threshold bandwidth, changing a UE capability of the electronic device by reducing an information element related to a bandwidth.

7. The electronic device of claim 6, wherein the instructions, when executed by the at least one processor individually and/or collectively, cause the electronic device to perform operations comprising, based on the initial carrier bandwidth being smaller than the threshold bandwidth, changing a UE capability of the electronic device by changing the bandwidth to a predetermined value.

8. The electronic device of claim 1, wherein the instructions, when executed by the at least one processor individually and/or collectively, cause the electronic device to perform operations comprising, based on the initial carrier bandwidth not being equal to or less than a threshold bandwidth, determining whether a specific condition is satisfied; based on determining that the specific condition is satisfied, perform the first operation for reducing the number of antennas for reception without reporting the reducing of the number of antennas for reception to the network; and, based on determining that the specific condition is not satisfied, perform the first operation and a second operation for changing a UE capability of the electronic device and reporting the changed UE capability to the network.

9. The electronic device of claim 1, wherein the threshold bandwidth is a specified value or a value identified based on at least one service performed by the electronic device.

10. The electronic device of claim 1, wherein the instructions, when executed by at least one processor individually and/or collectively, cause the electronic device to perform operations comprising determining whether a network supports an OverheatingAssistance setting, determining whether a current state of the electronic device for at least one parameter of a UE capability of the electronic device satisfies a specific condition based on determining that the network does not support the OverheatingAssistance setting, and transmitting a UEAssistantInformation message of the OverheatingAssistance setting to the network based on identification of the over-temperature state, based on determining that the network supports the OverheatingAssistance setting.

11. The electronic device of claim 1, wherein the instructions, when executed by the at least one processor individually and/or collectively, cause the electronic device to perform operations comprising transmitting an SCG (Second Cell Group) failure message corresponding to reception of an RRC (Radio Resource Control) reset message including a measurement report for SCG addition and/or setting of SCG addition, based on a current state of the electronic device satisfying a specific condition.

12. The electronic device of claim 1, wherein the instructions, when executed by the at least one processor individually and/or collectively, cause the electronic device to performing operations comprising changing a UE capability of the electronic device by changing at least one of an information element related to deactivation of at least one of Carrier Aggregation (CA) or Dual Connectivity (DC), an information element related to reduction in the number of Component Carriers (CCs) of CA, an information element related to reduction in a bandwidth, an information element related to reduction in the number of layers, an information element related to reduction in the number of MCSs (Modulation and Coding Scheme), an information element related to deactivation of SRS transmission antenna switching, or an information element related to deactivation of a specific RAT (Radio Access Technology).

13. The electronic device of claim 1, wherein the identifying of whether a network supports an OverheatingAssistance configuration is based on whether an otherconfig including the OverheatingAssistance is received.

14. A method of operating an electronic device comprising a plurality of antennas, the method comprising:
   identifying an over-temperature state of the electronic device;
   identifying whether a network supports an OverheatingAssistance configuration;
   identifying whether an initial carrier bandwidth configured by the network for the electronic device is equal to or less than a threshold bandwidth;
   based on identifying the network as a network supporting the OverheatingAssistance configuration, transmitting a UEAssistantInformation message of an OverheatingAssistance setting to the network;
   based on identifying the network as a network not supporting the OverheatingAssistance configuration, performing a first operation of reducing a number of antennas for reception of the plurality of antennas without reporting the reducing of the number of antennas for reception to the network; and
   based on identifying the over-temperature state of the electronic device and identifying that the initial carrier bandwidth is equal to or less than the threshold bandwidth, performing the first operation of reducing the number of antennas for reception of the plurality of antennas without reporting the reducing of the number of antennas for reception to the network.

15. The method of claim 14 further comprising, based on control information identified based on a Modulation and Coding Scheme (MCS) index and a number of resource blocks, adjusting a maximum transmission power set for the electronic device.

16. The method of claim 14, wherein the identifying of whether a network supports an OverheatingAssistance configuration is based on whether an otherconfig including the OverheatingAssistance is received.

17. A non-transitory computer-readable storage medium storing instructions that, when executed by at least one processor of an electronic device, cause the electronic device to perform operations comprising:
   identifying an over-temperature state of the electronic device;
   identifying whether a network supports an OverheatingAssistance configuration;
   identifying whether an initial carrier bandwidth configured by the network for the electronic device is equal to or less than a threshold bandwidth;
   based on identifying the network as a network supporting the OverheatingAssistance configuration, transmitting a UEAssistantInformation message of an OverheatingAssistance setting to the network;
   based on identifying the network as a network not supporting the OverheatingAssistance configuration, performing a first operation of reducing a number of antennas for reception of a plurality of antennas of the electronic device without reporting the reducing of the number of antennas for reception to the network; and
   based on identifying the over-temperature state of the electronic device and identifying that the initial carrier bandwidth is equal to or less than the threshold bandwidth, performing the first operation of reducing the number of antennas for reception of the plurality of antennas without reporting the reducing of the number of antennas for reception to the network.

18. The non-transitory computer-readable storage medium of claim 17, wherein the operations further comprising:

based on control information identified based on a Modulation and Coding Scheme (MCS) index and a number of resource blocks, adjusting a maximum transmission power set for the electronic device.

19. The non-transitory computer-readable storage medium of claim 17, wherein the identifying of whether a network supports an OverheatingAssistance configuration is based on whether an otherconfig including the OverheatingAssistance is received.

\* \* \* \* \*